United States Patent
Watanabe et al.

(10) Patent No.: US 7,407,432 B2
(45) Date of Patent: Aug. 5, 2008

(54) LENS SUCTION JIG INSTALLING APPARATUS AND METHOD OF DETERMINING LENS POSITION USING APPARATUS THEREOF

(75) Inventors: Takahiro Watanabe, Tokyo (JP); Tsutomu Kikawa, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 162 days.

(21) Appl. No.: 11/583,403

(22) Filed: Oct. 18, 2006

(65) Prior Publication Data
US 2007/0091262 A1    Apr. 26, 2007

(30) Foreign Application Priority Data
Oct. 18, 2005    (JP)    ............................. 2005-302690

(51) Int. Cl.
B24B 51/00    (2006.01)
(52) U.S. Cl. ............................................. 451/5; 451/42
(58) Field of Classification Search .................... 451/5, 451/42, 43, 28, 6, 240; 700/159
See application file for complete search history.

(56) References Cited

U.S. PATENT DOCUMENTS 6,427,094 B1 *    7/2002    Mizuno ...................... 700/159

FOREIGN PATENT DOCUMENTS

| JP | 2000-019058 | 1/2000 |
| JP | 2002-026083 | 1/2002 |

* cited by examiner

Primary Examiner—Hung X Dang
(74) Attorney, Agent, or Firm—Chapman and Cutler LLP

(57) ABSTRACT

The lens suction jig installing apparatus of the present invention comprises a position adjustable pedestal for holding a spectacle lens where a plurality of indices are formed that are provided with a predetermined space on a surface; a position adjusting device for displacing the pedestal within the position adjustable range; an image capture device for capturing an image of the spectacle lens; an image processing device for image-processing to detect the indices based on the image of the spectacle lens; a display device for displaying an image; a display control device for controlling in order to make the display device display an image of the spectacle lens image-captured by the image capture device and an image of the indices obtained by the image-processing; and a jig installing device for installing a lens sucking lens at a predetermined position of the spectacle lens.

5 Claims, 48 Drawing Sheets (PRE-PROCESS) (POST-PROCESS)
ONLY HIDDEN MARK (PRE-PROCESS) (POST-PROCESS)
PAINT PRESENT

432 NEAR PORTION (CIRCLE)

ML

LENS SUCTION JIG INSTALLING APPARATUS AND METHOD OF DETERMINING LENS POSITION USING APPARATUS THEREOF

PRIORITY CLAIM

Priority is claimed on Japanese Patent Application No. 2005-302690, filed with the Japanese Patent Office on Oct. 18, 2005, the content of which is incorporated herein by reference.

BACKGROUND OF THE INVENTION

1. Field of the Invention

The invention relates to a lens suction jig installing apparatus and a method of determining a lens position using the apparatus thereof, and in particular to an improvement thereof in determining a lens position when installing a lens suction jig to a progressive multi-focal lens.

2. Description of the Related Art

A raw spectacle lens having an approximately spherical surface cutout shape with a predetermined size has been provided these days. The raw spectacle lens is edged to have a shape that fits with a shape of an eyeglass frame.

Edging process for the raw eyeglass lenses is performed by an edging process apparatus. Because the processing by the edging process apparatus is conducted with a processing center of the lens as a reference, the processing center of the lens is obtained beforehand prior to the processing. A lens suction cup (a lens suction jig) is installed at the processing center, which is carried out by a lens suction jig installing apparatus.

By the way, the spectacle lens contains some types such as a single focal lens, a bifocal lens (multi-focal lens), and a progressive multi-focal lens. The processing center of the single focal lens is an optical center thereof. The processing center of the multi-focal lens and progressive multi-focal lens is their respective eye-point positions (EP values).

The optical center of the single focal lens can be obtained relatively easily using a lens meter. On the other hand, the eye-point position for each of the multi-focal lens and the progressive multi-focal lens is specified, with an appropriate index formed beforehand for their respective raw lenses as a reference.

For example, the multi-focal lens has a near portion segment formed, and the eye-point position thereof is set, with a contour of the segment as a reference. On the other hand, since the progressive multi-focal lens does not have a segment formed as the multi-focal lens does, no distinction can be made between a near portion and a far portion of the lens at a first sight. Accordingly, since the progressive multi-focal lens has a line (a second index) for indicating a boundary between the near portion and the far portion and a symbol such as "+", printed on the surface of the lens, for showing the far portion, the eye-point position can be found regarding the line as a reference.

The printed second index is not represented in a step where a raw lens is manufactured by, for example, a cast, but is added after the shape is formed.

That is, more than two indices (first indices) called concave or convex hidden marks are formed on the surface of a raw progressive multi-focal lens during a step of forming a shape, and the second index is printed based on the first indices after forming a shape.

The first indices include, for example, two marks that stipulate a boundary line between the near portion and the distant portion as described above. However, there is a case in which, in addition to the marks, letters and symbols such as figures representing a difference in refracting power between the near portion and the distant portion are added.

The letters additionally formed may be used to distinguish left from right by the fact that the position of the letters for the left eye lens is made different from that for the right eye lens. It is natural that even if letters are not additionally provided, a distinction between left and right can be easily made by making the two marks themselves mutually different.

The conventional lens suction jig installing apparatus holds a spectacle lens having the first index and the second index described above on a position adjustable pedestal. Making an image capture device capture the spectacle lens, an image obtained as the spectacle lens is displayed on the display. At the same time, the image obtained as the spectacle lens is graphically processed to detect the first and second indices. Based on the detected first and second indices, an installing position of the lens suction cup (processing position) is obtained, and the lens suction cup is sucked at the installing position. See, for example, Japanese Patent Publication 2000-19058 and Japanese Patent Publication 2002-26083.

As shown in FIG. 50, paint marks (printed marks) such as a horizontal line HL in progressive multi-focal lens, a cross mark Ma, a distant position display mark Mf, a near position display mark Mn, a hidden mark Hm, and an approximate suction position are different depending on lens manufacturers or types of lens. In addition, manufacturing errors are not precisely in print.

For example, the paint mark (printed mark) such as a mark representing an approximate suction position is marked at predetermined positions such as 0.00 mm, 2.0 mm, and 4,0 mm (in FIG. 50, X2=approximately 4.0 mm). In reality, the paint mark is drawn at a position X1 off he predetermined position X2. It is a well-known fact in the spectacle processing industry that the paint mark is marked at the wrong position X1.

Accordingly, when a suction jig is installed based on these marks, an error is piled up, which prevents correct suction work. If lens cutting process is performed according to the suction position, it is possible that incorrect lens processing is conducted.

If the types of lens can be determined regarding these marks, a manual by a lens manufacturer shows that predetermined values such as 0.0 mm, 2.0 mm and 4.0 mm are indicated, which can specify suction positions. However, reading a manual every time reduces working efficiency, which prevents speedy suction work and lens grinding process.

SUMMARY OF THE INVENTION

Therefore, it is an object of the invention to provide a lens suction jig installing apparatus that can appropriately determine an installing position of a lens suction jig, without erroneously specifying the installing position based on a paint mark (printed mark) out of place.

The invention is directed to a lens suction jig installing apparatus for installing a lens suction jig. The lens suction jig installing apparatus for installing a lens suction jig comprises a position adjustable pedestal for holding a spectacle lens where a plurality of indices are formed that are provided with a predetermined space on a surface; a position adjusting device for displacing the pedestal within the position adjustable range; an image capture device for capturing an image of the spectacle lens held by the pedestal; an image processing device for image-processing to detect the indices based on the image of the spectacle lens image-captured by the image capture device; a display device for displaying an image; a display control device for controlling in order to make the display device display an image of the spectacle lens image-captured by the image capture device and an image of the indices obtained by the image-processing; and a jig installing device for installing a lens sucking lens at a predetermined position of the spectacle lens, wherein the display control device specifies a position in a vertical direction with a predetermined interval from a straight line connecting one of the indices obtained by the image-processing, obtains the interval from the straight line connecting one of the indices, approximates the obtained interval to a predetermined value, and specifies a suction position of the lens suction jig.

Advantageously, the display control device specifies the position in the vertical direction with the predetermined interval from the straight line connecting one of the indices obtained by the image-processing; obtains the interval from the straight line connecting one of the indices, approximates the obtained interval to the predetermined value, exchanges for a vertical position of the predetermined value from a straight line connecting another index, and specifies a suction position of the lens suction jig.

Advantageously, the image capture device is a CCD.

Preferably, the display device is a liquid crystal display.

Preferably, the display control device is an operation control circuit that controls to make the display device display an image of the spectacle lens image-captured by the image capture device and an image of the index obtained by the image processing.

BRIEF DESCRIPTION OF THE DRAWINGS

FIGS. 49A-49D are diagrams for showing a state after each process step with respect to a manual lens position determination process, respectively; in which FIG. 49A is a diagram for showing an initial state;

FIG. 49B is a diagram for showing a state after a parallel translation; and

FIG. 49C is a diagram for showing a state after a rotation.

DETAILED DESCRIPTION OF THE INVENTION

An embodiment of a lens suction jig installing apparatus and a method of determining a lens position using the apparatus thereof in accordance with the invention will be explained, respectively, referring to the figures.

An explanation will be made in detail of how a lens suction jig 120 is attached to a spectacle lens ML by a lens suction jig installing apparatus in accordance with the invention.

Figure 38A:
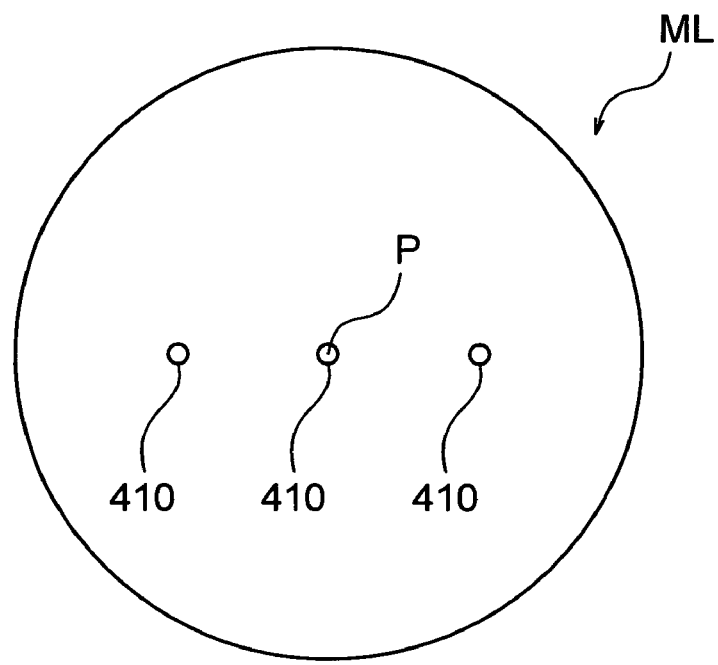
FIG. 38A is a diagram for showing a single focal lens on which markings are printed.
Figure 38B:
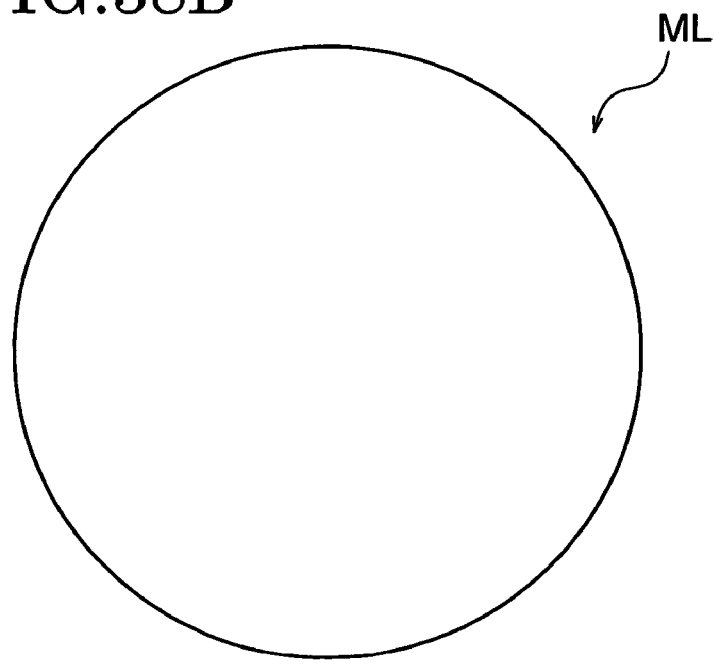
FIG. 38B is a diagram for showing a single focal lens on which no markings are printed.

The spectacle lens ML is a raw lens before edging, whose types are a single focal lens, a bifocal lens, and a progressive multi-focal lens. The single focal lens includes a type that has a plurality of printed markings 410 as shown in FIG. 38A, and one that has no markings 410 as shown in FIG. 38B.

The marking 410 is an index for showing a reference point (an eye point position) on the lens ML, on which the lens suction jig installing apparatus 120 is attached. In addition, the marking 410 is detected through image processing by an operation control circuit 130 as an image processing device that will be discussed later.

A refraction characteristic—a spherical diopter power, a cylindrical diopter power, an axis angle of a cylindrical axis and an optical center—of the single focal lens without the markings 410 is measured by a CL measurement apparatus 300 to be explained later, which determines an eye point position P.

Figure 39:
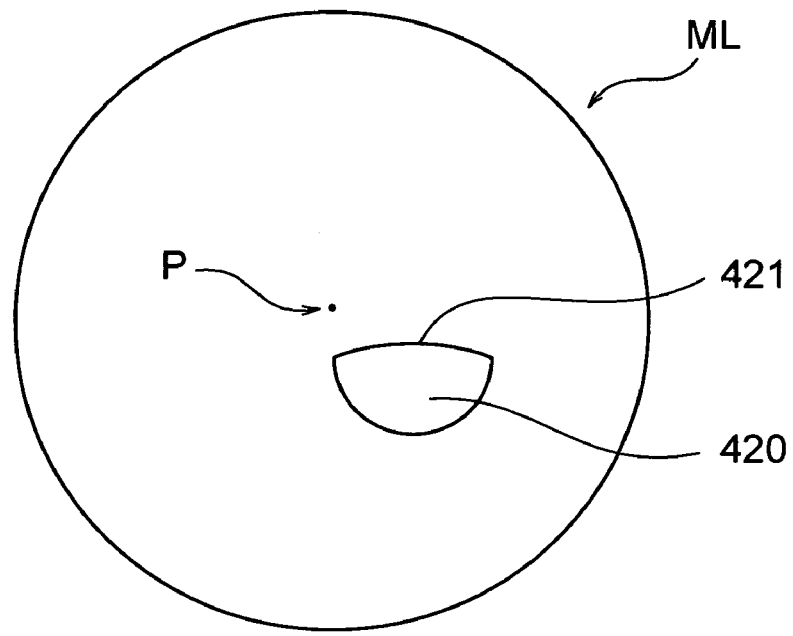
FIG. 39 is a diagram for showing a bifocal lens.

The bifocal lens ML, as shown in FIG. 39, includes almost a semi-circle shape of, what is called, segment 420. The operation control circuit 130 processes an image of a contour 421 of the segment 420 to detect the segment 420, and based on the contour 421 of the segment 420 detected, detects the position (eye point) P on the lens ML, at which the lens suck jig 120 is installed.

The progressive multi-focal lens ML, containing a distant portion 431 and a near portion 432, is formed to be able to continuously change a focal length from the distant portion 431 to the near portion 432. On the surface of the lens, as shown on FIG. 40, expressed by printing are a horizontal line 450 (a second index), which indicates a boundary between the distant portion 431 and the near portion 432, and a symbol +, which represents the distant portion 431 close to the horizontal line 450.

Figure 40:
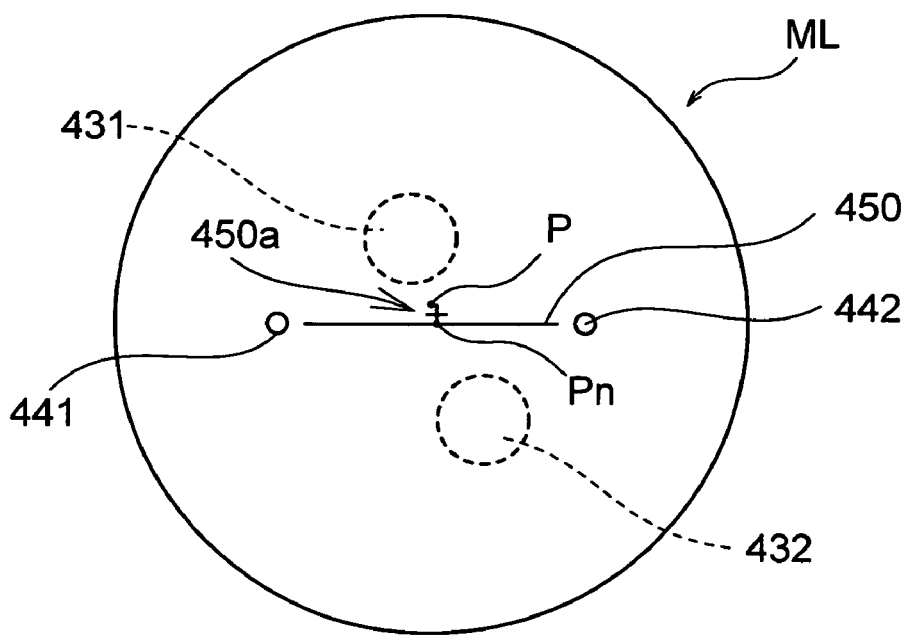
FIG. 40 is a diagram for showing a progressive multi-focal lens.

The progressive multi-focal lens ML, as shown in FIG. 40, has two hidden marks (first indices) 441 and 442 printed. The hidden marks 441 and 442 are the marks that define the horizontal line 450. In addition to the defining marks, there may be other kinds of marks added such as letters or symbols, including a numerical number for designating the difference in a diffracting power between the distant portion 431 and the near portion 432.

The additionally formed letters can be different between a right-eye lens and a left-eye lens, respectively. Accordingly, the letters may be used for differentiating the left from the right of the lens ML.

The operation control circuit 130 detects the horizontal line 450 and the hidden marks 441 and 442 by image processing, and at the same time detects the eye point position P on the progressive multi-focal lens ML, based on the detected horizontal line 450 and the two hidden marks 441 and 442 that are already detected.

Figure 1:
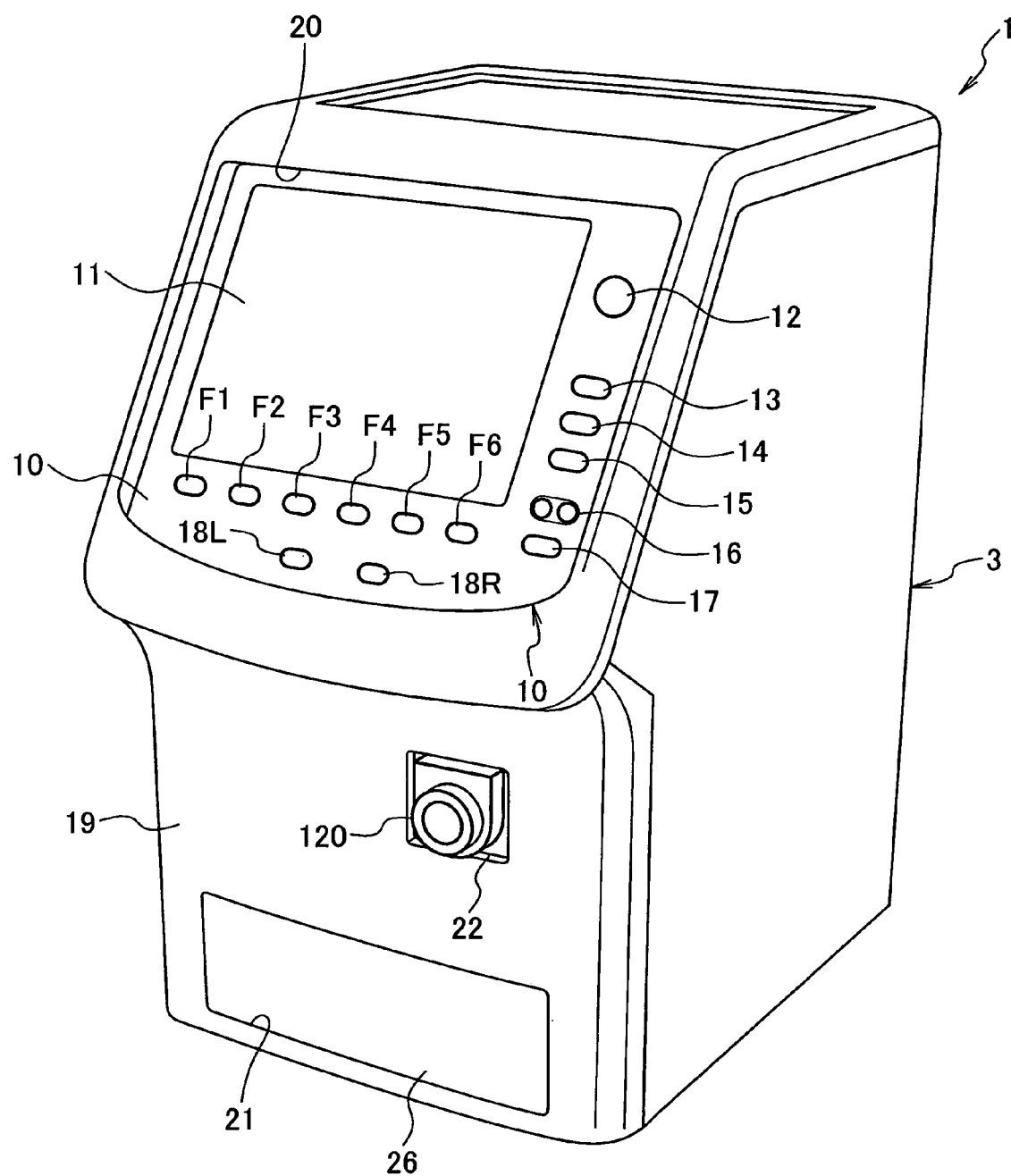
FIG. 1 is an external view of a lens suction jig installing apparatus according to the present invention.

FIG. 1 is an external view of the lens suction jig installing apparatus 1 according to one embodiment of the present invention, in order to install the lens suction jig 120 to the spectacle lens.

Figure 8:
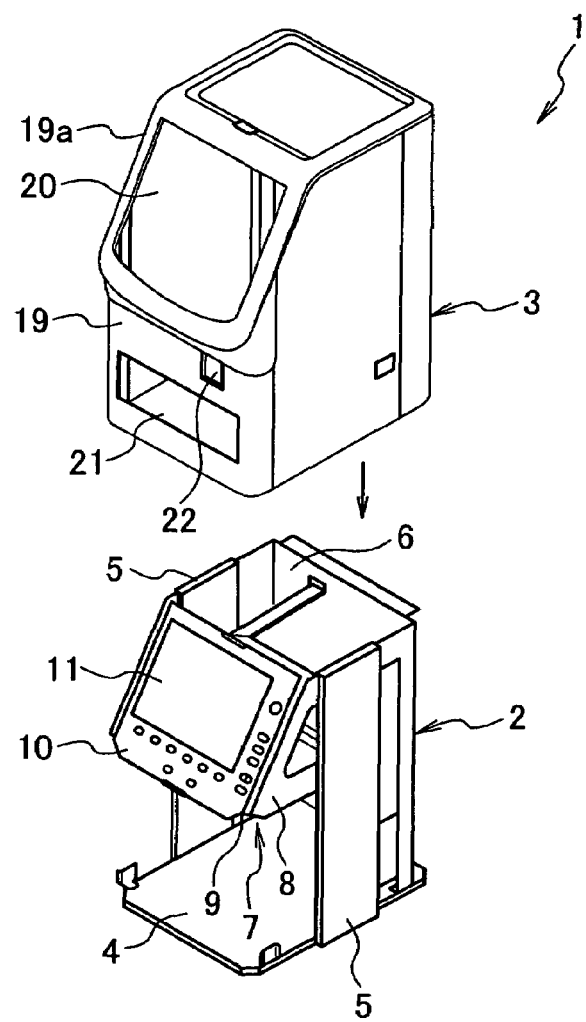
FIG. 8 is an exploded perspective view showing the relationship between an inner frame and an outer frame of the lens suction jig installing apparatus shown in FIG. 1.
Figure 9:
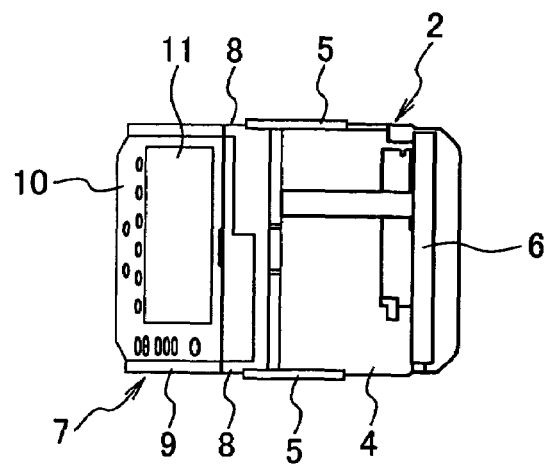
FIG. 9 is a plan view of the inner frame shown in FIG. 20.

The lens suction jig installing apparatus 1 contains a frame 2 and an external case covering the frame 2, as shown in FIG. 8.

Figure 10:
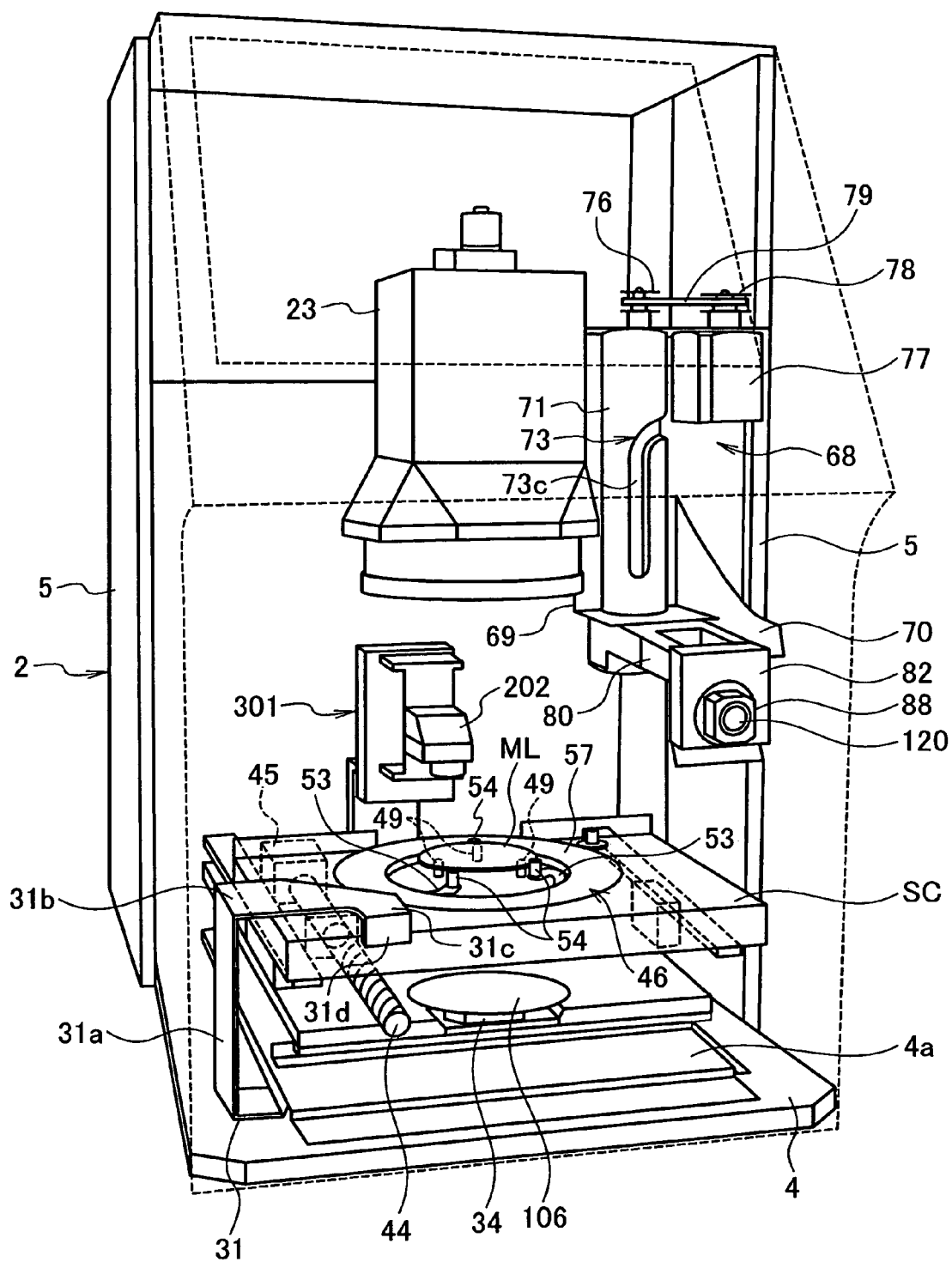
FIG. 10 is a perspective view showing an internal constitution of the lens suction jig installing apparatus shown in FIG. 1.

The frame 2 has a bottom plate 4, side plates 5 and 5 that are integrally provided on the central portions in front and rear directions of right/left side edges of the bottom plate 4, and a rear wall 6 integrally provided on the rear edge portion of the bottom plate 4. Reference numeral 4a is a base plate fixed on the bottom plate 4, as shown in FIG. 10.

Furthermore, a bracket 7 protruding to a front side is provided on an upper front side of the bottom plate 4. The bracket 7 has triangular side plate portions 8, 8 whose rear edge portions are mounted on the side plates 5, 5, and a connecting plate portion 9 that connects between front edge portions of these side plate portions 8, 8 as shown in FIG. 8.

The connecting plate portion 9 is inclined so as to be directed to a rear side as it approaches an upper end. An operating panel 10 and a liquid crystal display device 11 are provided on the connecting plate portion 9.

Figure 2:
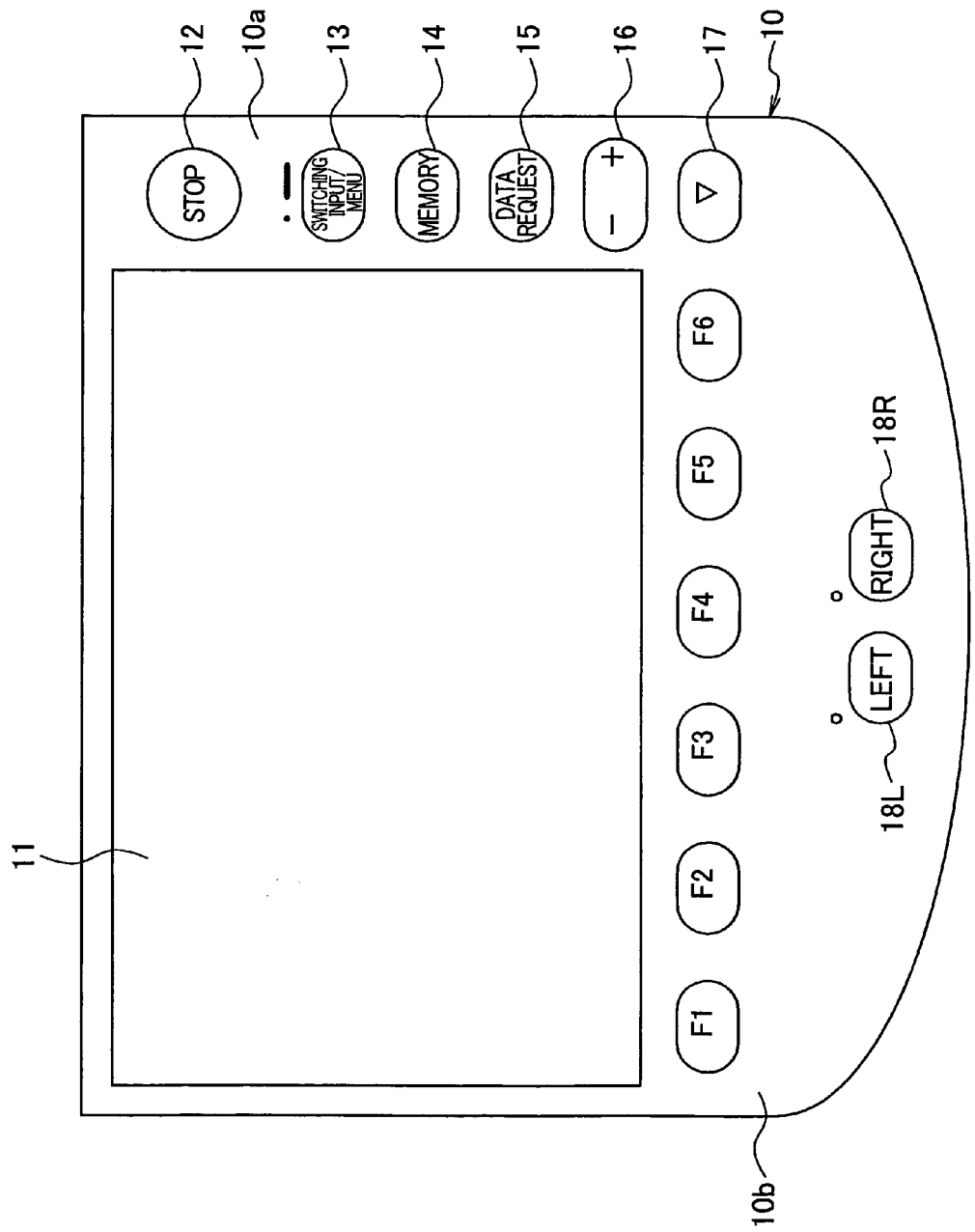
FIG. 2 is an explanatory view of a liquid crystal display device shown in FIG. 1.

FIG. 2 is an explanatory view of a liquid crystal display device 11 shown in FIG. 1. The operating panel 10, as shown in FIG. 2, has an operating panel section 10a disposed on a right side of the liquid crystal display device 11 and an operating panel section 10b disposed on a lower side of the liquid crystal display device 11.

The operating panel section 10a has a "stop" switch 12 that stops measurement, a "switching input/menu" switch 13 that switches an input method of layout data, a "memory" switch 14 that retrieves frame data stored in a memory, a "data request" switch 15 that request the frame data, and a "− +" switch 16 for input settings, and a "V" switch 17 for moving a cursor.

A menu screen can be displayed by pressing the "switching input/menu" switch 13 for a predetermined time (a few seconds, that is, 2 seconds, for example) or longer.

Furthermore, when pushed in a stop state after a measurement while waiting for a block instruction (a suction instruction), the "switching input/menu" switch 13 is configured to be used for the instructions for a manual position setting or defining the position thereafter.

When the "memory" switch 14 is pushed in an observation mode of the hidden marks, the screen of the liquid crystal display device 11 is configured to be switched to a storing screen of the hidden marks.

The "data request" switch 15 is used for requesting a transfer of lens-shaped data (θi, ρi) from a frame shape measurement device (not shown) connected to the lens suction jig installing apparatus 1.

The "– +" switch 16 is used for setting an increase/decrease of numerical data of an area that is displayed on the liquid crystal display device 11 and whose display color is reversely displayed by the "V" switch 17. Moreover, the "– +" switch 16 is also used for switching display magnifications of the liquid crystal display device 11 in performing the manual position setting.

The "V" switch 17 is used for moving a cursor in a data input section, which is displayed on the liquid crystal display device 11. The cursor mentioned here means the state where any one display color of areas of a plurality of data input frames (data input areas) displayed on the liquid crystal display device 11 is reversed or changed to another color to be capable of inputting data.

The operating panel section 10b includes function keys F1 to F6 that are arrayed along a lower edge of the liquid crystal display device 11. Furthermore, provided on the operating panel section 10b are a "left" switch 18L and a "right" switch 18R which specify processing of the spectacle lens for right eye use or left eye use and switch a display.

The function keys F1 to F6 are used for settings the processing of the spectacle lens ML, and are also used for a response/selection to a message displayed on the liquid crystal display device 11 during the processing step.

Figure 3:
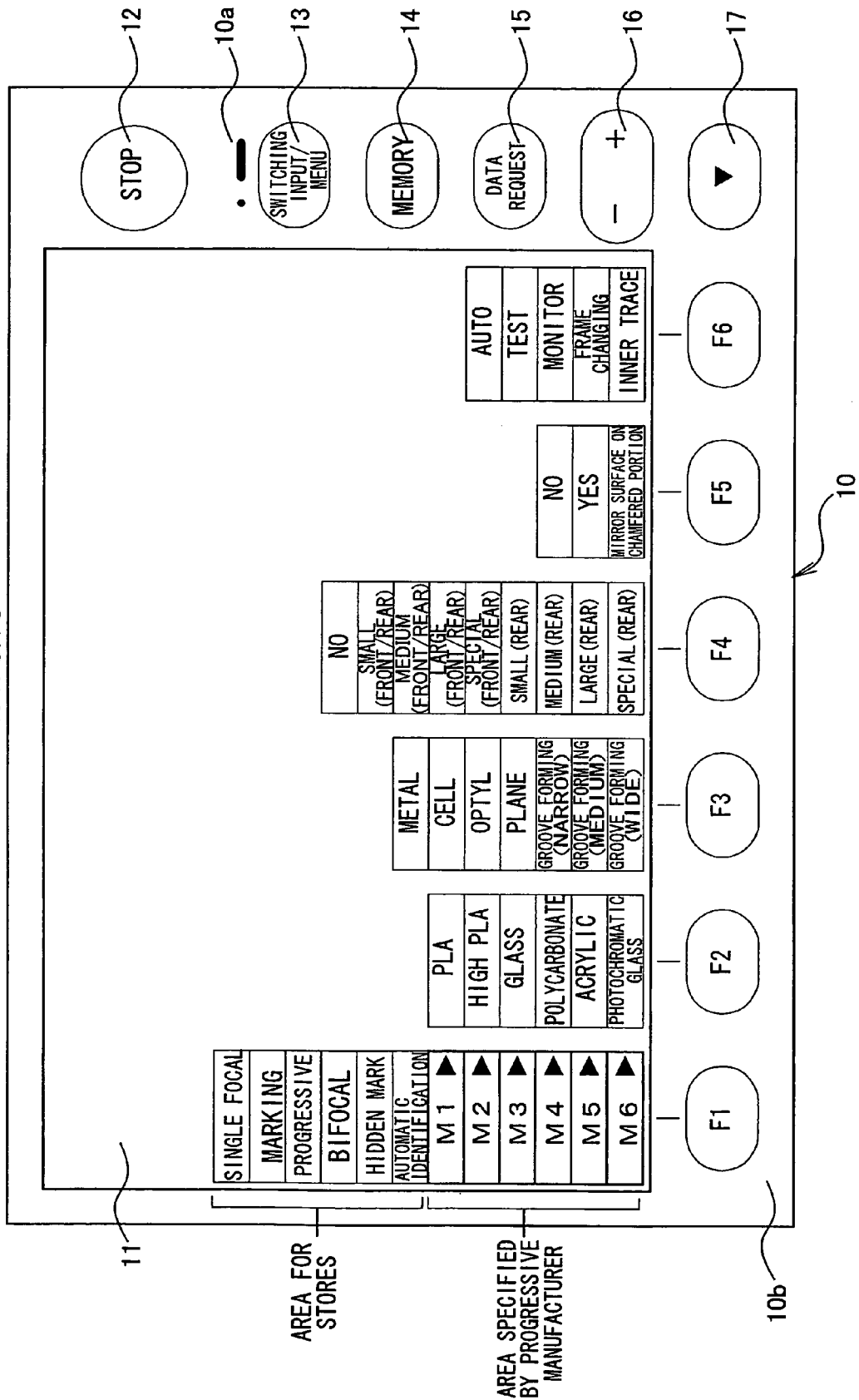
FIG. 3 is an explanatory view of the display content of the liquid crystal display device shown in FIG. 1.

FIG. 3 is an explanatory view of the display content of the liquid crystal display device 11 shown in FIG. 1. In making settings for the processing (layout screen), the function key F1 is used for inputting a lens type (area for stores) and for specifying a manufacturer of the progressive lens. The function key F2 is used for inputting a lens material. The function key F3 is used for inputting a frame type. The function key F4 is used for inputting a chamfer processing type. The function key F5 is used for inputting mirror surface processing. The function key F6 is used for selecting a course (mode).

As the type of the lens, which is inputted by the function key F1, there exist "single-focal", "marking", "progressive", "bifocal", "hidden marks", "automatic discrimination" as shown in FIG. 3. Furthermore, as the progressive lens manufacturers inputted by the function key F1, there exist manufacturers M1, M2, and M3.

As the lens material inputted by the function key F2, there exist "pla", "high pla", "glass", "acrylic", and "photochromatic glass" as shown in FIG. 3. Herein, "pla" means plastic.

As the frame type for spectacle lens inputted by the function key F3, there exist "metal", "cell", "optyl", "plane", "grooved (narrow)", "grooved (medium)", and "grooved (wide)", as shown in FIG. 3.

Note that "point: front hardware", "point: rear hardware", and "point: composite hardware" may also be included.

As the chamfer processing type of the spectacle lens 2 inputted by the function key F4, there exist "no", "small (front/rear)", "medium (front/rear)", "large (front/rear)", "special (front/rear)", "small (rear)", "medium (rear)", "large (rear)", and "special (rear)", as shown in FIG. 3.

As the mirror surface processing inputted by function key F5, there exist "no", "yes", and "mirror surface on chamfered area", as shown in FIG. 3.

As the processing course inputted by the function key F6, there exist "auto", "test", "monitor", "frame changing", and "inner trace", as shown in FIG. 3.

Figure 4:
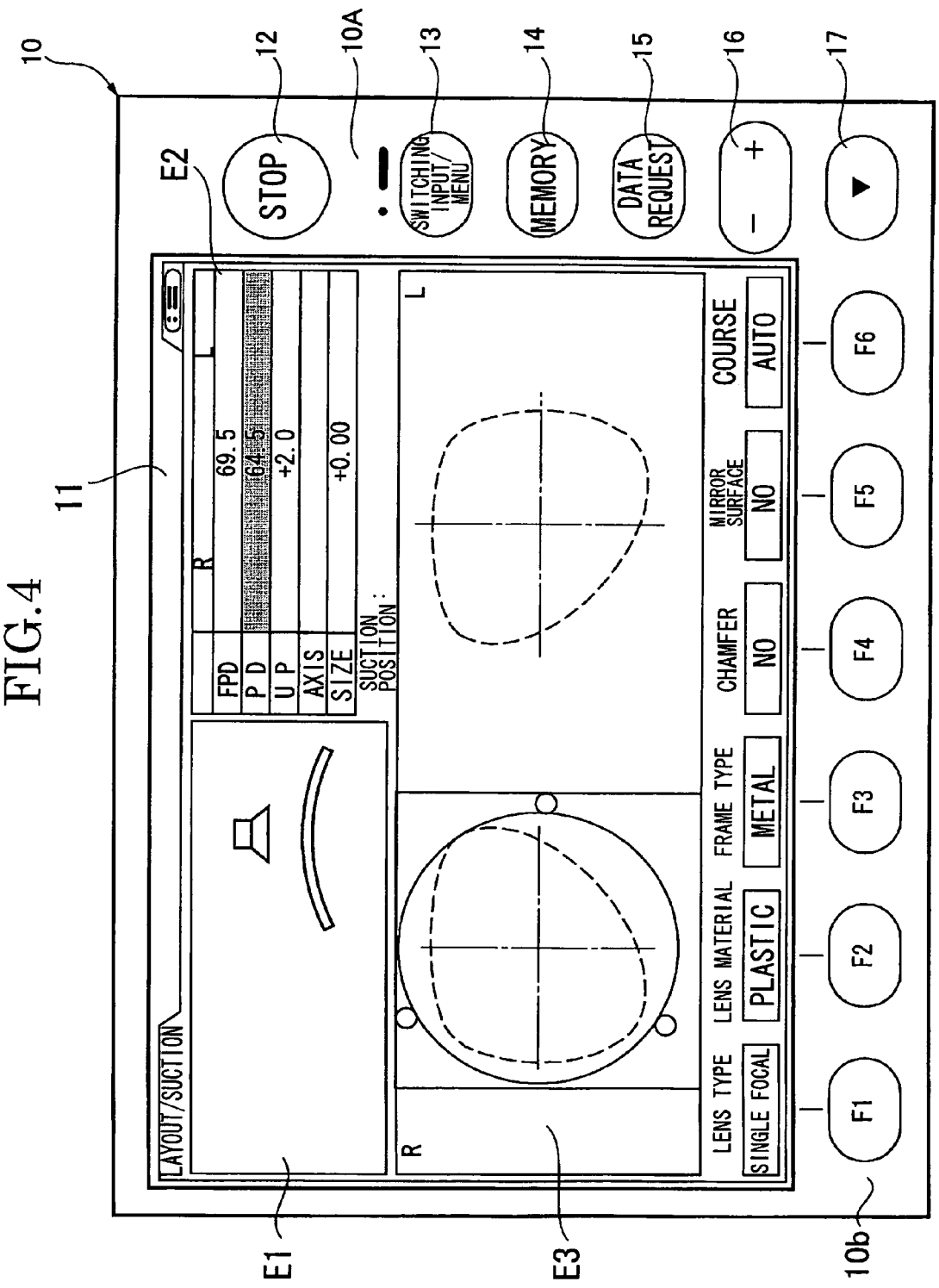
FIG. 4 is an explanatory view showing another example of the display content of the liquid crystal display device shown in FIG. 1.

As the layout screen, for example, a "layout/suction" mode for displaying the layout screen to mount the lens suction jig on the spectacle lens, as shown in FIG. 4, and a "layout" mode showing a state where the lens suction jig is mounted on the spectacle lens, in which the lens-shaped information (θi, ρi) is hidden.

In the state where the "layout" mode is selected, the display is made in a sectionalized state in a message display area E1, a numerical value display area E2 and a status display area E3.

Figure 4A:
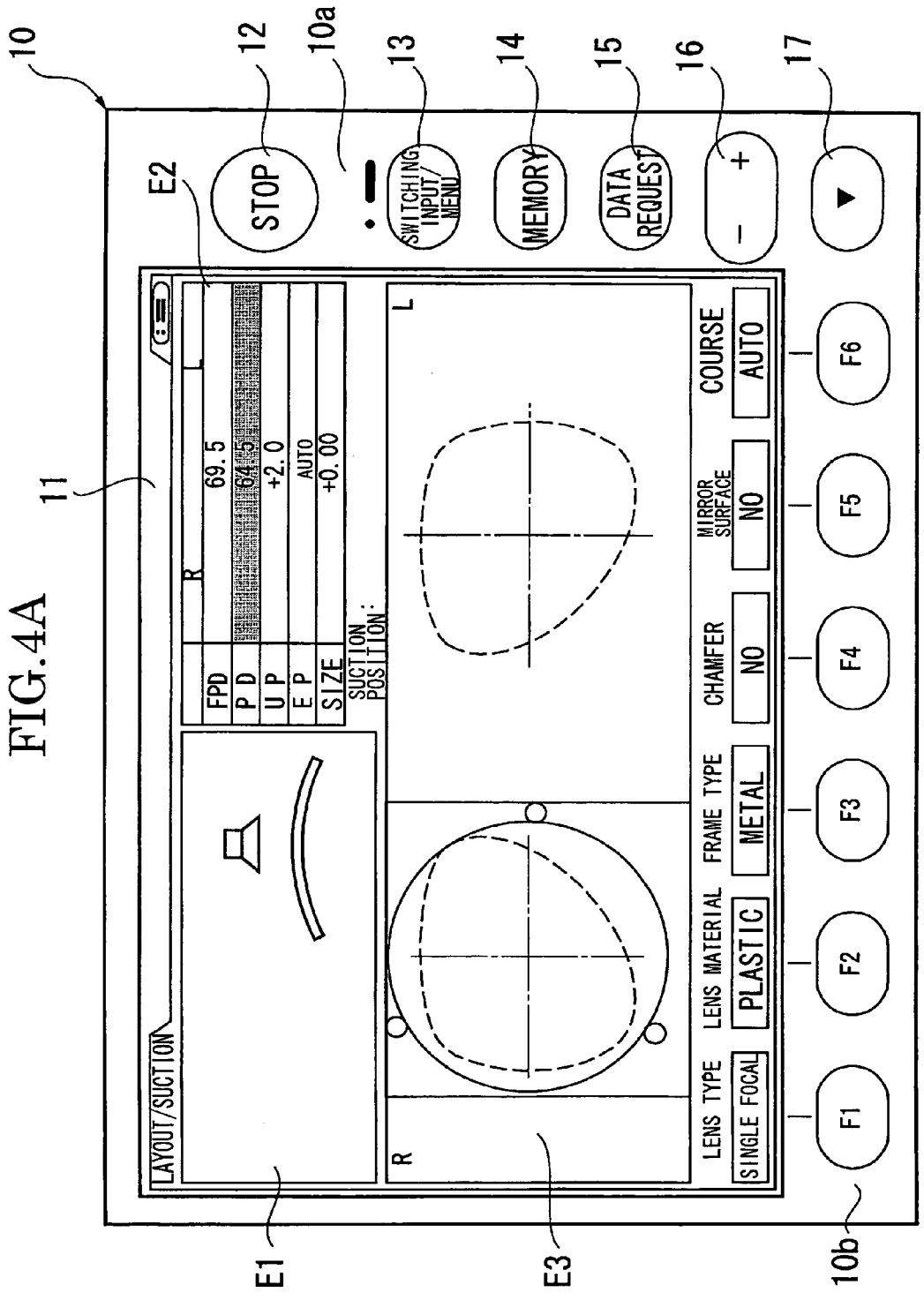
FIGS. 4A and 4B are an explanatory view showing another example of the display content of the liquid crystal display device shown in FIG. 4, respectively.
Figure 4B:
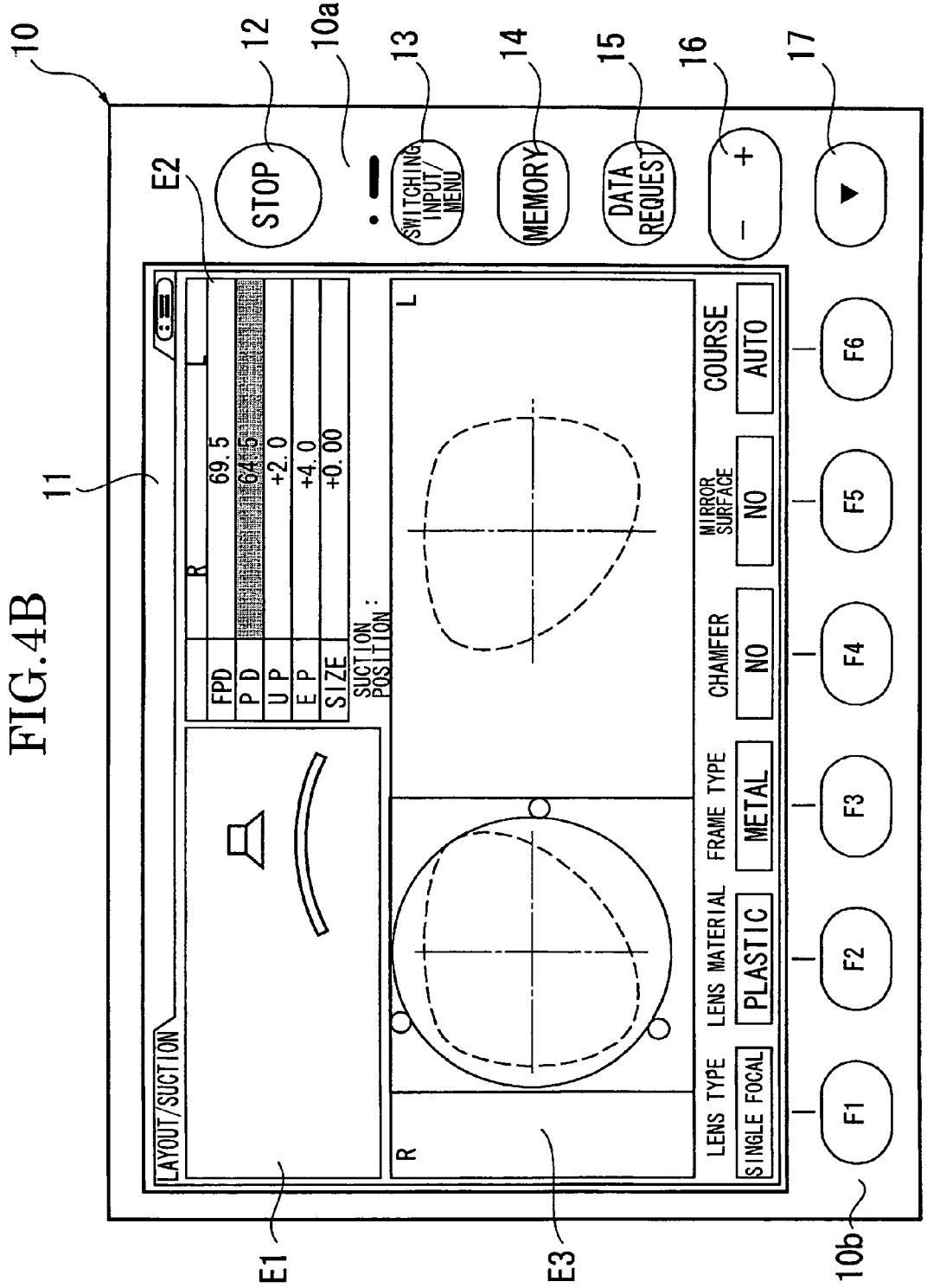
Figure 5:
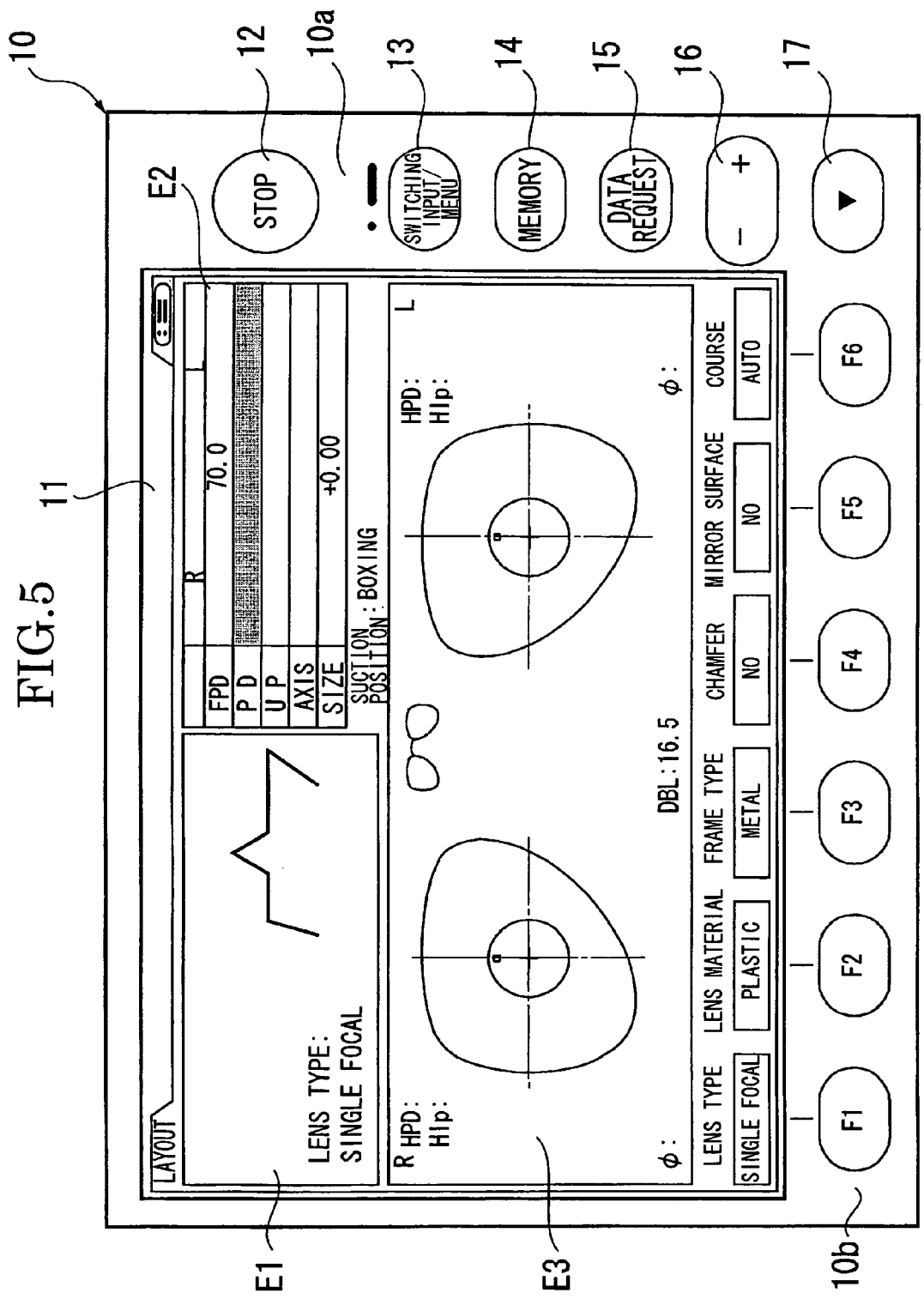
FIG. 5 is an explanatory view showing still another example of the display content of the liquid crystal display device shown in FIG. 1.

FIG. 4 is an explanatory view showing another example of the display content of the liquid crystal display device 11 shown in FIG. 1. FIG. 4A is an explanatory view showing another example of the display content of the liquid crystal display device 11 shown in FIG. 4. FIG. 4B is an explanatory view showing another example of the display content of the liquid crystal display device 11 shown in FIG. 4.

In the layout and suction screen of FIG. 4, when the "progressive" is selected by the function key F1, the showing "AXIS" of the numerical value display area E2 is turned into the "EP" (Eye Point) as shown in FIG. 4A or FIG. 4B.

The content to be input into a display space for the "EP" in the numerical value display area E2 may be "Auto" as shown in FIG. 4A or "+4.0" as shown in FIG. 4B.

The external case 3, as shown FIGS. 1 and 8, contains a front wall 19. On the upper portion of the front wall 19, an inclined wall 19a is formed that bends backward. The inclined wall 19a has an aperture 20 for a liquid crystal. The liquid crystal display device 11 and the operation panel 10 as shown in FIG. 1 are provided with the aperture 20. Moreover, the front wall 19 includes an aperture 21 for letting a table in and out in the lower portion thereof, and an aperture 22 for attaching a suction device in the right half portion thereof.

Figure 6A:
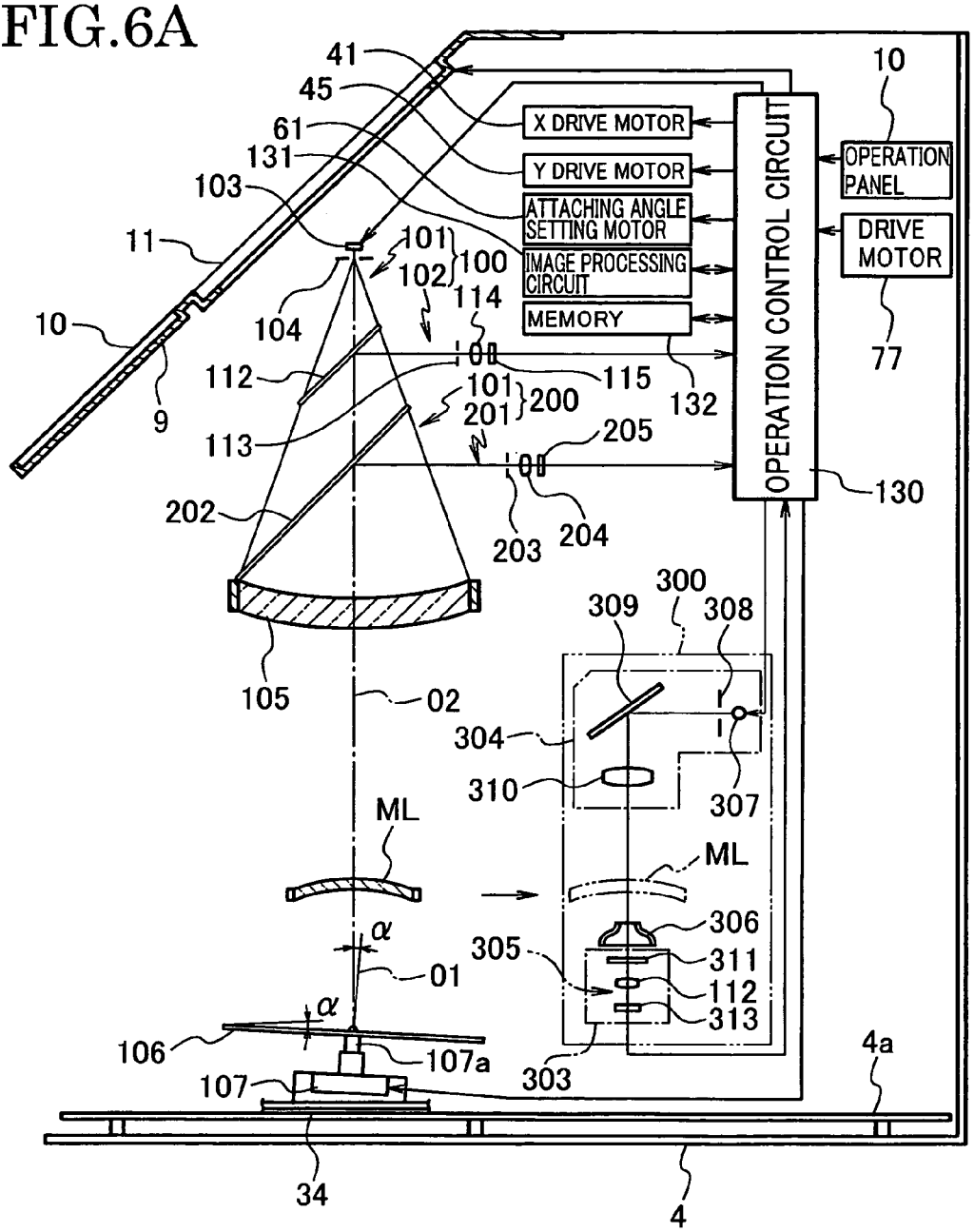
FIG. 6A is an explanatory view showing the relationship between an operation control circuit and a lens suction jig installing apparatus according to the present invention.

FIG. 6A is an explanatory view showing the relationship between the operation control circuit 130 and the lens suction jig installing apparatus 1 according to the present invention. As shown in FIG. 6A, provided in the frame 2 are an overall detection optical system 100, a hidden-mark detection optical system 200, and a CL measurement device 300 for measuring a refractive characteristic.

The overall detection optical system 100 contains an illumination optical system 101 and an overall observation optical system 102.

The illumination optical system 101 includes a light source 103 such as an infrared light emitting diode (LED), and an optical member such as a pin-hole plate 104, a collimating lens 105, and a rotary reflection plate 106 that are arranged in this order. The rotary reflection plate 106 is attached to a rotary axis 107a of a drive motor 107 to be driven by the drive motor 107.

An axis 01 for the rotary axis 107a of the drive motor 107 is inclined with respect to an optical axis 02 of the illumination optical system 101. Thus, the direction of the plane of the rotary reflection plate 106 is slightly inclined with respect to the optical axis 01, which is directed in an orthogonal direction, only by a predetermined angle α. The predetermined angle α is a few degrees (2° to 4°, preferably 3°).

Figure 6B:
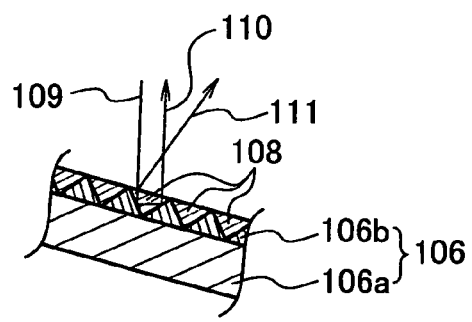
FIG. 6B is an expanded sectional view of a rotary reflection plate shown in FIG. 6A.

FIG. 6B is an expanded sectional view of the rotary reflection plate 106 shown in FIG. 6A. The rotary reflection plate 106, as shown in FIG. 6B, includes a rotation disk 106a made of a metal plate or a resin plate a reflection sheet 106b adhered on the upper surface of the rotation disk 106a. The reflection sheet 106b consists of a large number of very fine corner cubes 108 that are arrayed on the entire surface thereof vertically and horizontally to be integrally formed by resin.

By having such a constitution, an incident optical flux 109 incoming on the corner cubes, after reflected inside the corner cube 108, goes out from the corner cubes 108 to become an outgoing optical flux 110 that returns along the incident optical flux 109. The reflection plate that has this type of optical characteristics is called a retroreflective plate.

On the other hand, a specular optical flux 111 reflected on the surface of the reflection sheet 106b reflects at a certain angle to the incident optical flux 109. Accordingly, the specular optical flux 111 does not return along the incident optical flux 109 like the outgoing optical flux 110, which does not cause adverse effect to the overall observation and detection of the hidden marks (does not cause noise light).

The overall observation optical system 102 includes optical members such as the collimating lens 105, a half mirror 112, a diaphragm plate 113, an image forming lens 114, and a CCD (a second-dimension light-receiving element and an area sensor), which are in this order.

The hidden mark detection optical system 200 contains the aforementioned illumination optical system 101 and a hidden mark observation optical system 201.

The hidden mark observation optical system 201 includes optical members such as the collimating lens 105, a half mirror 202, a diaphragm, and an image forming lens 204, and an image capture unit such as a CCD 205, which are arranged in this order therein.

FIG. 10 is a perspective view showing an internal constitution of the lens suction jig installing apparatus shown in FIG. 1. Optical members other than the rotary reflection plate 107, of the overall detection optical system 100 and the hidden mark detection optical system 200, are stored in an optical member storage case 23 shown in FIG. 10. The optical member storage case 23 is fixed at the frame 2 by a bracket (not shown).

Figure 7:
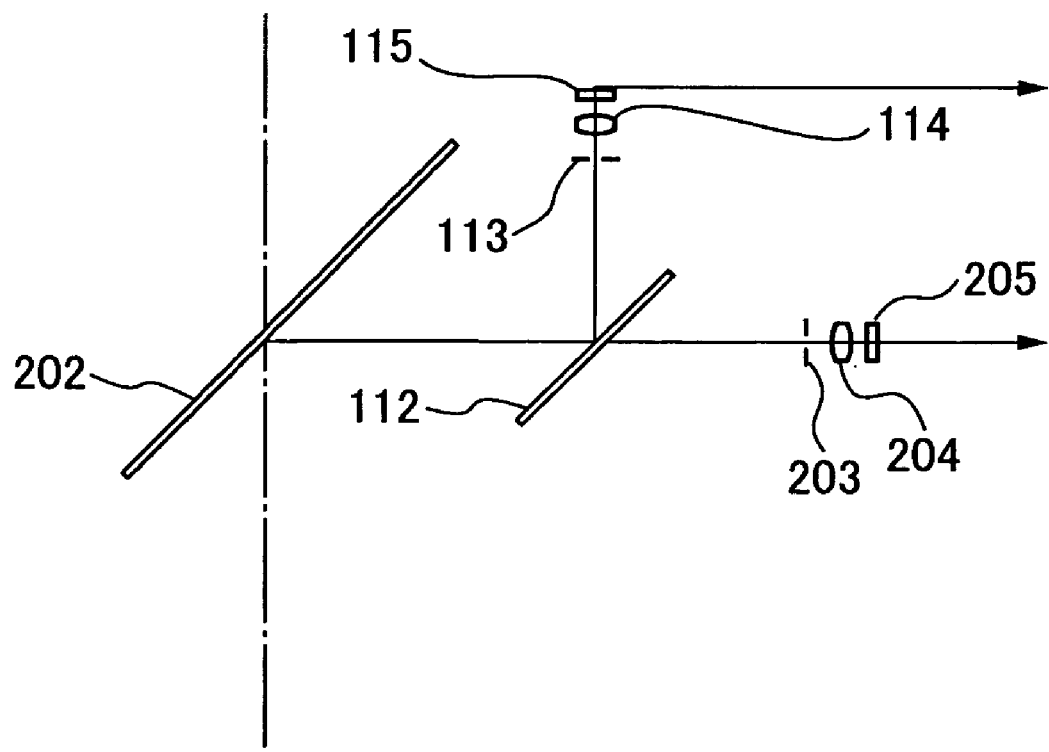
FIG. 7 is an explanatory view showing another example of an overall detection optical system.

FIG. 7 is an explanatory view showing another example of the overall detection optical system 100. The overall detection optical system 100 can be constituted as shown in FIG. 7. Specifically, the half mirror 112 shown in FIG. 6 is arranged between the half mirror 202 and the diaphragm plate 203, the reflected optical flux reflected by the half mirror 202 is reflected by the half mirror 112, and the reflected optical flux may be guided to the CCD 115 via the diaphragm plate 113 and the image-forming lens 114.

Figure 12:
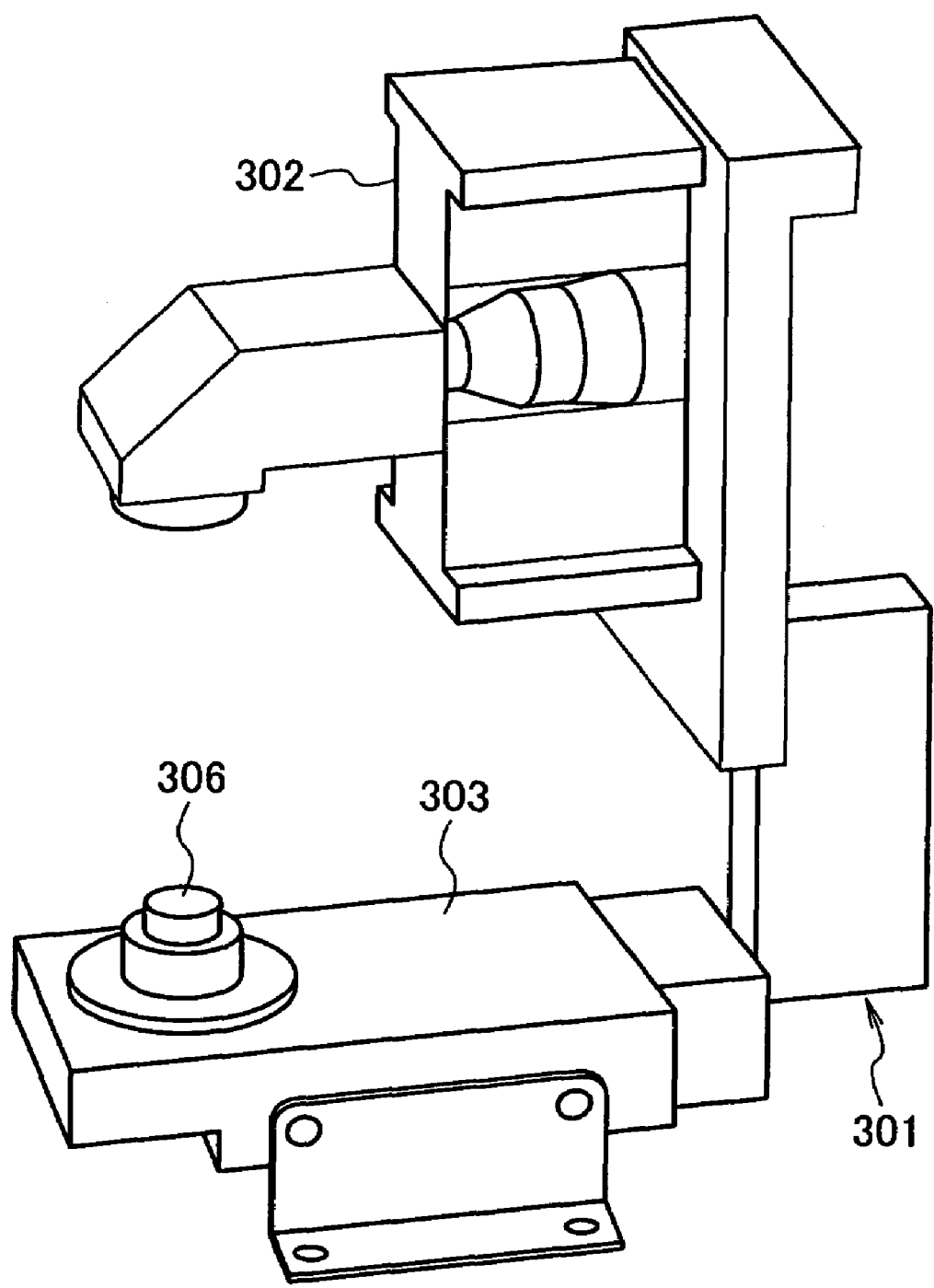
FIG. 12 is a perspective view of a CL measurement device shown in FIGS. 10 and 11.

FIG. 12 is a perspective view of the CL measurement device 300. The CL measurement device 300 is located on the innermost side (rear wall 6 side) of the frame 2 and is fixed on the base plate 4a, and has a bracket 301 as shown in FIG. 12. The bracket 301 has an upper case 302 and a lower case 303. A measurement optical flux projection system 304 shown in FIG. 6 is arranged in the upper case 302, and a light-receiving optical system 305 shown in FIG. 6 is arranged in the lower case 303. Reference numeral 306 denotes a spectacle lens receiver having a conical shape fixed on the lower case 303.

The measurement optical flux projection system 304 has optical members such as a light source 307, a pinhole plate 308, a reflection mirror 309 and a collimating lens 310, which are arranged in this order. Further, the light-receiving optical system 305 has optical members such as a pattern plate 311, and an image-forming lens 112, and a CCD 313, which are arranged in this order.

Figure 14:
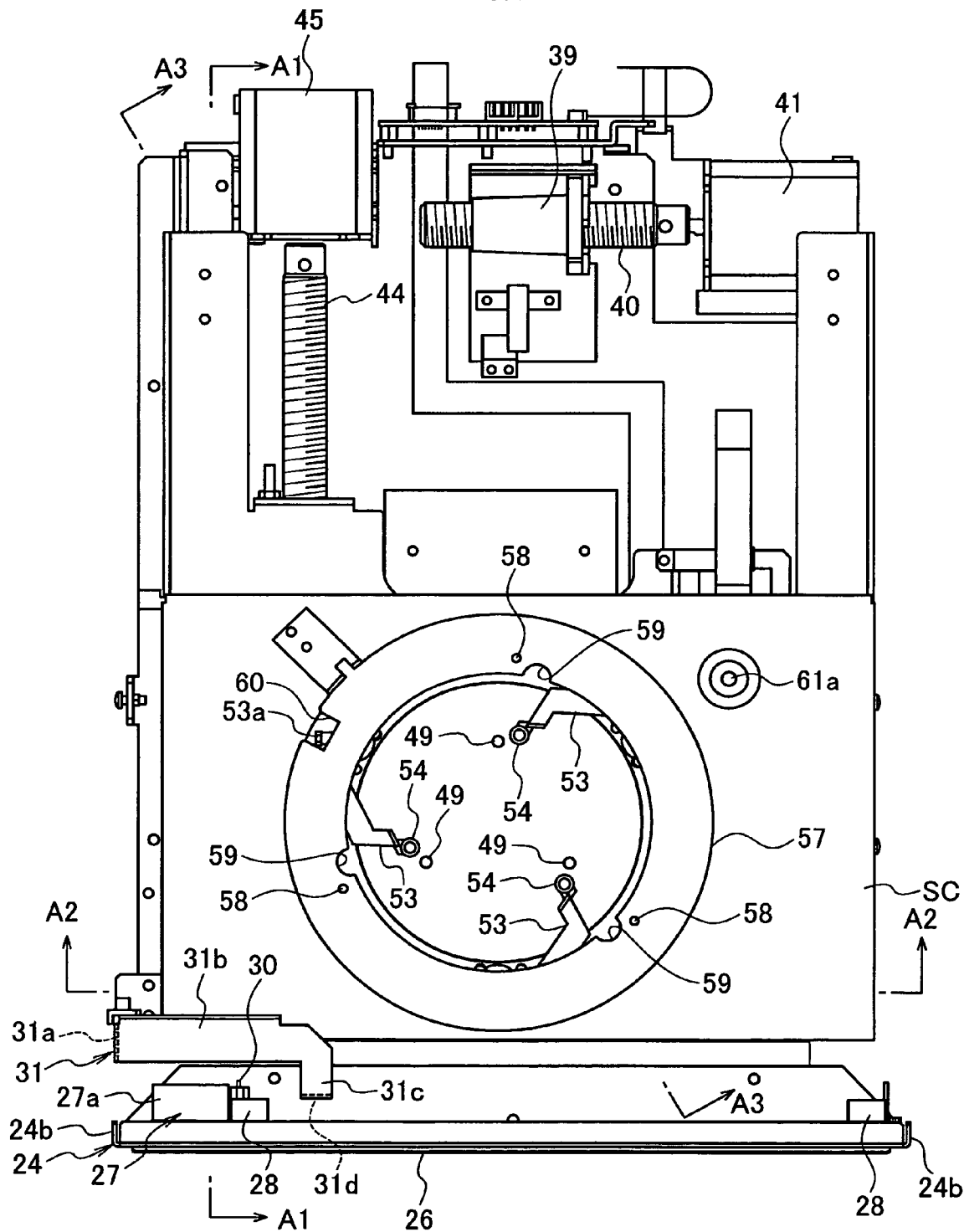
FIG. 14 is a plan view of the lens holder shown in FIG. 13.
Figure 15:
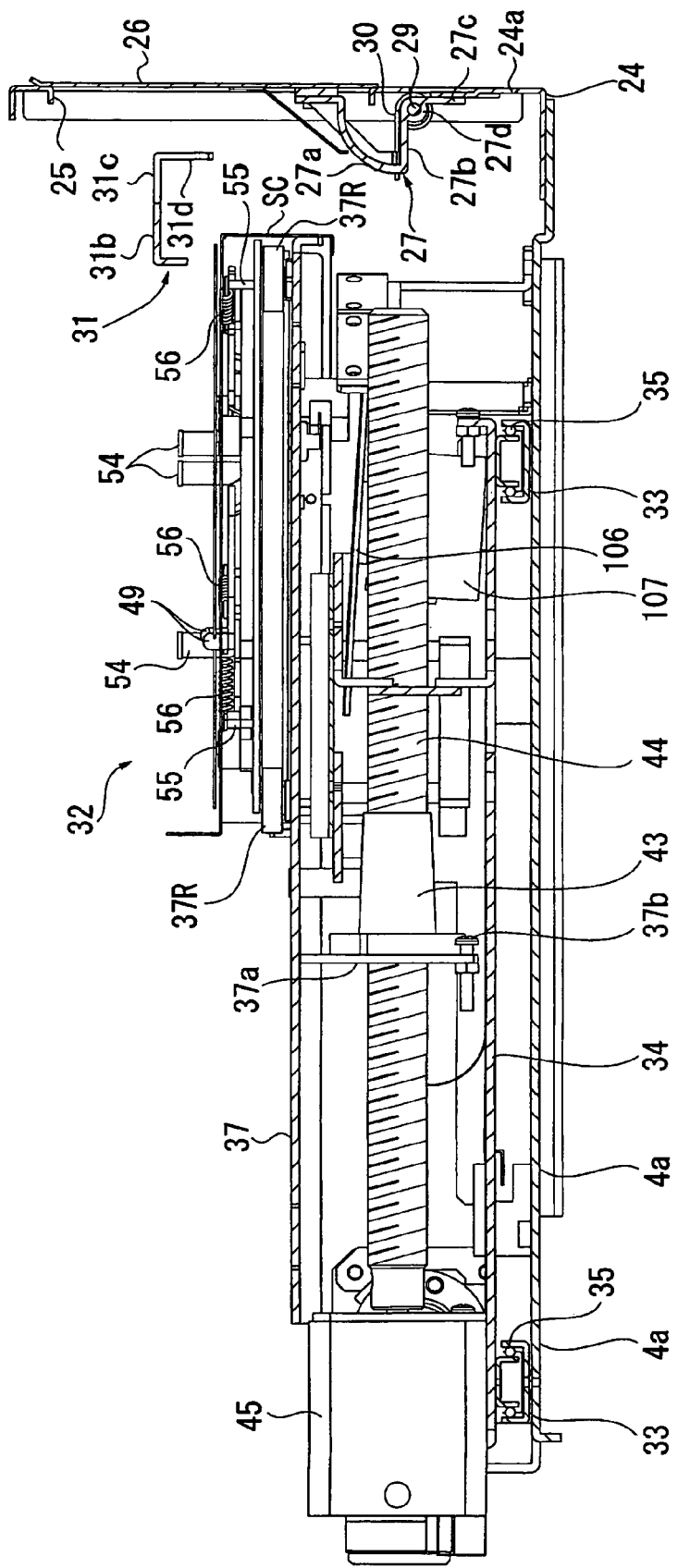
FIG. 15 is a sectional view taken along A1-A1 line of FIG. 14.
Figure 16:
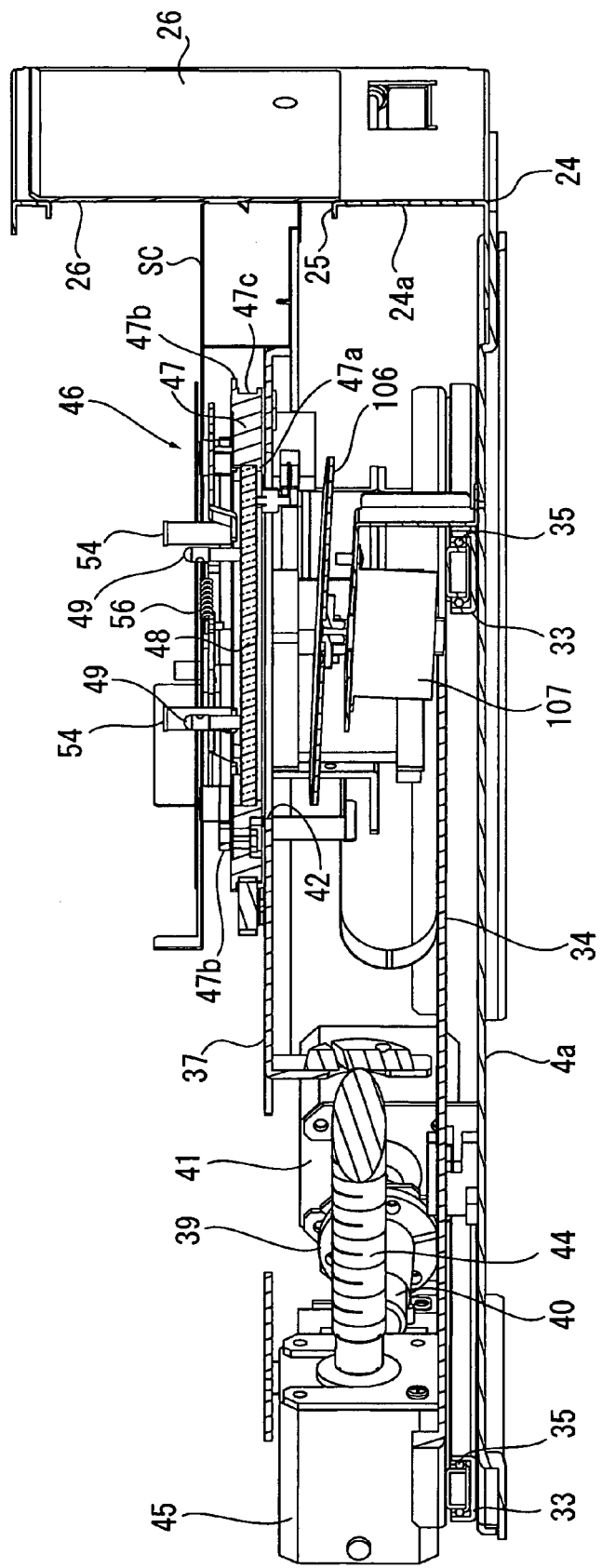
FIG. 16 is a sectional view taken along A3-A3 line of FIG. 14.

A lid attachment construction is discussed below. An L-shaped bracket 24 is fixed on the front end portion (side end portion of front wall 19) of the base plate 4a as shown in FIGS. 14-16. An opening 25 is formed in a standing plate portion 24a of the bracket 24, and flanges 24b, 24b are integrally formed on the sides of the standing plate portion 24a.

The opening 25 is closed by a lid 26. A bracket 27 for hinge use, which is shown in FIGS. 14 and 15, is fixed on a lower end portion side of the inner surface of the lid 26. The bracket 27, as shown in FIG. 15, has a curved portion 27a that curves in a rear downward direction in an arc shape, a straight plate portion 27b that extends from the rear lower end of the curved portion 27a to the lid 26 in a straight line, and a stopper plate portion 27c that is connected vertically downward with respect to the straight plate portion 27b.

On the other hand, bearing members 28, 28 arranged lower than the opening 25 are integrally provided near both sides of the inner surface of the standing plate portion 24a, as shown in FIG. 14.

In the bracket 24, a corner portion 27d between the straight plate portion 27b and the stopper plate portion 27c is freely rotatably held by the bearing members 28, 28 via the support shaft 29. Further, the bracket 27 is wound around the support shaft 29 and is energized and rotated counterclockwise in FIG. 15, by a twisted coil spring 30 that is installed between the bracket 27 and the standing plate portion 24a.

Thus, the lid 26 comes into contact with the front surface of the standing plate portion 24a to close the opening 25. In this state, the lid 26 closes the table pulling in and out opening 21 of the outer frame 3.

Next, a description will be made for an arm for releasing a pinched lens.

Figure 11:
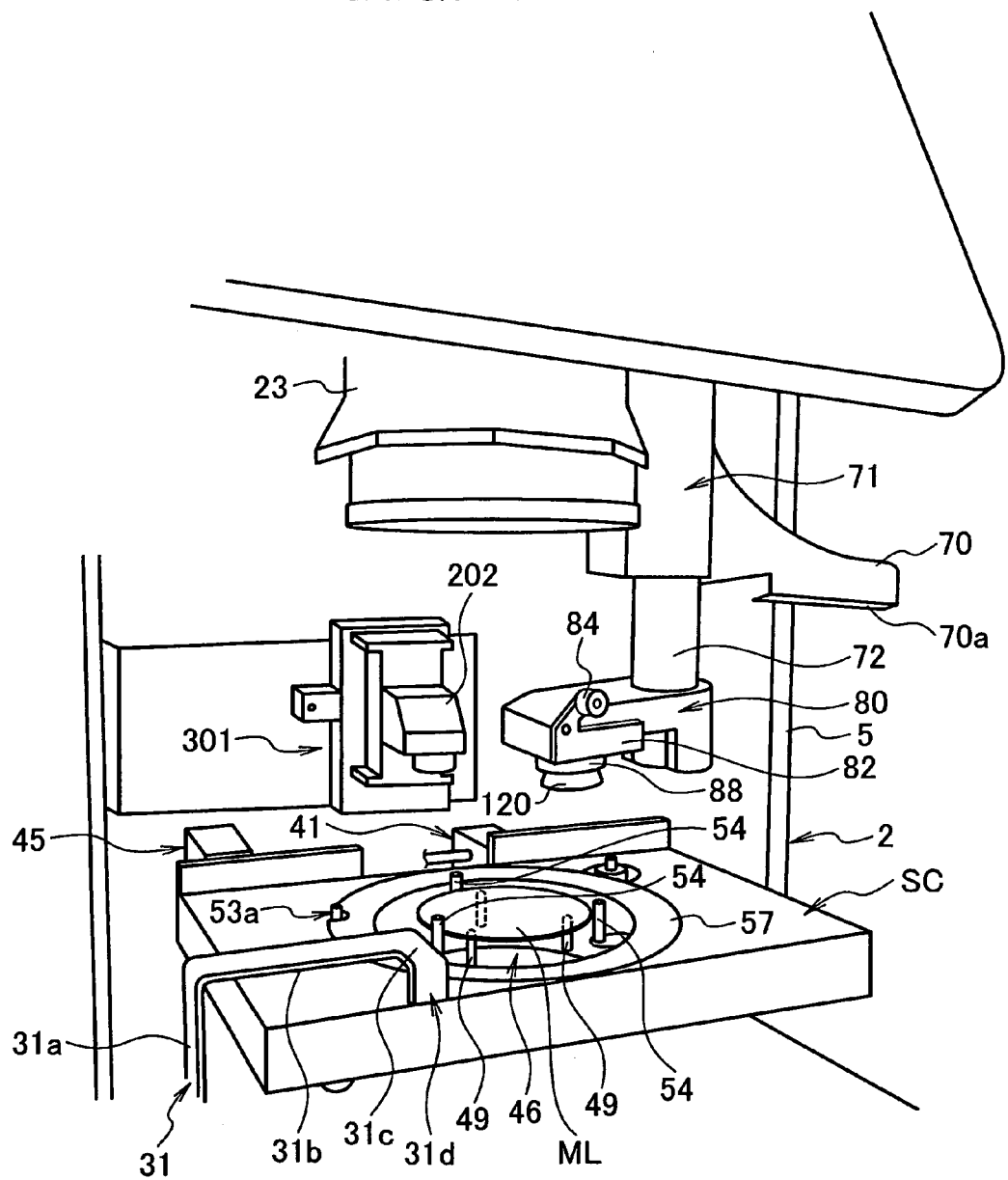
FIG. 11 is an explanatory view of an action of the jig installing apparatus shown in FIG. 10.
Figure 13:
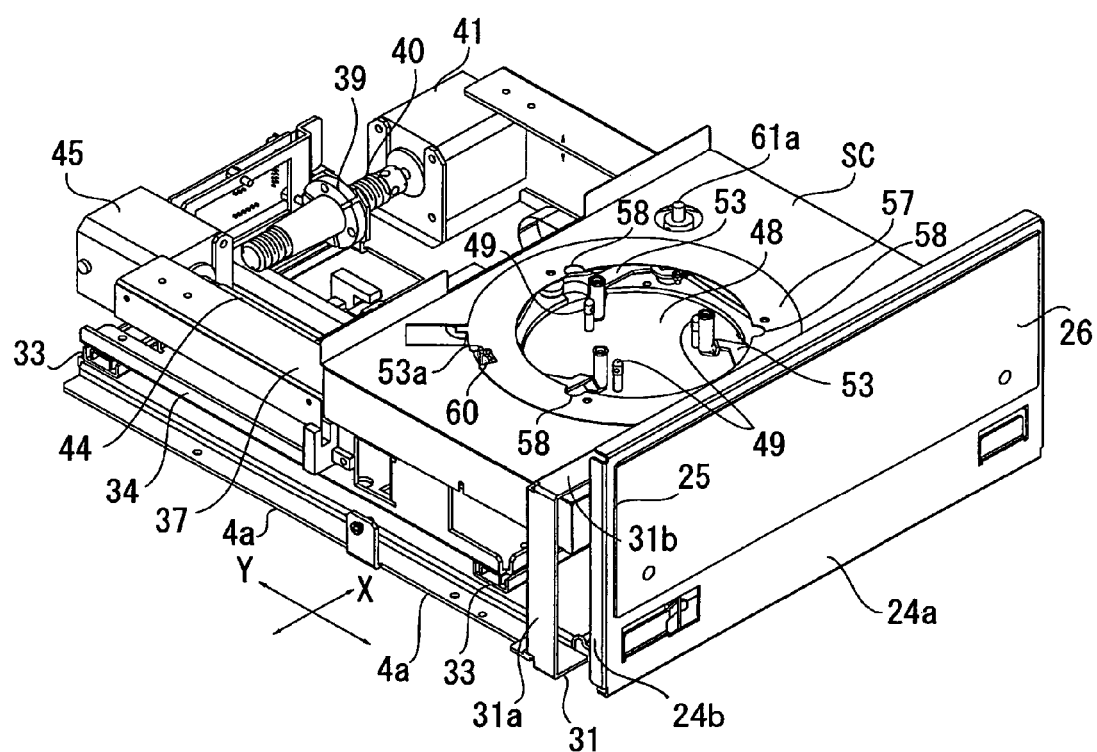
FIG. 13 is a perspective view of a lens holder shown in FIGS. 10 and 11.

On the one side portion of the base plate 4a, an arm 31, which is positioned to be closer to the lid 26 and is used for releasing the pinched lens, is fixed, as shown in FIG. 13. The arm 31, as shown in FIGS. 11 and 14, has a standing portion 31a, a horizontal portion 31b extending along the lid 26 from the upper end of the standing portion 31a, a plate portion 31c extending from the tip of the horizontal portion 31b to the lid 26, and a stopper nail portion 31d extending downward from the tip of the plate portion 31c.

The lens holding/moving mechanism of the lens is as follows.

A lens holding/moving mechanism 32 is arranged on the base plate 4a, as shown in FIG. 15. The lens holding/moving mechanism 32, as shown in FIGS. 13, 15, and 16, contains a lateral guide rail (X-direction guide rail) 33 arranged on the rear end portion of the base plate 4a and near the arm 31, a laterally moving member (X-direction moving member) 34 arranged on the lateral guide rail 33, and a bearing 35 that supports the laterally moving member 34 freely movably in a lateral direction (X-direction) on the lateral guide rail 33. Further, the above-described drive motor 107 is attached to the laterally moving member 34.

Figure 17:
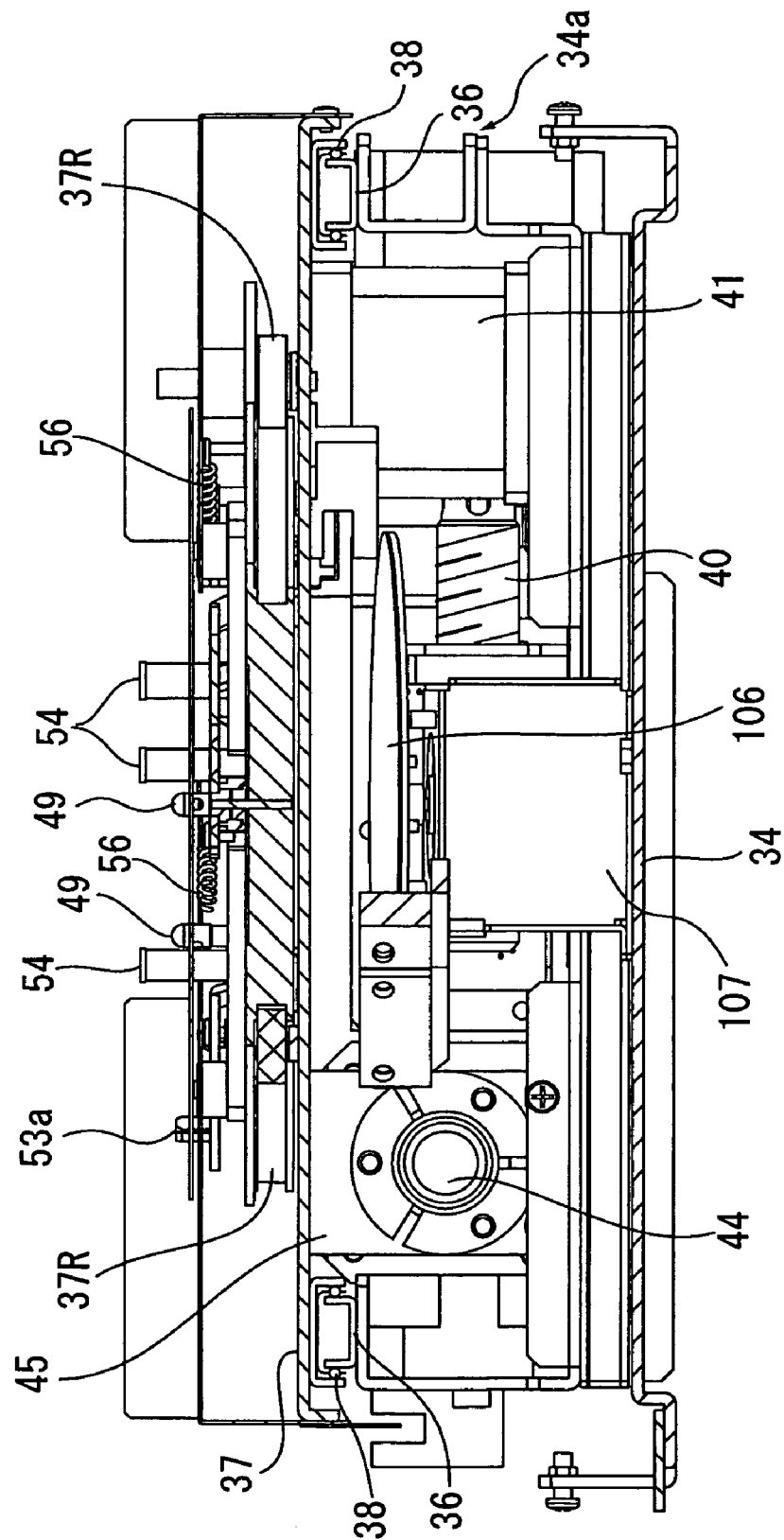
FIG. 17 is a sectional view taken along A2-A2 line of FIG. 14.

FIG. 17 is a sectional view taken along A2-A2 line of FIG. 14. The lens holding/moving mechanism 32 has forward/backward guide rails 36, which as shown in FIG. 17 are fixed, respectively, on the ends over both sides of the frame 34a on the laterally moving member 34 in forward/backward (Y-direction that is vertical directions to the page of FIG. 17) directions, a plate-shaped forward/backward moving member (forward/backward moving stage and Y-direction moving member) 37 arranged on the guide rail 36, and bearings 38 that freely movably support the forward/backward moving member 37 on the guide rails 36 in forward/backward directions. The above-described drive motor 107 is mounted on the laterally moving member 34.

As shown in FIG. 13, a nut member 39 is fixed to the laterally moving member 34, and a lateral feeding screw (X-feeding screw) 40 whose axis line is directed in a lateral direction is screwed into the nut member 39. The lateral feeding screw 40 is rotated by a pulse motor (X drive motor) 41 fixed on the laterally moving member 34.

A disk-shaped light transmission hole 42 is formed in the forward/backward moving member 37, because the drive motor 107 is mounted to the rotary reflection plate 106, as shown in FIG. 16.

A nut member is fixed at the forward/backward moving member 37 through a bracket 37a and a fixed screw 37b, as shown in FIG. 15, whereas a forward/backward feeding screw (Y-feeding screw) 44 whose axis line is directed to the forward/backward directions is screwed into the nut member 43. The forward/backward feeding screw 44 is rotated by a pulse motor (Y-drive motor) 45 fixed on the laterally moving member 34.

A lens holder (lens holding unit) 46 is provided over the light transmission hole 42 of the forward/backward moving member 37, as shown in FIG. 16.

The lens holder 46, as shown in FIG. 16, has a ring-shaped gear 47 for which a support flange 47a is provided under the inner circumference surface. The ring-shaped gear 47 has a gear portion 47b that extends in a circumference direction on a circumference surface and a circular groove 47c.

Figure 18A:
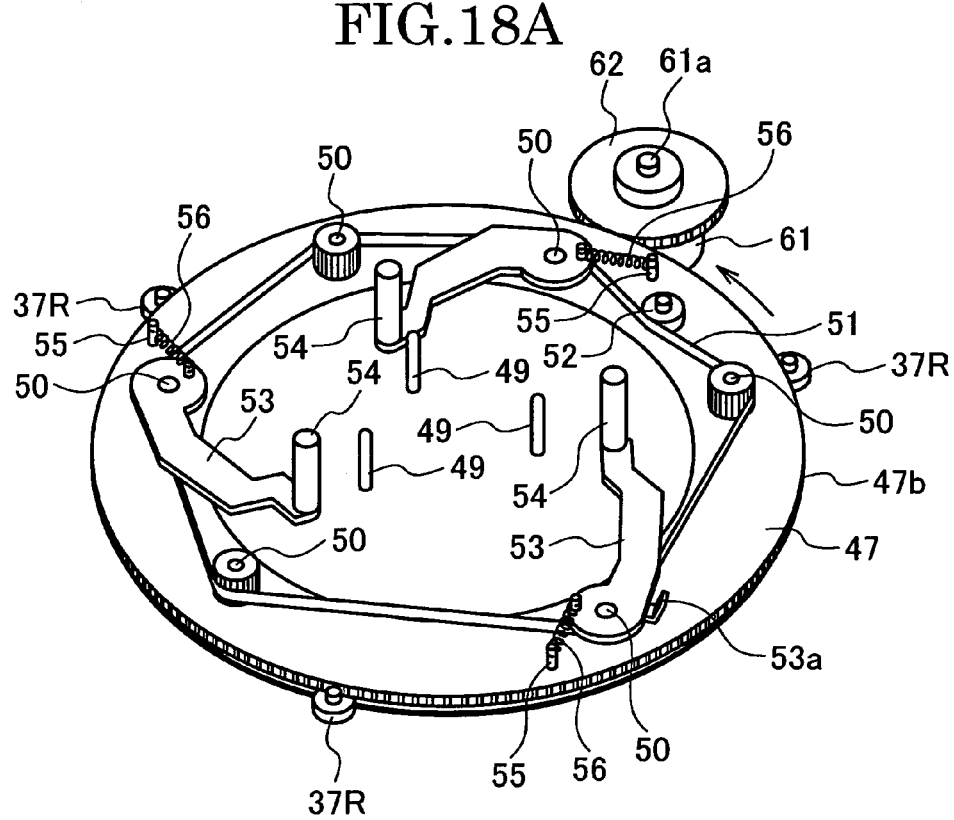
FIG. 18A is a perspective view for explaining a principal portion of the lens holder.
Figure 18B:
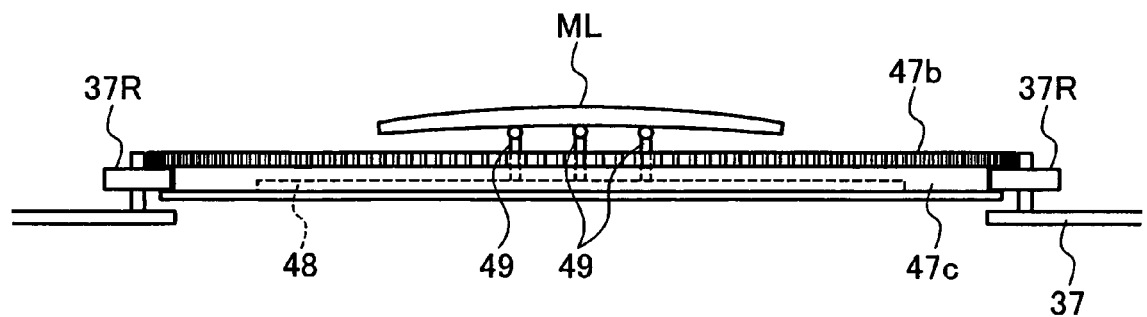
FIG. 18B is a sectional view of the lens holder in FIG. 18A.

A plurality of rollers 37R, which are freely rotatably attached on the forward/backward moving member 37, are engaged with the circular groove 47c, as shown in FIG. 18B. The plurality of rollers 37R is arranged along the light transmission hole 42, and freely rotatably holds the ring-shaped gear 47 for the forward/backward moving member 37.

The lens holder 46 has a transparent disk 48 for supporting the lens, which is fitted in the ring-shaped gear 47 and is freely removably supported on the support flange 47a, and a shaft-shaped lens receiver 49 provided on the transparent disk 48 in a protruded manner with a space of 120°. Note that the transparent disk 48 may be glass or plastic.

Six small gears 50, which are arranged with an equal pitch (a space of 60°) in a circumference direction, are attached freely rotatably on the ring-shaped gear 47, and a timing belt 556 is hooked around the six small gears 51, as shown in FIG. 18A. Moreover, a tension roller 52, which is attached freely rotatably to the ring-shaped gear 47, comes into contact with the outer circumference surface of the timing belt 51.

One end portion (base end portion) of an arm 53 is severally fixed to every other small gear 50, and a lens-holding shaft (lens holding member) 54 extending in the vertical direction is attached to the other end portion (tip portion) of each arm 53.

A spring receiving pin 55 is attached on the ring-shaped gear 47 closer to one end portion of the arm 53, and a coil spring 56 is provided between the spring receiving pin 55 and one end portion of the arm 53. The coil spring 56 energizes the arm 53 such that the tip portion of the arm 53 turns around the center of the ring-shaped gear 47.

The end portions of the small gears 50 and the arms 53 having has such a constitution are covered by a cover ring 57 as shown in FIGS. 13 and 14. The cover ring 57 is fixed to the ring-shaped gear 47 by screws 58.

Engaging cutouts 59 that engage the lens-holding shafts 54 are formed on the inner circumference surface of the cover ring 57 with a space of 120° in the circumference direction. Furthermore, a cutout 60 is formed on the outer circumference surface of the cover ring 57.

Moreover, an engaging protrusion 53a protruding upward from the cutout 60 is formed on one end portion of one of the three arms 53.

In addition, an attaching angle setting motor 61 that consists of a pulse motor is fixed to the forward/backward moving member 37, and a gear 62 is attached to an output shaft 61a of the attaching angle setting motor 61. The gear 62 is engaged with the gear portion 47b of the ring-shaped gear 47. Therefore, rotation of the gear 62 by the attaching angle setting motor 61 rotates the ring-shaped gear 47.

The forward/backward moving member 37 is covered by a stage cover SC except for the area of the lens holder 46.

Figure 19:
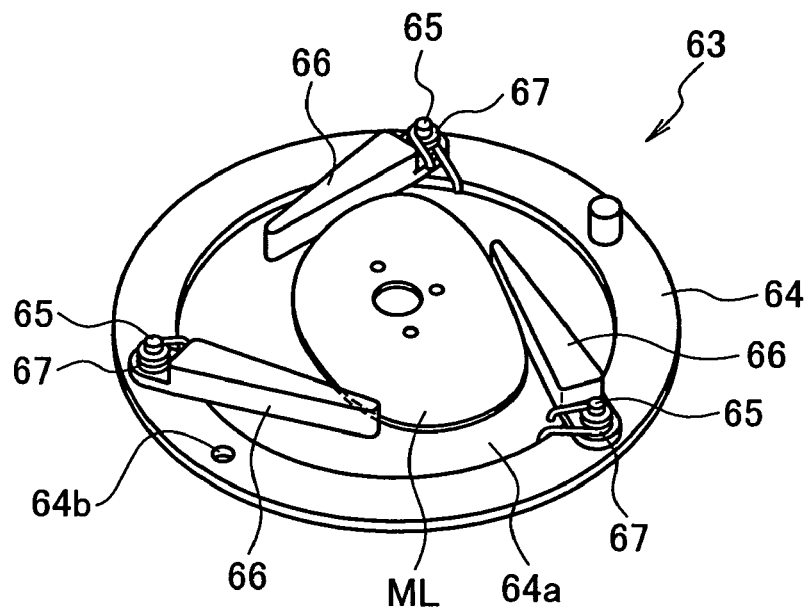
FIG. 19 is a perspective view of a frame-changing lens holder.
Figure 20:
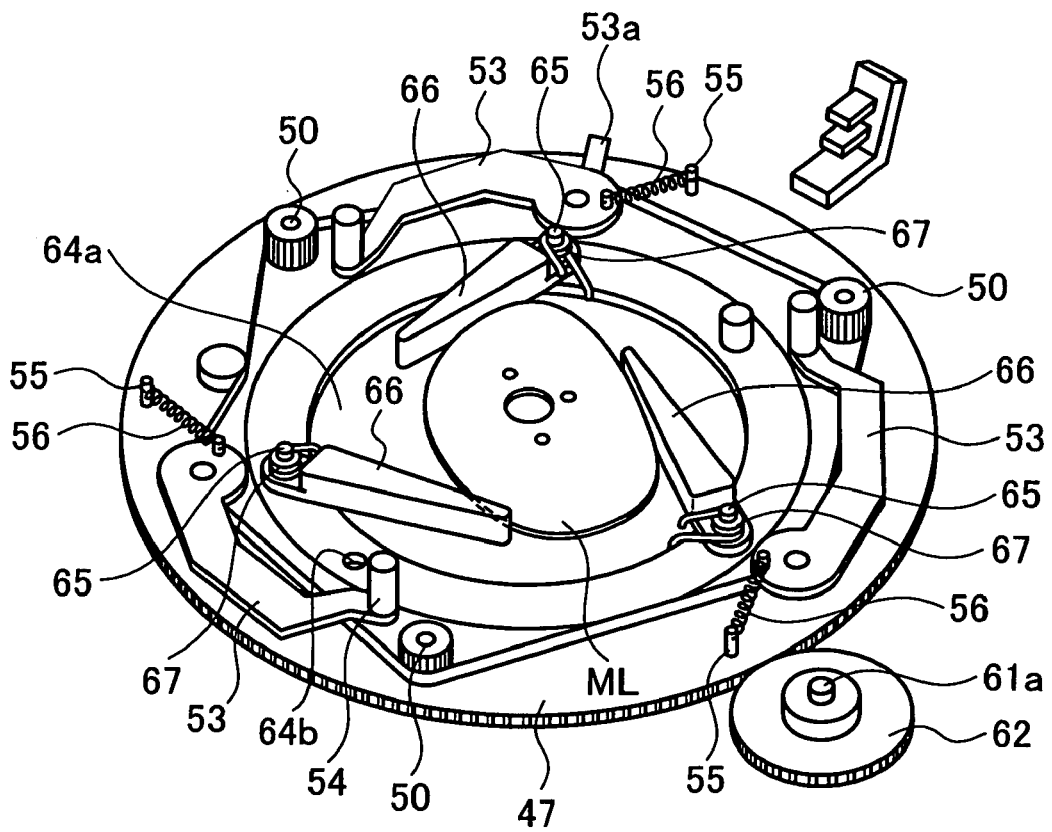
FIG. 20 is a perspective view showing a state where the frame-changing lens holder shown in FIG. 19 is installed inside a ring-shaped gear of the lens holder shown in FIG. 17.

Instead of the lens supporting transparent disk 48 having the above-described lens receiver 49, it is also possible to removably attach a frame-changing lens holder 63 shown in FIG. 19, to the ring-shaped gear 47 shown in FIG. 20.

The frame-changing lens holder 63 includes a ring-shaped frame 64 having the same outer diameter as the outer diameter of the transparent disk 48, a transparent disk 64a fixed in the ring-shaped frame 64, three (plural) support shafts 65 provided on the ring-shaped frame 64 in a protruded manner with an equal pitch (120° space), lens-holding arms (lens-holding member) 66 whose one end portion (base end portion) is freely rotatably attached to the support shaft 65, and coil springs 67 that energize the other end portion (tip portion) of the lens-holding arms 66 toward the center of the ring-shaped frame 64. Note that the lens-holding arms 66 are formed in a tapered shape toward the tips.

Such ring-shaped frame 64, formed thicker than the above-described transparent disk 64a, is fitted detachably into the ring-shaped gear 47 in the state where the lens-holding shafts 54 of the above-described arms 53 are placed on the ring-shaped gear 47, as shown in FIG. 20. Accordingly, the lens-holding shafts 54 do not move into the ring-shaped frame 64 by hitting the outer circumference surface of the ring-shaped frame 64. In this occasion, the ring-shaped frame 64 is supported on the flange 47a of the ring-shaped gear 47 in FIG. 16.

Note that reference numeral 64b denotes a through hole provided in the ring-shaped frame 64 for frame change, so that the through hole is used for detecting the frame-changing lens holder 63.

The lens suction mechanism is installed to the side plate 5 of the frame 2, as shown in FIGS. 10 and 11.

The lens suction mechanism 68 has a bracket 69 shown in FIGS. 10, 21, 23 and 24. The bracket 69 is formed into a U-shape by an upper supporting plate portion 69a, a lower supporting plate portion 69b, and a vertical plate portion 69c that connects the upper and lower supporting plate portions 69a and 69b, as shown in FIGS. 10, 21, 23 and 24.

Moreover, attaching pieces 69d and 69d are integrally and vertically provided at the upper and lower portions on one side of the vertical plate portion 69c. The bracket 69 is fixed to the side plate 5 by attaching the attaching pieces 69d and 69d to the side plate 5, which is provided with the frame 2 shown in FIGS. 10 and 11, using screws (not shown).

Figure 22:
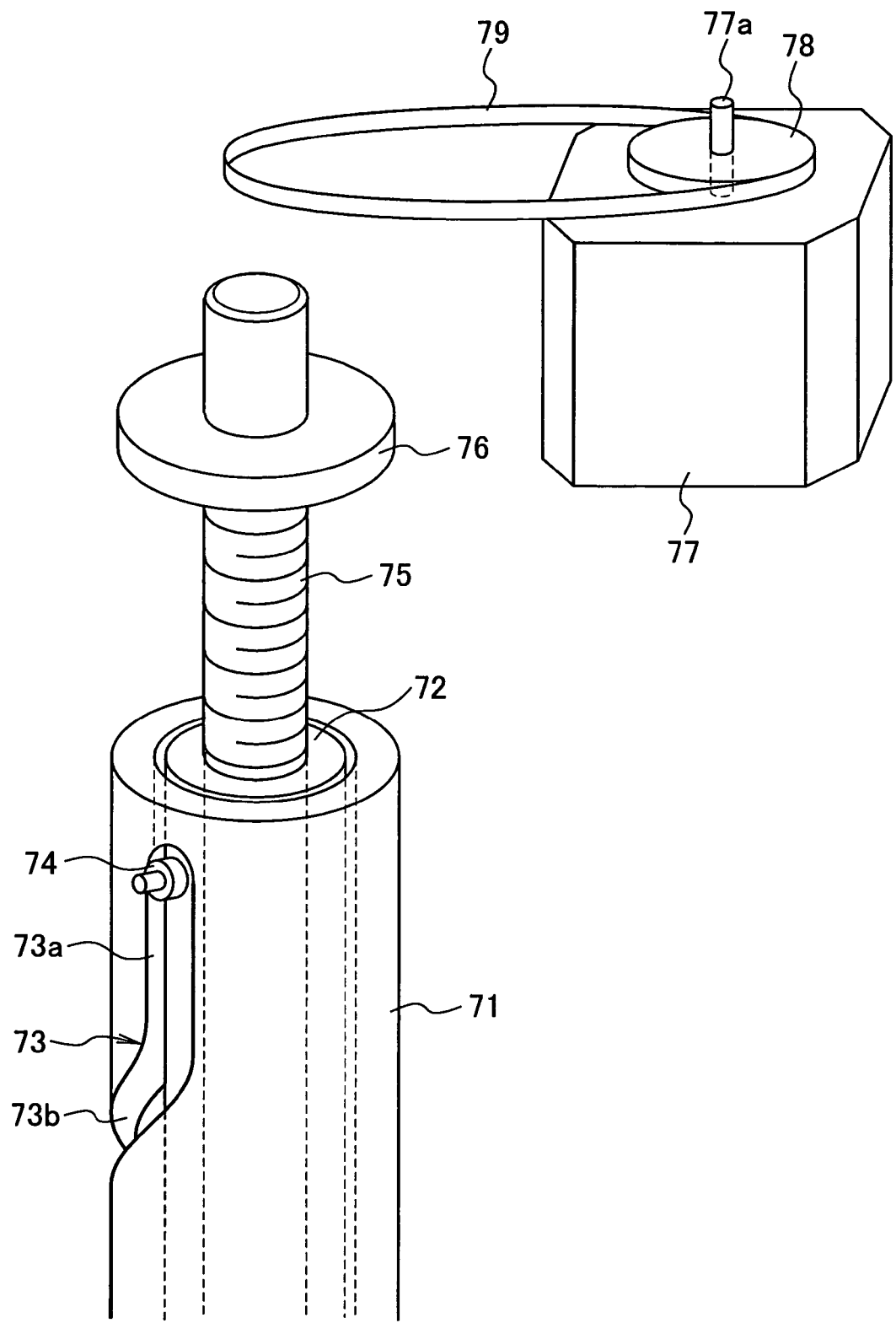
FIG. 22 is a partially exploded perspective view showing the lens suction mechanism shown in FIG. 21.

The lens suction mechanism 68 contains a fixed arm 70 attached to a front direction at the lower portion of the front surface of the vertical plate portion 69c, a cam cylinder 71 whose upper and lower ends is fixed at the upper and lower supporting plate portions 69a and 69b by a fixing device such as a screw (not shown), and a female screw cylinder 72 that is engaged with the cam cylinder 71 shown in FIG. 22 in order to rotate freely and rise and fall freely (free vertical movement). The lower end of the female screw cylinder 72 protrudes downward through the lower supporting plate portion 69b.

Figure 21:
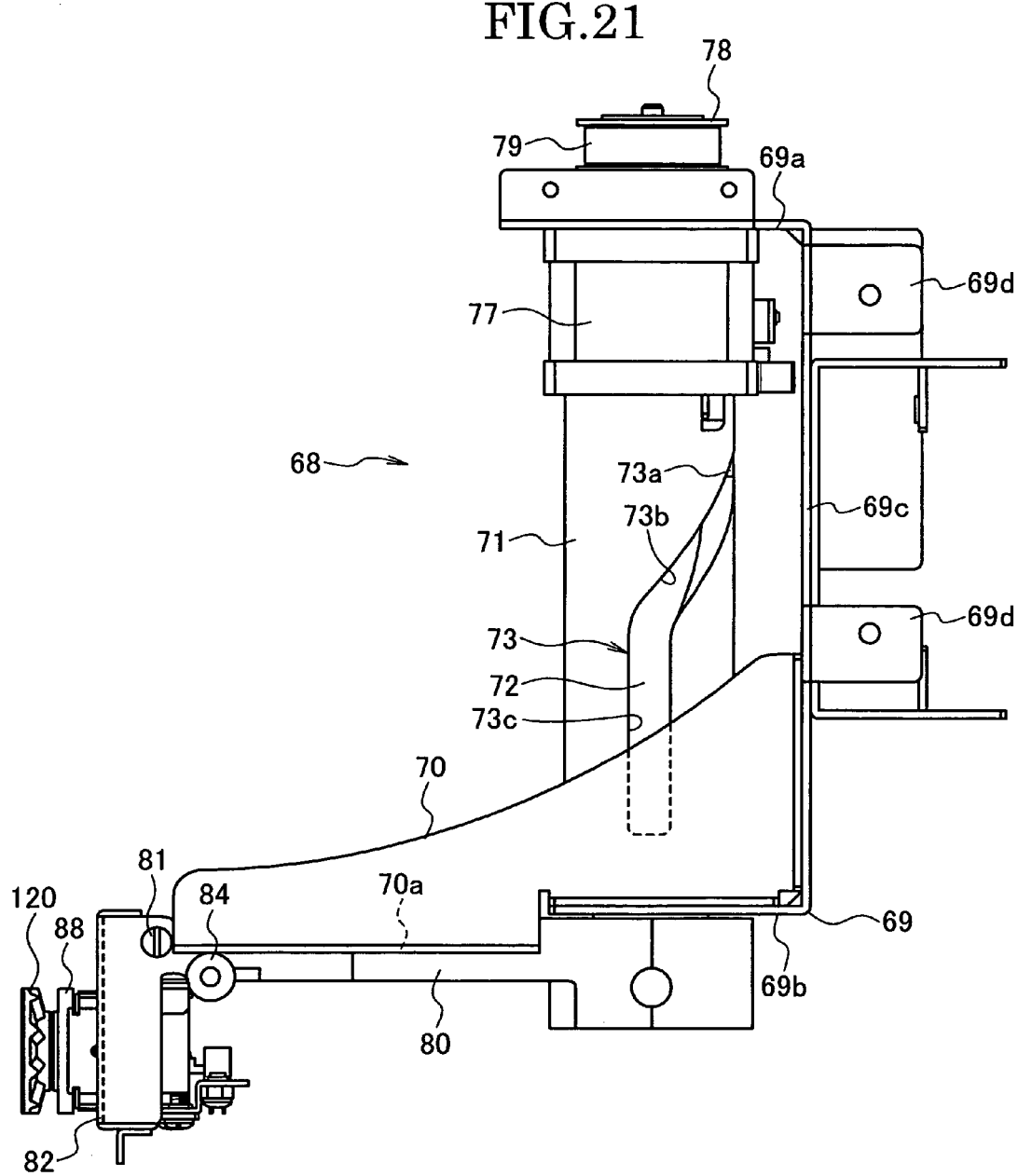
FIG. 21 is a side view showing a lens suction mechanism shown in FIG. 10.

A cam slit (guide slit) 73 extending upward and downward is formed in the cam cylinder 71, as shown in FIGS. 10, 21, and 22. The cam slit 73 includes an upper vertical slit portion 73a shown in FIG. 21, a spiral slit portion 73b formed downward distorting 90° in a spiral way from the lower end of the upper vertical slit portion 73a, and a lower vertical slit portion 73c formed linearly to the lower portion of the cam cylinder 71 from the lower end of the spiral slit portion 73b.

A guide roller 74 is held so as to be freely rotatable near the upper end portion of the outer circumference surface of the female screw cylinder 72, as shown in FIG. 22. It is the guide roller 74 that is arranged in the cam slit 73.

The female screw cylinder 72 has a male screw axis 75 attached freely rotatably extending to the lower supporting plate portion 69b through the upper supporting plate portion 69a. The male screw axis 75 is held to be freely rotatable with respect to the upper supporting plate portion 69a and to be incapable of moving to the axis line direction (the upper and lower direction).

The upper end portion of the male screw axis 75 has a pulley 76 fixed. In addition, the lower surface of the upper supporting plate portion 69a has a drive motor 77 attached. The output axis 77a of the drive motor 77, which protrudes upward through the upper supporting plate portion 69a, has a pulley 78 fixed. The pulleys 76 and 78 have a timing belt 79 wound around.

The lower end part of the male screw axis 75 has a movable arm 80 fixed extending horizontally. The movable arm 80 is constructed to face toward the front when the guide roller 74 is in the upper vertical slit portion 73a of the cam slit 73, and is constructed to face toward a lateral direction (X direction) and a left direction of FIG. 6 when the guide roller 74 is in the lower vertical slit portion 73c of the cam slit 73.

Figure 23:
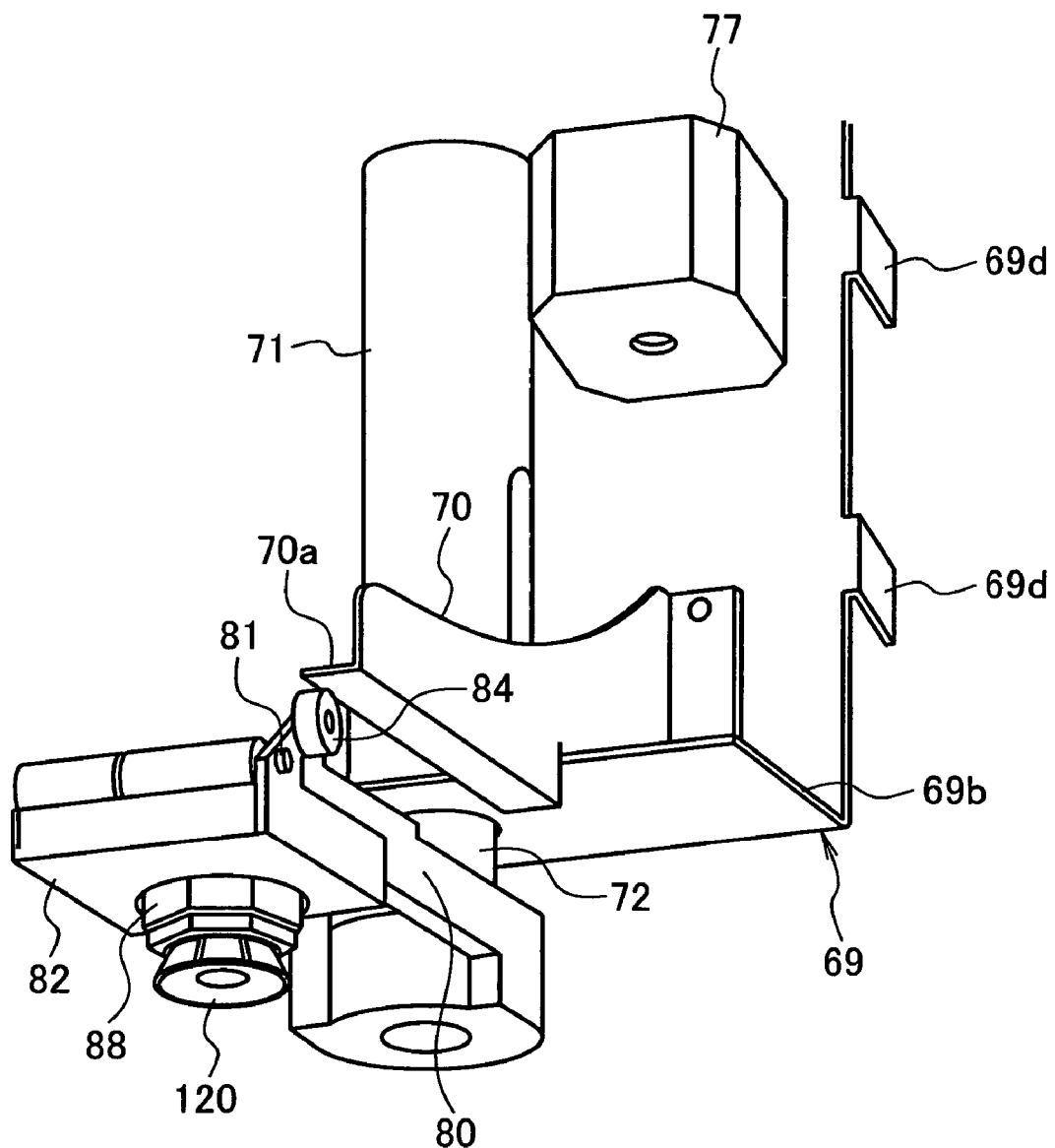
FIG. 23 is a view explaining an operation of the lens suction mechanism shown in FIGS. 21 and 22.
Figure 24:
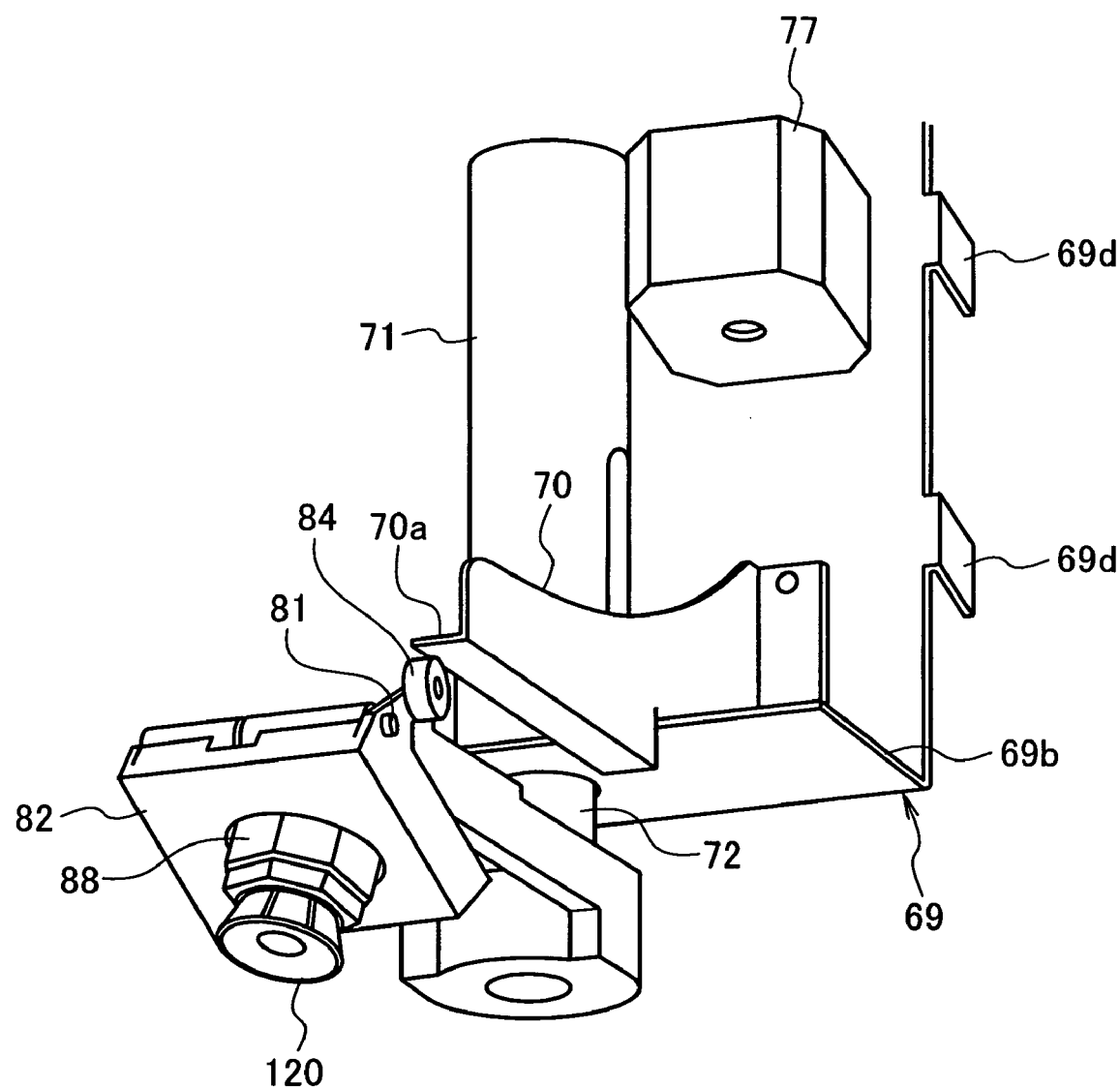
FIG. 24 is a view explaining an operation of the lens suction mechanism shown in FIGS. 21 and 22.

A movable bracket (movable member) 82 is held freely rotatably at the tip portion of the movable arm 80 via a support shaft 81 extending vertically and horizontally to the extending direction of the movable arm 80, as shown in FIGS. 21, 23 and 24.

A twisted coil spring 83 wound around the support shaft 81 is installed between the movable bracket 82 and the movable arm 80, as shown in FIGS. 25-29. The twisted coil spring 83 is energized in a direction where the movable bracket 82 is folded to the lower surface side of the tip portion of the movable arm 80, as shown in FIG. 23.

A roller 84 is held freely rotatably on the side surface of the base end portion of the movable bracket 82. The roller 84, when the movable arm 80 is elevated in the state where it faces toward the front, is designed to come into contact with the horizontal plate portion (stopper plate portion) 70a provided with the lower end of the fixed arm 70 and rotate the movable bracket 82 to a vertical state, resisting the spring force of the twisted coil spring 83, as shown in FIG. 21.

Furthermore, a suction jig holding device 85 is installed to the movable bracket 82.

Figure 27A:
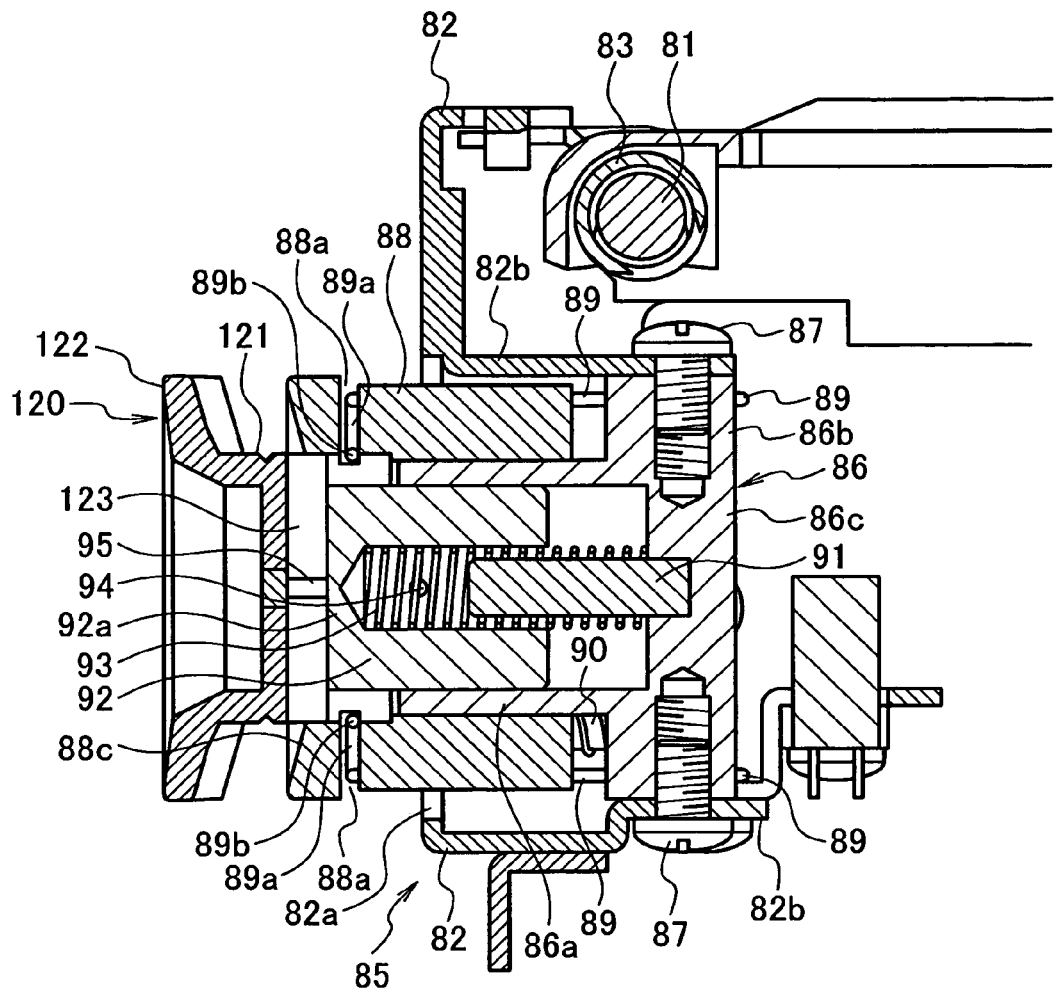
FIG. 27A is a sectional view of the suction jig holding unit shown in FIG. 20, taken along the center line.
Figure 29:
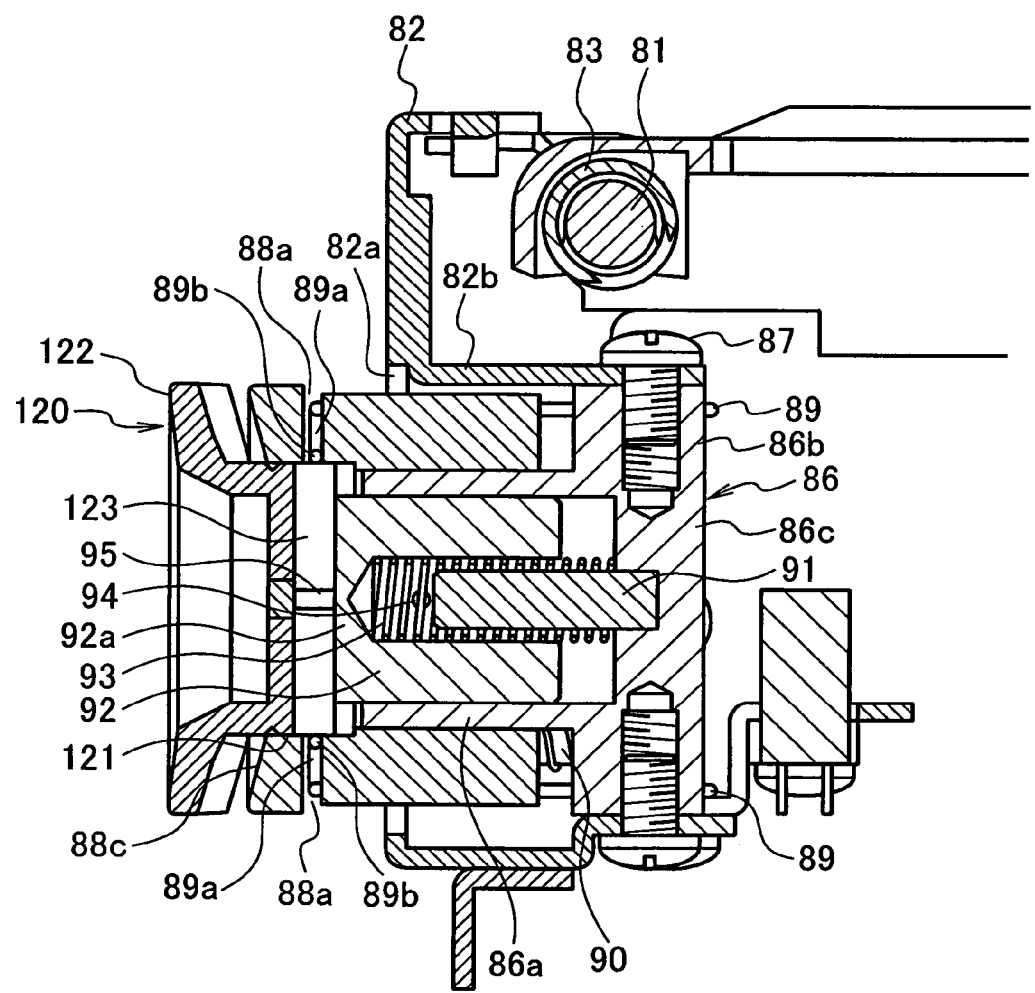
FIG. 29 is a perspective view of the suction jig holding unit when an attaching shaft portion of the lens suction jig shown in FIG. 27 is inserted more deeply.

The suction jig holding device 85 contains a holder main body 86 where a cylinder portion 86a is inserted into the through hole 82a of the bracket 82, and screws 87 and 87 that fix the flange 86b of the holder main body 86 to the facing pieces 82b and 82b of the bracket 82, as shown in FIGS. 27A and 29.

The cylinder portion 86a protruded from the through hole 82a is provided with the holder main body 86, and an external cylinder 88 is movably fitted to the outer circumference of the cylinder portion 86a.

Figure 27B:
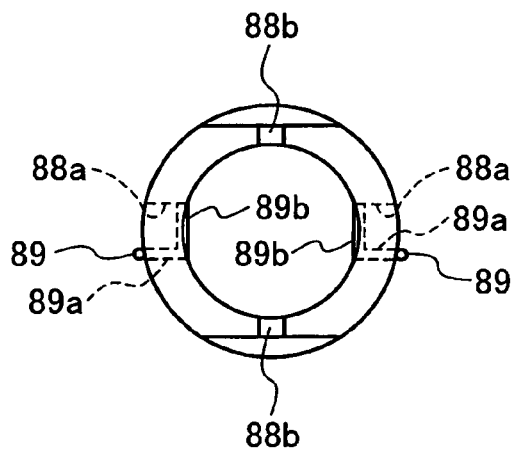
FIG. 27B is a plan view of an external cylinder shown in FIG. 27A.
Figure 27C:
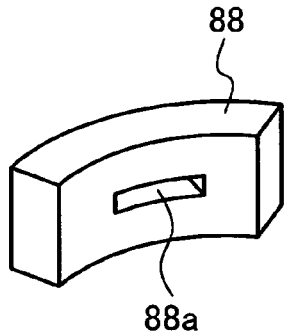
FIG. 27C is a partially perspective view of the external cylinder shown in FIG. 27B.

Slits 88a, as shown in FIGS. 27B and 27C, are formed in the external cylinder 88 with a space of 180°, and the bent portions 89a and 89a of the other end of the linear springs 89 and 89, whose one end portions are held by the holder main body 86, are arranged for each slit 88a. The bent portion 89a is provided with straight portions 89b, whose circumference surface is partly protruded from the slit 88a into the external cylinder 88, as shown in FIGS. 27B and 27C.

A coil spring 90 is installed between the holder main body 86 and the external cylinder 88, and energizes the external cylinder 88 and the holder main body 86 in the left direction in FIG. 27A. A spring-supporting shaft 91 whose one end portion is fixed to the end wall 86c of the cylinder portion 86a is disposed concentrically in the cylinder portion 86a of the holder main body 86.

Furthermore, a sliding cylindrical body 92 of a cylindrical shape having a bottom is freely movably fitted in the cylinder portion 86a in the axis line direction, and the spring-supporting shaft 91 is inserted into the sliding cylindrical body 92 with a play.

One end portion side of the coil spring 93 is inserted into the sliding cylindrical body 92, with the friction maintained. In addition, the spring-supporting shaft 91 is inserted into the coil spring 93, and the other end portion of the coil spring 93 is tightly held at the end portion of the end wall 86c side of the spring-supporting shaft 91.

Figure 28A:
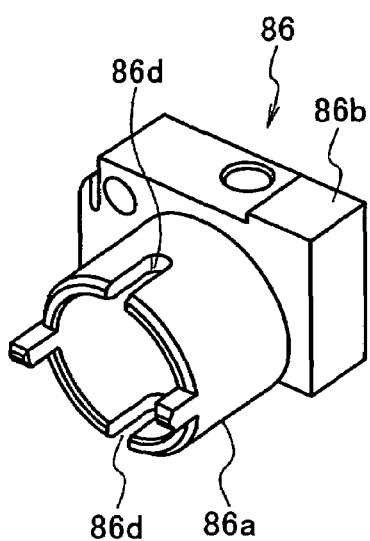
FIG. 28A is a perspective view of a holder main body shown in FIG. 26.
Figure 28B:
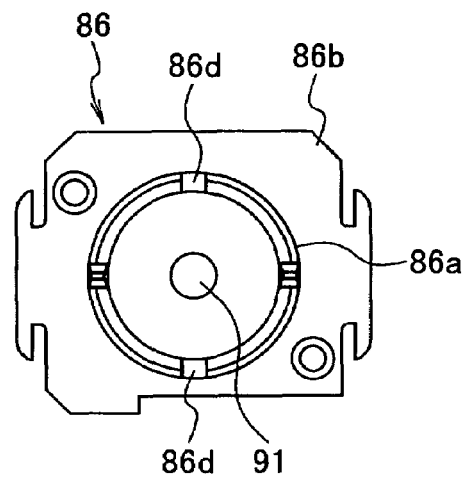
FIG. 28B is a plan view of the holder main body shown in FIG. 28A seen from a cylinder side.
Figure 28C:
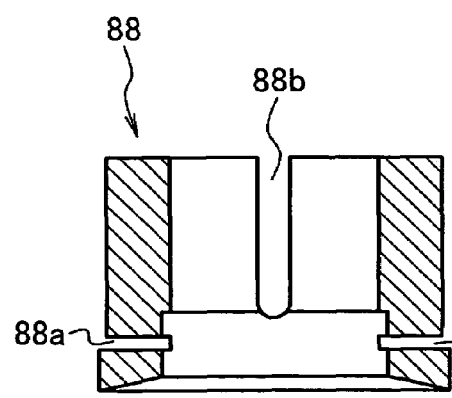
FIG. 28C is a sectional view taken along the axis line of the external cylinder shown in FIG. 22.

Furthermore, cutout guides 86d and 86d extending in a slit shape, which are open to the lower end, are formed in the cylinder portion 86a of the holder main body 86 with a space of 180°, as shown in FIGS. 28A and 28B. In addition to this, as shown in FIG. 27B and FIG. 28C, a slit-shaped cutout guide 88b, which is open to the upper end, is formed in the external cylinder 88.

Figure 26:
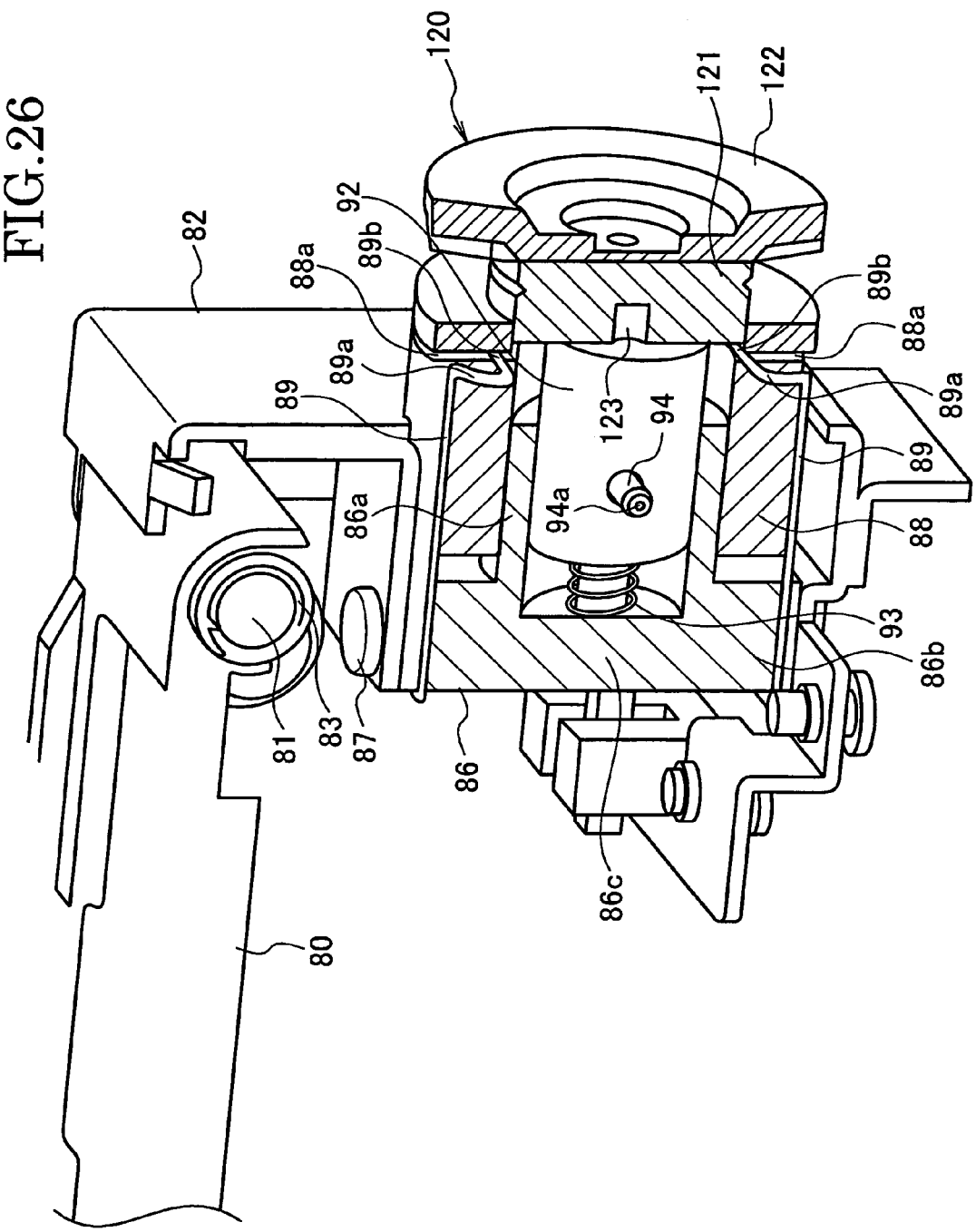
FIG. 26 is a partially sectional view of the suction jig holding unit shown in FIG. 21, taken along the center line.
Figure 28D:
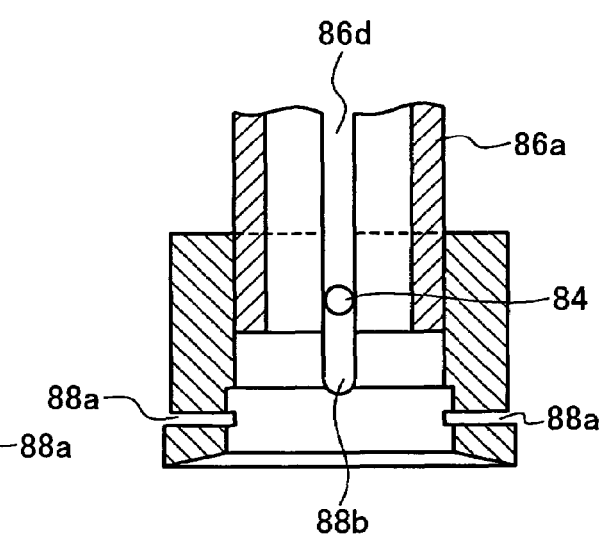
FIG. 28D is a sectional view when the cylinder shown in FIG. 28A is fitted with the external cylinder shown in FIG. 28C.
Figure 30:
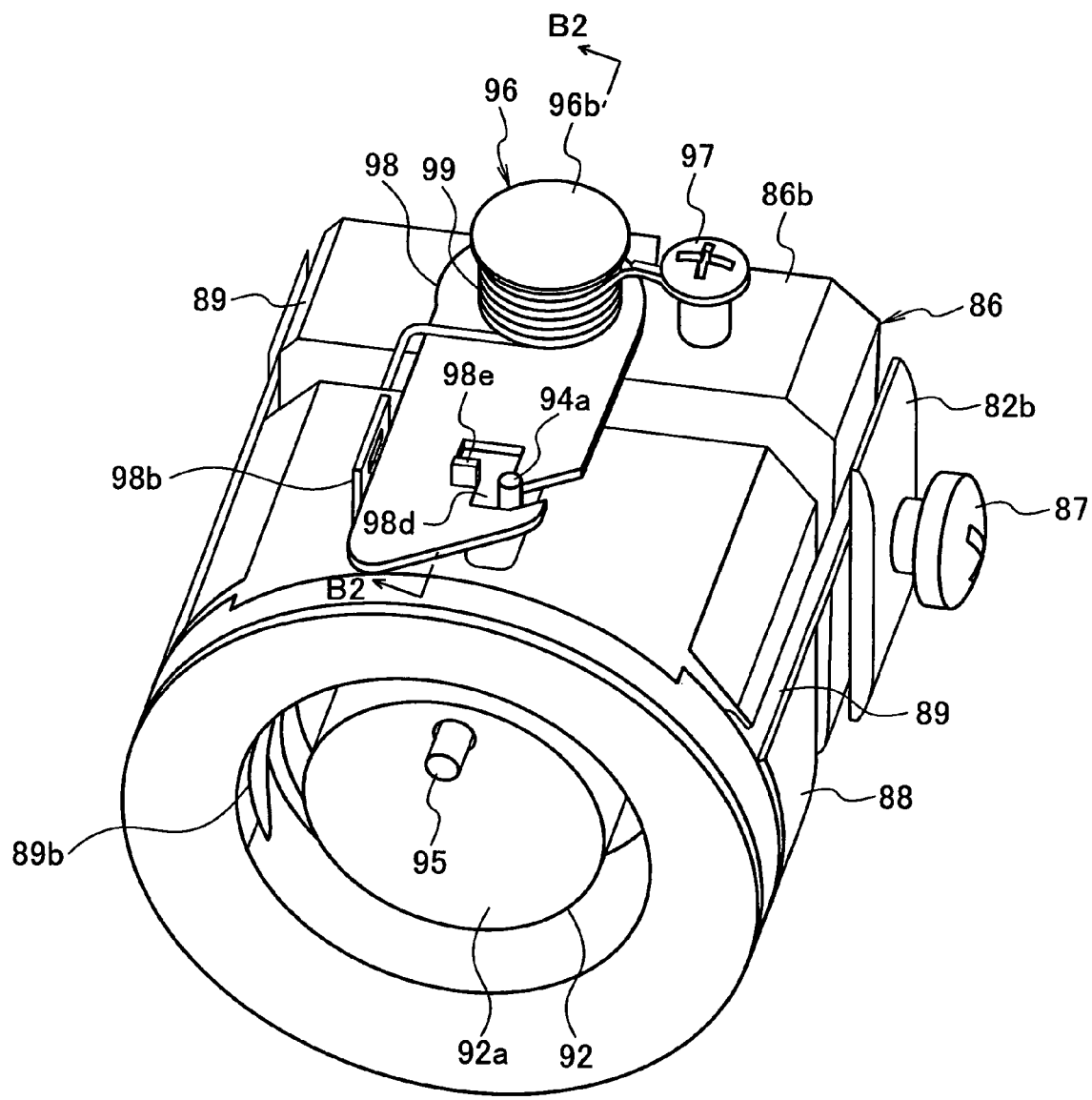
FIG. 30 is a perspective view for explaining a stopper hook of the suction jig holding unit shown in FIG. 27.

The cutout guides 86d and 88b are constructed to be identical with each other, as shown in FIGS. 27 and 28D. In the cutout guides 86d and 88b, a guide shaft 94 shown in FIGS. 26 and 27A is inserted into the outer circumference surface of the sliding cylindrical body 92. As shown in FIG. 30, a positioning pin 95 is provided with the end wall 92a of the sliding cylindrical body 92 to protrude from the end wall 92a. A taper concave portion 88c is formed on the outer end portion of the external cylinder 88.

Figure 36:
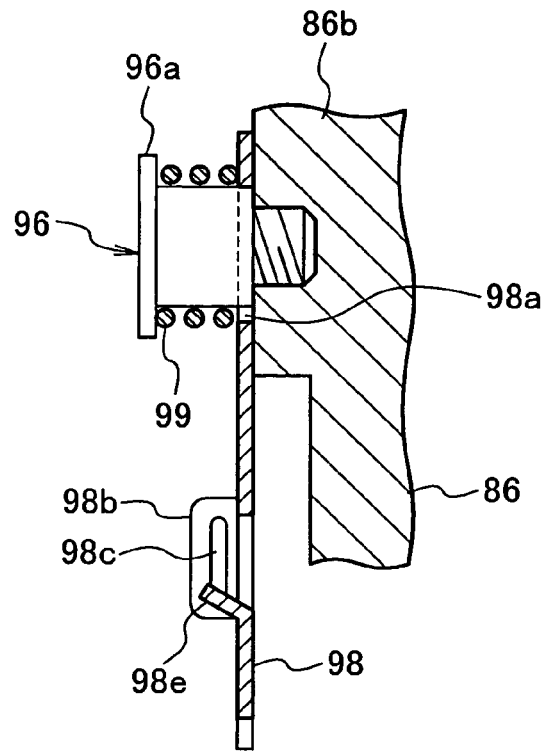
FIG. 36 is a partially sectional view taken along the line B2-B2 of FIG. 30.

As shown in FIGS. 30 and 36, a hook-supporting shaft 96 is fixed to the flange 86b of the holder main body 86 by screwing, and a spring receiving screw 97 is screwed down adjacent to the hook-supporting shaft 96. Reference numeral 96a denotes the flange of the hook-supporting shaft 96.

The hook-supporting shaft 96 is inserted into a shaft inserting hole 98a of a plate-shaped stopper hook 98 with a play, as shown in FIG. 36, and supports the stopper hook 98 to the flange 86b. On one side portion of the stopper hook 98 is formed a spring stopper protrusion 98b, where a slit 98c is formed.

The both end portions of a coil spring 99 fitted to the outer circumference of the hook-supporting shaft 96 are stopped by the spring receiving screw 97 and in the slit 618c. The coil spring 99 energizes the stopper hook 98 counter-clockwise seen on FIG. 30, and is positioned between the flanges 86b and 96a to slightly press the stopper hook 98 against the flange 86b.

Figure 31:
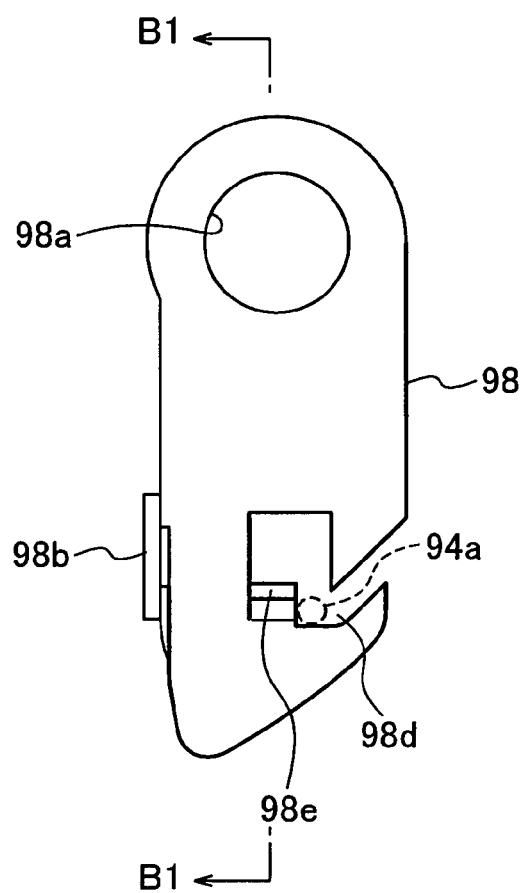
FIG. 31 is a front view of the stopper hook shown in FIG. 30.
Figure 32:
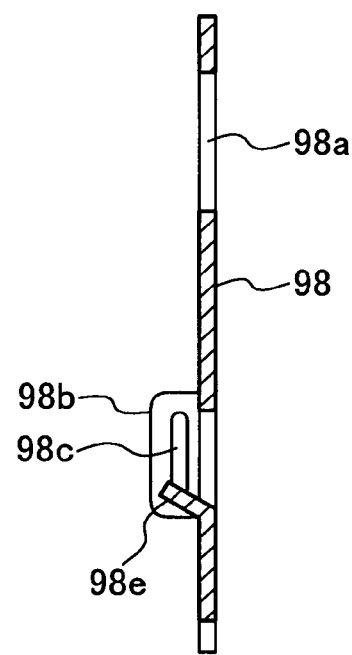
FIG. 32 is a sectional view taken along the line B1-B1 of FIG. 31.
Figure 33:
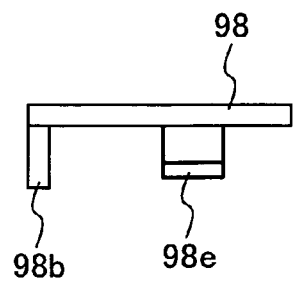
FIG. 33 is a plan view of the stopper hook shown in FIG. 31.

A stopper cutout 98d is formed in the stopper hook 98, as shown in FIGS. 30-32, and an inclined guide piece 98e is formed on an edge portion opposite to the direction of rotation of the stopper cutout 98d. A small-diameter shaft portion 94a at the tip of the guide shaft 94, which is attached on the outer circumference surface of the sliding cylindrical body 92, is inserted into the stopper cutout 98d.

As shown in FIG. 26, the lens suction jig 120 of FIG. 1 contains an attaching shaft portion 121, and a cup portion 122 made of elastic member such as rubber and soft synthetic resin, which is integrally provided with the attaching shaft portion 121. A positioning groove 123, which is open to an end surface and a circumference surface, is formed to the attaching shaft portion 121. The attaching shaft portion 121 is designed to be closely fixed into the external cylinder 88.

The above-described liquid crystal display device 11 (display device) is controlled by the operation control circuit 130 (display control device and image processing device) shown in FIG. 6.

The operation control circuit 130 is constituted to control the pulse motor (X-drive motor) 41, the pulse motor (Y-drive motor) 45, the attaching angle setting motor 61, the light source 103, the drive motor 107, and a light source 307.

A switch operating signal from the operating panel 110 and an image signal (measurement signal) from the CCDs 115, 205, and 313 are input to the operation control circuit 130.

The operation control circuit 130 controls an image processing circuit 131 as an image processing device based on an image signal (measured signal) from the CCDs 115, 205, and 313 to provide image processing with an image detected with respect to a single-focal lens ML shown in FIG. 38A, and detects the marking 410 printed on the lens surface of the single-focal lens ML to provide the process that seeks a position (eye-point position) P on the lens ML for attaching the lens suction jig 120. Then, the operation control circuit 130 provides the image processing with an image detected in terms of a bi-focal lens ML shown in FIG. 39 to detect the contour 421 of the segment 420 possessed by the bi-focal lens ML and perform the process for obtaining an eye-point position P. Moreover, the operation control circuit 130 performs the image processing for an image detected regarding a progressive multi-focal lens ML shown in FIG. 40 to detect the hidden marks 441 and 442 inscribed in the progressive multi-focal lens ML and perform the process for finding an eye-point position P.

The operation control circuit 130 stores into the memory 132 the coordinates of the eye-point position P obtained in this way.

The processing of obtaining the eye-point position P by the operation control circuit 130 is performed automatically based on a processing procedure established beforehand. Moreover, the lens ML is automatically moved so that the eye-point position P obtained can be a loading position for the lens suction jig 120.

On the other hand, when a progressive multi-focal lens ML is sucked by the lens suction jig 120, the hidden marks 441 and 442, there may be a case where an index for finding an eye-point position can not be detected by the above-mentioned automatic processing. When one of the hidden marks 441 and 442 is detected, or when none of the hidden marks 441 and 442 is detected, an eye-point position cannot be detected and the lens ML can not be automatically moved, either.

Accordingly, the operation control circuit 130 of the lens suction jig installing apparatus 1 of one embodiment in accordance with the invention includes the processing for determining a lens ML position by a manual operation.

Figure 41:
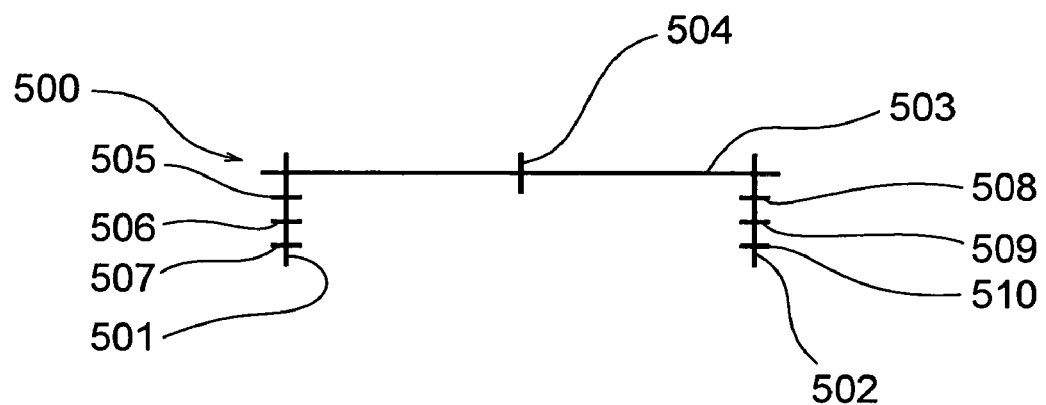
FIG. 41 is a diagram for showing a position determination cursor.

That is, the operation control circuit 130 as a display control device controls the following items in the liquid display device 11 as a display device, as shown in FIG. 41:

Two vertical lines 501 and 502 extending vertically with the same space (=34 mm) as the space (for example, specified as 34 mm) between the two hidden marks 441 and 442 formed on the lens ML; a horizontal line 503 extending horizontally orthogonal to the two vertical lines 501 and 502; a central vertical line 504, orthogonal to the horizontal line 503, passing through a center of the horizontal line 503 between the two vertical lines 501 and 502; and a position determining cursor 500, orthogonal to two vertical lines 501 and 502, integrated by three auxiliary lines of lines 505-510 placed on each of the two vertical lines 501 and 502 with an identical space (for example, 2 mm).

Figure 42:
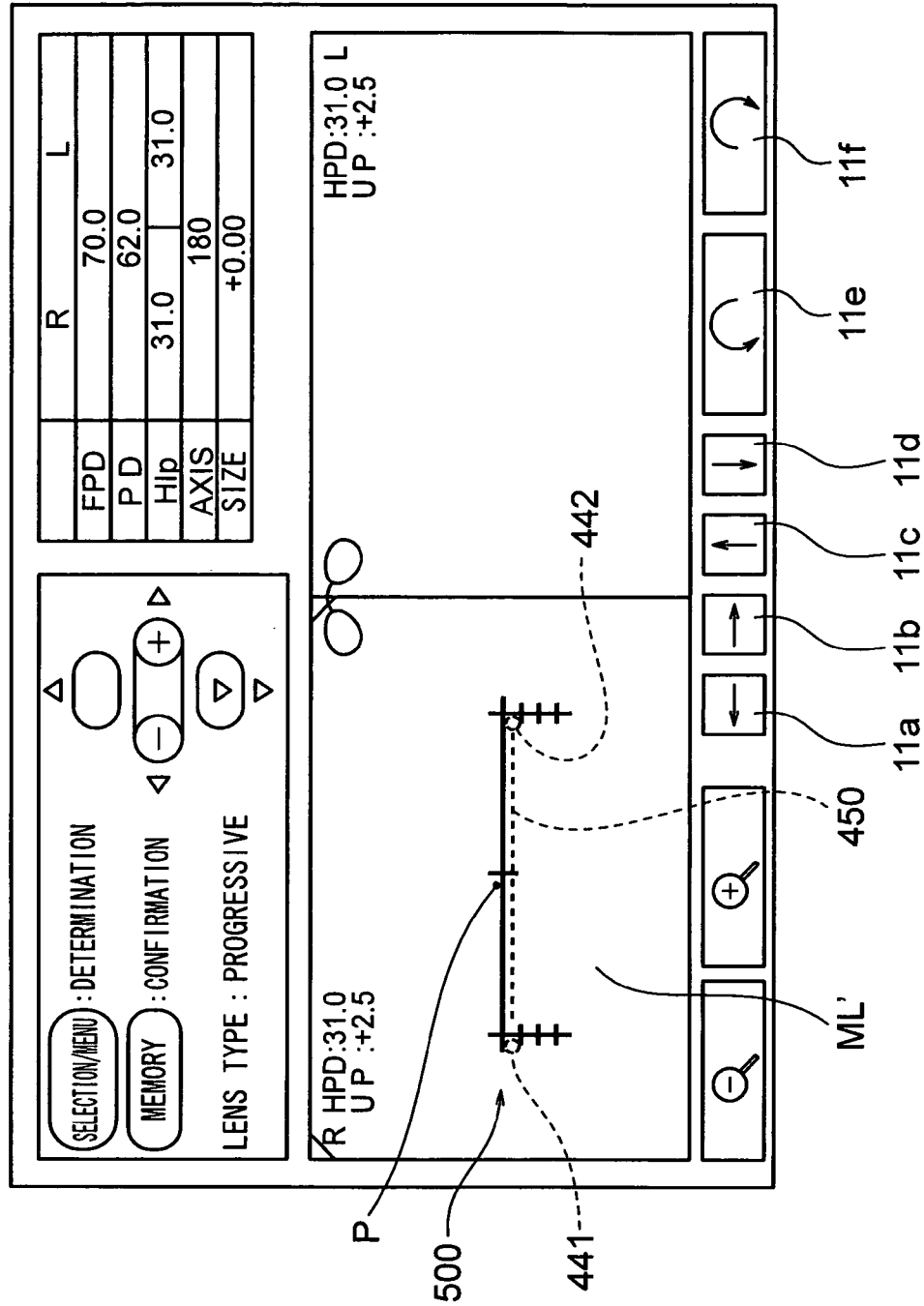
FIG. 42 is a diagram for showing a display surface in which a position determination cursor is overlapped on a lens.

The items, as shown in FIG. 42, are displayed to overlap with an image ML' of the lens ML.

When one of the hidden marks 441 and 442 (for example, the hidden mark 441) is detected by the above described automatic detection processing (processing designated by the flow chart of FIG. 43) for the hidden marks and the other (for example, the hidden mark 442) is not, an eye-point position of the lens ML can be properly set to a position that the movable arm 80 attaches the lens suction jig 120, by moving the lens ML or the cursor 500, so that an operator performs, through his naked eyes, the position settings for the cursor 500 displayed, the hidden mark 441 detected, and the horizontal line 450 for a print display on the display surface of the liquid display device 11.

On the other hand, when neither of the hidden marks 441 and 442 by the automatic detection processing for the hidden marks described above are found, an eye-point position of the lens ML can be properly set to a position that the movable arm 80 attaches the lens suction jig 120, by moving the lens ML or the cursor 500, so that an operator looks for either the hidden mark 441 or the hidden mark 442 through his naked eyes and performs the position settings for the cursor 500 displayed, the hidden mark 441 or 442 detected, and the horizontal line 450 for a print display on the display surface of the liquid display device 11.

Next, a description is given of the function of the lens suction jig installing apparatus 1 of one embodiment in accordance with the invention.

FIG. 1 shows the state before detecting the hidden marks of the spectacle lens, performing refraction measurement of the spectacle lens.

In this state, as shown in FIG. 22, the guide roller 74 of the lens suction mechanism 68 is located in the upper end portion of the upper vertical slit portion 73a of the cam slit 73, which is provided with the cam cylinder 71, and the female screw cylinder 72 is located in the highest elevated position.

Under the situation, the movable arm 80 attached to the lower end portion of the female screw cylinder 72, as shown in FIGS. 10 and 21, is located in the highest elevated position. The roller 84 of the movable bracket 82, as shown in FIG. 21, comes into contact with the horizontal plate portion 70a of the fixed arm 70. The movable bracket 82 faces downward as shown in FIG. 23, resisting the spring force of the twisted coil spring 83 shown in FIG. 25.

In this state, the movable bracket 82 faces the aperture 22 for attaching the suction device. Therefore, an operator inserts the attaching shaft portion 121 of the lens suction jig 120 from the aperture 22 into the external cylinder 88 provided for the movable bracket 82, as shown in FIGS. 26 and 27. In this occasion, the positioning pin 95 is inserted into a positioning groove 123 provided for the attaching shaft portion 121.

In pushing the attaching shaft portion 121, the sliding cylindrical body 92 is moved to the end wall 606c of the holder main body 86 by the attaching shaft portion 121, resisting the spring force of the coil spring 93.

After this, when the attaching shaft portion 121 of the lens suction jig 120 is further pushed into the external cylinder 88 so as to go over the straight portion 89b of the linear spring 89, the attaching shaft portion 121 pushes the straight portion 89b of the linear spring 89 into the slit 88a of the external cylinder 88, resisting the spring force of the folded portion 89a of the linear spring 89.

In this state, as shown in FIG. 29A, the straight portion 89b is pressed against the outer circumference surface of the attaching shaft portion 121 by the spring force of the folded portion 89a to hold the attaching shaft portion 121 in the external cylinder 88, so that the lens suction jig 120 does not fall downward even if the external cylinder 88 faces downward.

In such conditions, the small-diameter shaft portion 94a of the guide shaft 94 is positioned in the stopper cutout 98d of the stopper hook 98.

The lens holder 46 is exposed to the outside of the outer case 3 and the lens is mounted, as described below.

Next, when the automatic discrimination of FIG. 3 is selected by the operation to the function key F1 of the operating panel 10, and either one of the "left" switch 18L and the "right" switch 18R of FIG. 2 is selected, the pulse motor 45 is controlled by the operation control circuit 130 to rotate the forward/backward feeding screw 44 in a positive direction and move the nut member 43 and the forward/backward moving member 37 to the lid 402.

With the movement, the stage cover SC covering the forward/backward moving member 37, after coming into contact with the lid 402, opens the lid 26, resisting the spring force of the twisted coil spring 30 by turning the lid 26 in a clockwise direction around the support shaft 29 in FIG. 15, and goes outside the outer case 3 from the openings 25 and 21 to expose the lens holder 46 attached to the forward/backward moving member 37.

In this occasion, the engaging protrusion 53a of the lens holder 46 is engaged with the stopper nail portion 31d of the arm 31. The arm 53 integrally formed with the engaging protrusion 53a of FIG. 18A is turned in a clockwise direction together with the small gear 50 while resisting the spring force of the coil spring 56, to move the lens-holding shaft 54 of the arm 53 integrally formed with the engaging protrusion 53a to the cutout 60 of the cover ring 57 shown in FIG. 14.

With this movement, the timing belt 51 shown in FIG. 18A is rotated in a clockwise direction, and the remaining two other small gears 50 are also turned clockwise with the movement of the timing belt 52. The arm 53 integrally formed with the remaining two small gears 50 is turned in the clockwise direction, resisting the spring force of the coil spring 56, while the remaining two small gears 50 and the lens-holding shaft 54 of the arm 53 are moved to the cutout 60 of the cover ring 57 shown in FIG. 14.

In this way, while the three lens-holding shafts 54 are moved to the cover ring 57 and opened, the spectacle lens ML is mounted on the shaft-shaped lens receiver 49 of the lens holder 46, as shown in FIG. 18B.

After this, the operation control circuit 130 controls the pulse motor 45 to reversely turn the forward/backward feeding screw 44 and moves the nut member 43 and the forward/backward moving member 37 into the outer case 3.

With this movement, when the stage cover SC covering the forward/backward moving member 37 draws apart from the lid 402, the lid 26 is closed by being turned in a counter-clockwise direction in FIG. 15 around the support shaft 29 through the spring force of the twisted coil spring 30, and the openings 25 and 21 are closed by the lid 26.

In this occasion, when the engaging protrusion 53a of the lens holder 46 draws apart from the stopper nail portion 31d of the arm 31, the arms 53 integrally formed with the engaging protrusions 53a sown in FIG. 18A are turned in a counter-clockwise direction together with the small gears 50 by the spring force of the coil spring 56, and the lens-holding shafts 54 of the arms 53 integrally formed with the engaging protrusion 53a move to the center side of the cover ring 57 in FIG. 14.

With this movement, the timing belt 51 of FIG. 18A is rotated in a counter-clockwise direction, and the remaining two other small gears 50 are also turned in a counter-clockwise direction by the movement of the timing belt 52. The arms 53 integrally formed with the two small gears 50 are turned in a counter-clockwise direction by the spring force of the coil spring 56, and the lens-holding shafts 54 of the arms 53 integrally formed with the remaining two small gears 50 move to the center side of the cover ring 57 in FIG. 14.

Figure 34:
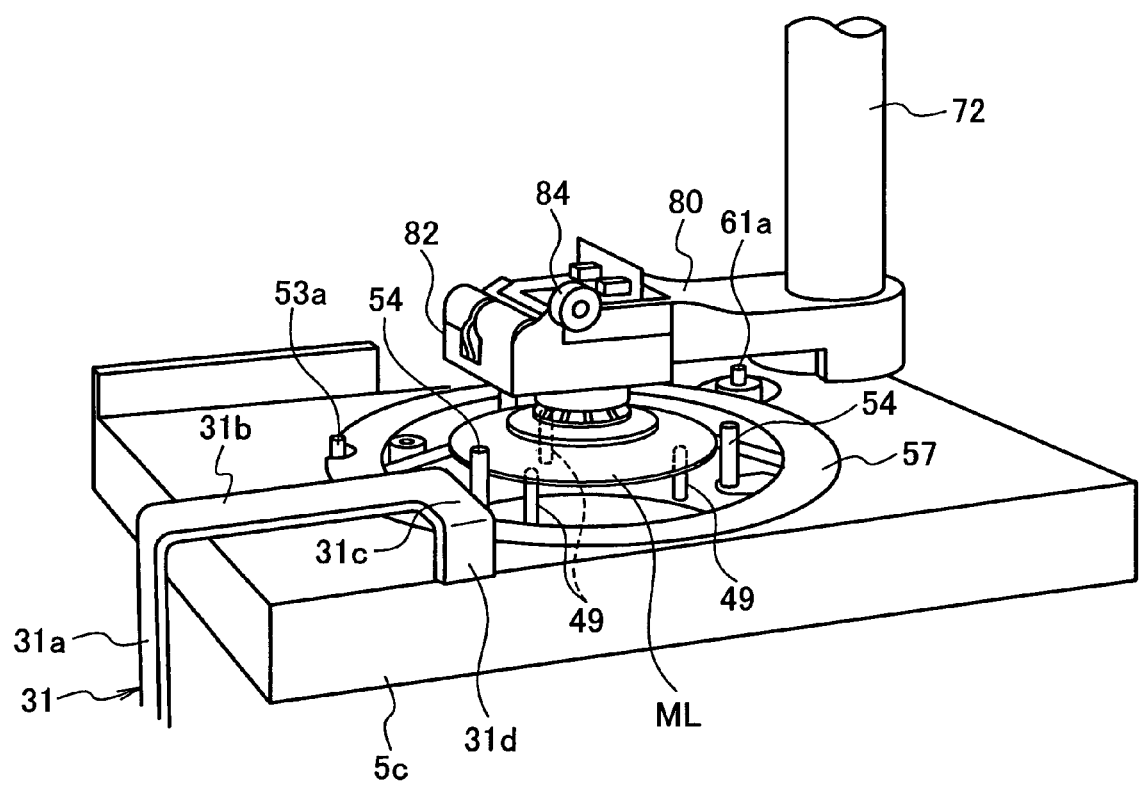
FIG. 34 is a perspective view showing the state where the lens suction jig is installed to the spectacle lens on the lens holder by the suction jig holding unit shown in FIG. 21.

In this way, the three lens-holding shafts 54 are moved to the center side of the cover ring 57 to come into contact with the circumference surface of the spectacle lens ML that is mounted on the shaft-shaped lens receiver 49 of the lens holder 46, and pinch (hold) the spectacle lens ML by the three lens-holding shafts 54, as shown in FIG. 34.

As described above, when the lens holder 46 is moved among the rotational reflection plate 106, the overall detection optical system 100 and the illumination optical system 101 of the hidden mark detection optical system 200 with the spectacle lens ML pinched (held) by the three lens-holding shafts 54, the operation control circuit 130 stops the operation of the pulse motor 45.

After this, the operation control circuit 130 turns the light source 103 on to emit infrared light from the light source 103, and on the other hand, controls the drive motor 34 to rotate the rotational reflection plate 106.

The infrared light from the light source 103 transmits the pinhole plate 104 and the half mirrors 112 and 202 to be incident on the collimating lens 105, which transforms the infrared light into a parallel optical flux. Then, the parallel optical flux is illuminated on the spectacle lens ML as an inspected lens.

By this illumination, the infrared light that has transmitted the spectacle lens ML is reflected by the rotational reflection plate 106 to become reflected light. A part of the reflected light, after transmitting the spectacle lens ML and the half mirror 202, is reflected by the half mirror 112. An image of the spectacle lens ML or the shaft-shaped lens receiver 49 is formed on the CCD 115 via the diaphragm plate 113 and an image capture lens 114.

When the hidden marks or paint marks are on the spectacle lens ML, their images are also formed on the CCD 115. The image signal from the CCD 115 is inputted to the operation control circuit 130.

When the operation control circuit 130 receives the image signal from the CCD 115, it makes the liquid display device 11 display the image of the lens ML.

After this, the operation control circuit 130 determines whether or not the lens ML is really held by the lens holder 46 (presence or absence of the lens ML). When it is determined that the lens ML is present, the operation control circuit 130 determines the types of the lens ML as to whether the lens ML is a single focal lens with a mark, the lens ML is a single focal lens without a mark, the lens ML is a bifocal lens, and the lens ML is a progressive multi-focal lens.

According to the type of the lens ML obtained by the determination, the detection of the eye-point position and the installment of the lens suction jig 120 are automatically performed.

When the type of the lens ML is a single focal lens without a mark, measurement by the CL measurement device 300 is performed, so that the detection of the eye-point position and the installment of the lens suction jig 120 are automatically performed.

An explanation will be given below of an automatic detection of the eye-point position in a progressive multi-focal lens ML.

Figure 43:
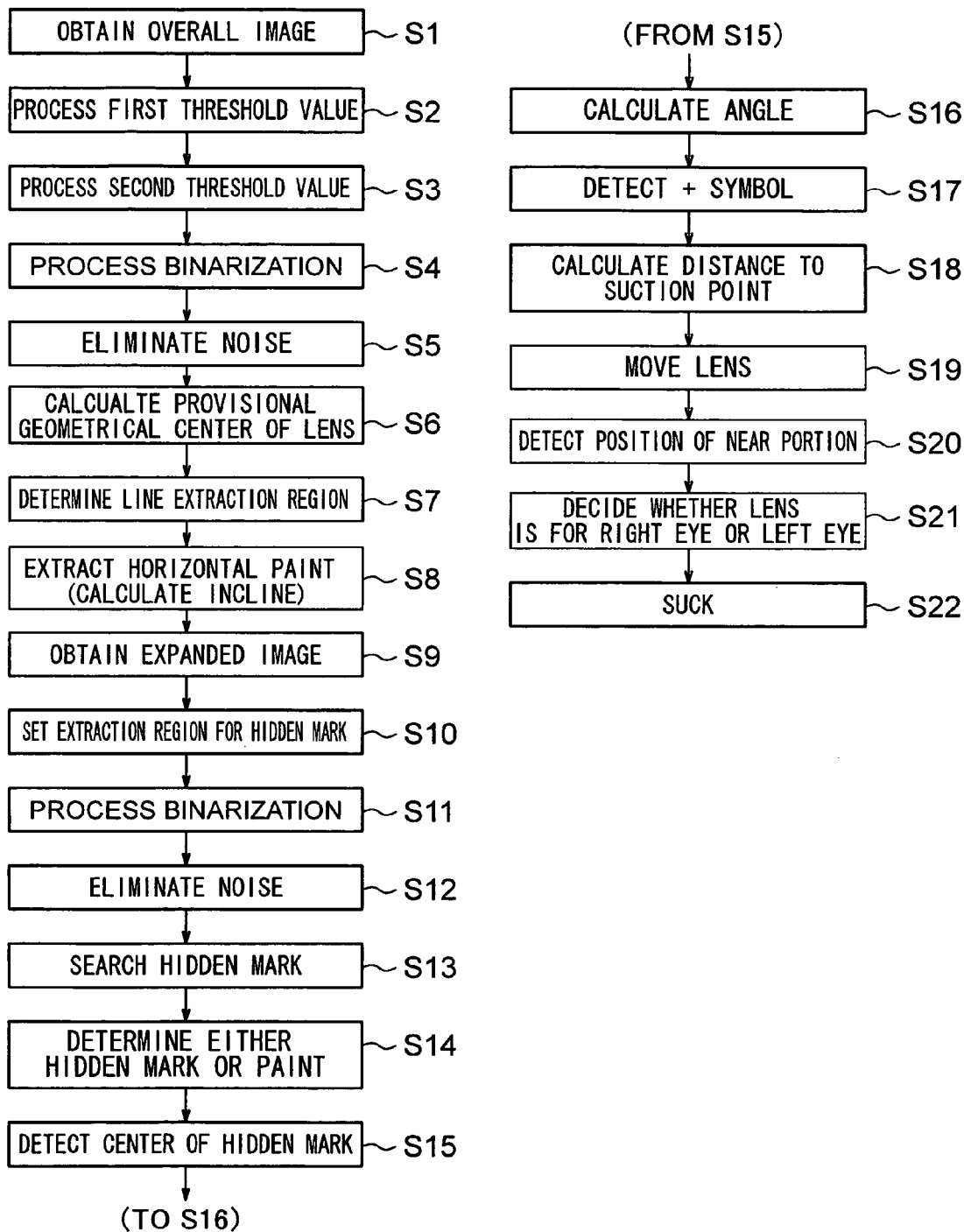
FIG. 43 is a flow chart for showing an automatic detection processing of a hidden mark.

Automatic detection of the hidden marks 441 and 442 and automatic processing of the installment (suction) of the lens suction jig 120 are conducted in a procedure illustrated in a flowchart of FIG. 43.

Figure 44A:
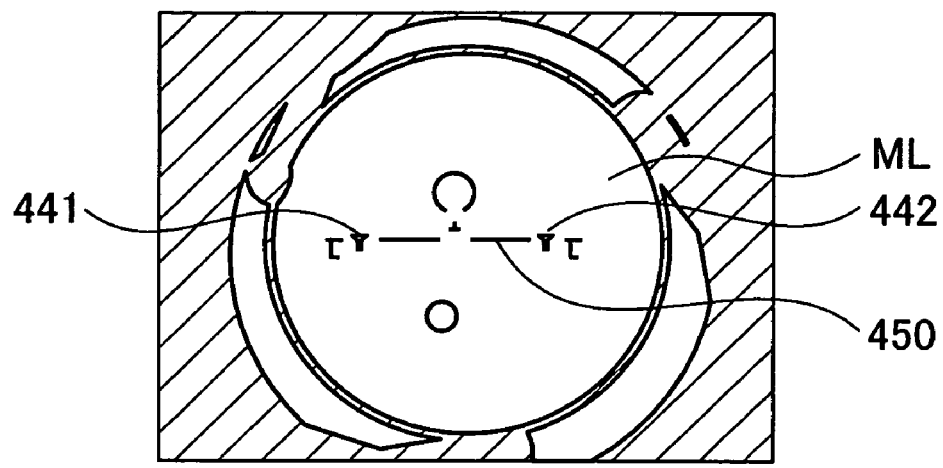
FIGS. 44A-44D are a first series of diagrams for showing lens images obtained by performing the flowchart shown in FIG. 43, respectively.

That is, first, the process of obtaining an overall image (S1) is performed. At this time, an image for representing the entirety of the lens ML is obtained, for example, as image data based on grey scale of 8 bits (0-255) (FIG. 44A).

Figure 44B:
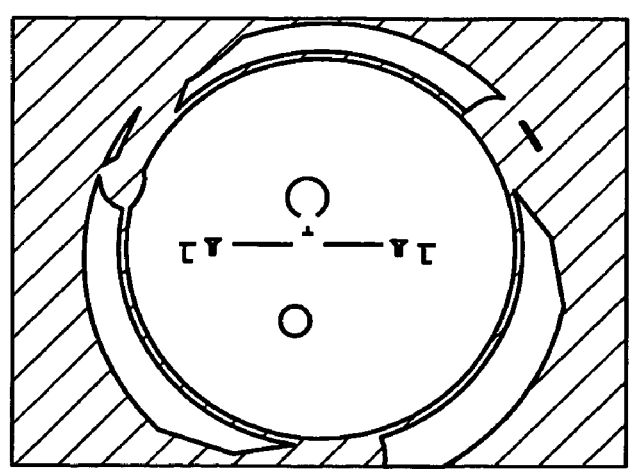

Next, the process of a first threshold (S2) is done. With respect to the image data obtained at Step 1, a luminance value of a pixel below a luminance threshold set is converted into 0 (FIG. 44B).

Figure 44C:
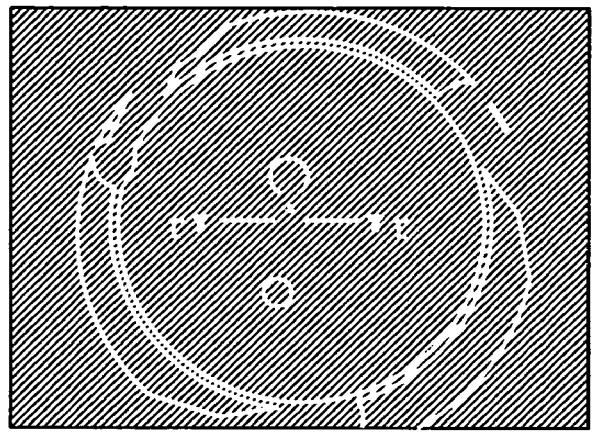

Moreover, a second threshold process (S3) and a binarization process (S4) are accomplished. With respect to the image data obtained at Step 2, a smoothing process is performed to construct an intermediate image. Making use of the obtained intermediate image and the constructed image at Step 2, a difference is calculated for each of the corresponding pixels. The pixels above the set threshold are converted to luminance value 255, while the pixels below the set threshold are converted to luminance value 0, by which the binarized images are formed (FIG. 44C).

With regard to the smoothing process, for example, a process can be applied where an average value of the luminance values for the eight pixels close to the pixels of interest is used as a new luminance value for the interested pixels.

Furthermore, the process of noise elimination (S5) is applied. Under the situation, expansion process and compression process are performed once, respectively, in order to improve connectivity among the pixels. Afterwards, the pixels with luminance value 255, whose connective number is less than 5 pixels, are erased in terms of entirety of the image in order to erase the infinitesimal noise of binarized image.

As the expansion process, for example, if there is even one pixel with luminance value 255 in the 8 pixels close to the pixel of interest, the process for replacing the luminance value of the pixel of interest by 255 can be applied. As the compression process, for example, if there is even one pixel with luminance value 0 in the 8 pixels close to the pixel of interest, the process for replacing the luminance value of the pixel of interest by 0 can be applied.

The provisional geometrical center of the lens ML is determined (S6). Three points at the lower left, the lower right and the top on the external contour of the lens ML are selected. The center of a circle passing through the three points is obtained, designating the position of the center as a provisional center position of the lens ML. This aims at determining the next search area, and should not be precise.

Figure 44D:
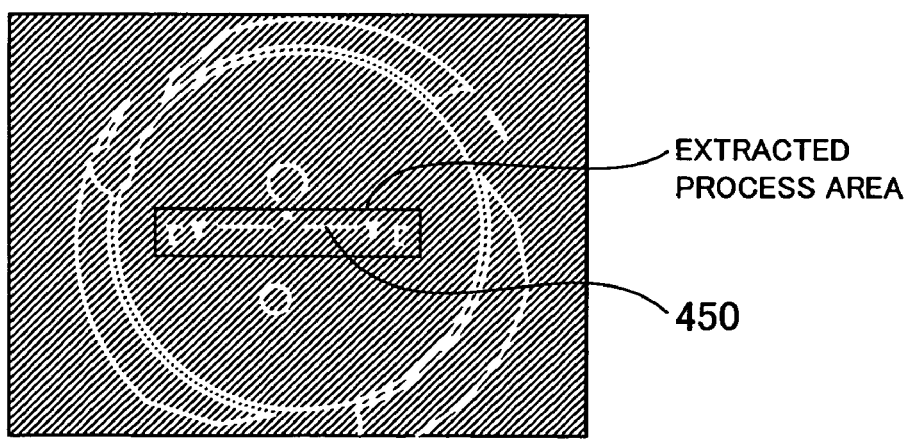

The line extraction area can be determined (S7). The area (300×60 pixels) surrounding the provisional center position of the lens ML is set as an extraction area of the horizontal line 450 (FIG. 44D).

Figure 45A:
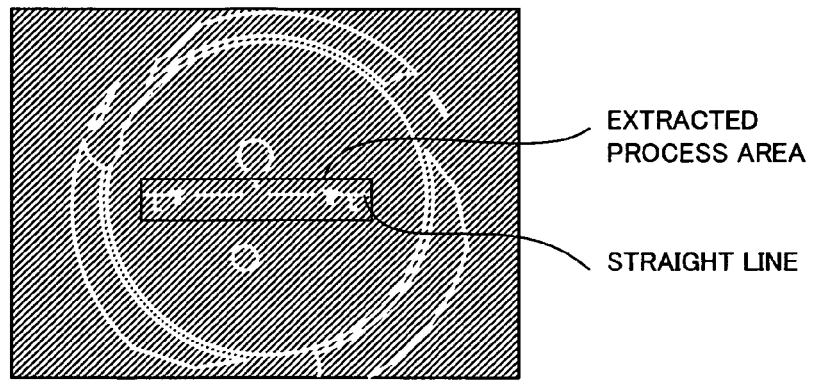
FIGS. 45A-45C are a second series of diagrams for showing lens images obtained by performing the flowchart shown in FIG. 43, respectively.

The horizontal paint extraction (calculation of an incline) is processed (S8). In the area designated in step S7, the Hough transformation is performed by which a straight line having the highest number of pixels of luminance value 255 is sought. The straight line obtained is defined as a horizontal line 450 (FIG. 45A). However, even if a line is extracted, when the number of pixels of luminance value 255 is below 30 pixels, it is understood that the line is not a horizontal line 450 that is supposed to be detected. The Hough transformation also obtains an incline of a horizontal line 450.

Figure 45B:
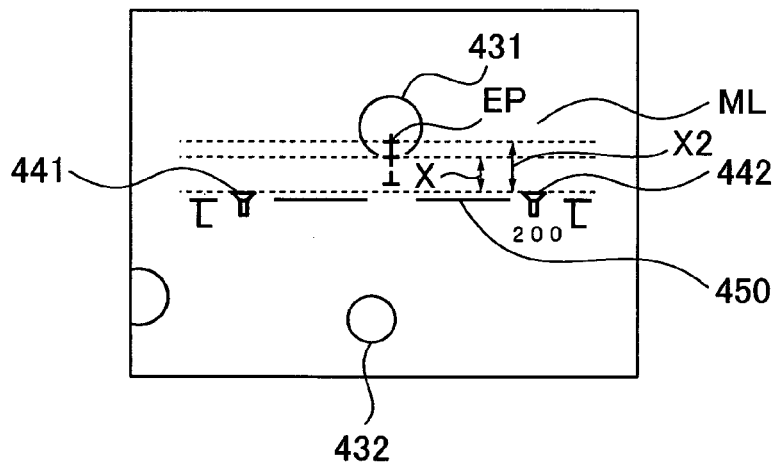

As a next step, an expanded image is obtained (S9). Based on the incline obtained in step 8 (S8), the lens ML is rotated. An image expanded twice is obtained, so that the hidden marks 441 and 442 can be recognized on the liquid display device 11 (FIG. 45B).

Figure 45C:
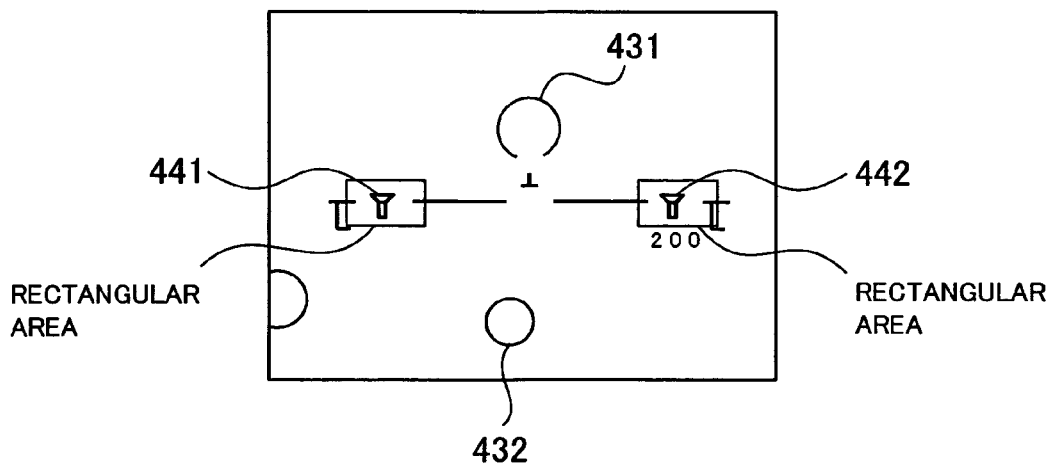

Then, an extraction area for the hidden marks is set (S10). From the provisional geometric center position of the lens ML derived in step 6 (S6), it is estimated that there are the hidden marks 441 and 442 near the point of 17 mm (17 pixels) in the horizontal direction. Square areas consisting of vertical 60 pixels and horizontal 100 pixels with these points at the center are designated as an area for seeking the hidden marks 441 and 442 (FIG. 45C).

Figure 46A:
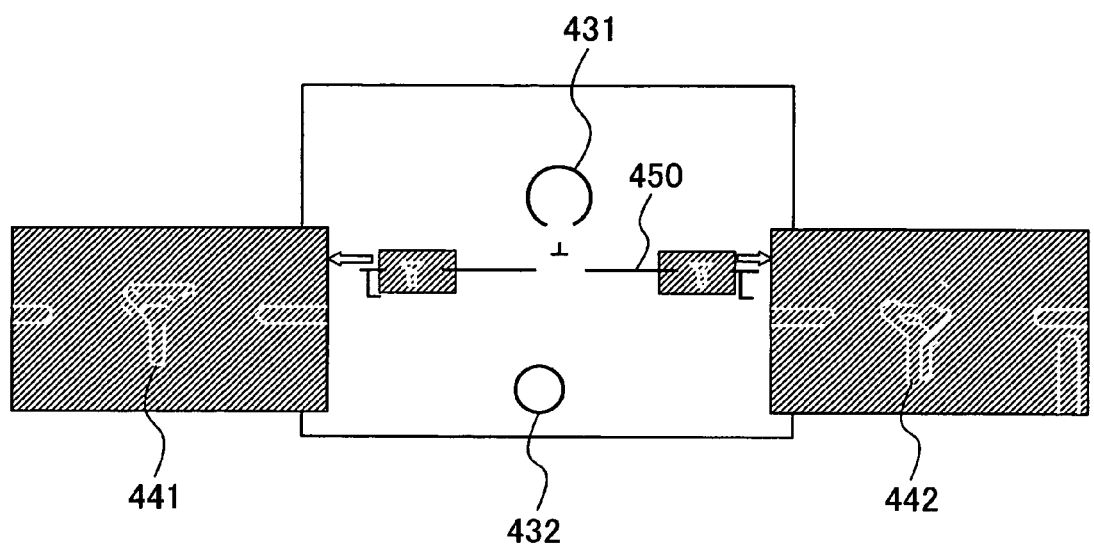
FIGS. 46A and 46B are a third series of diagrams for showing lens images obtained by performing the flowchart shown in FIG. 43, respectively.

In step 11 (S11), binarization is executed. High speed version Canny operator is applied to the area set in step 10 (S10) to extract an edge. On account of this, with regard to an area in which a luminance value sudden changes, the luminance value is transformed into 255 (FIG. 46A).

Figure 46B:
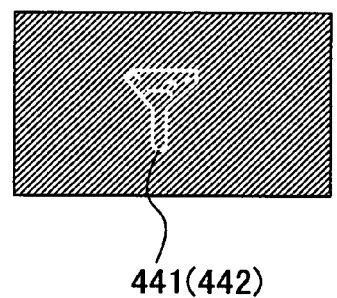

In step 12 (S12), noise elimination is conducted. From the binarized image created in step 11 (S11), (i) the edge such as a horizontal line 450 tangent to the outer circumference of an area is eliminated; and (ii) labeling is conducted to eliminate an edge whose connective pixel number is small (FIG. 46B).

In the next step (S13), the hidden marks 441 and 442 are searched. By forming a frame of vertical 30 pixels and horizontal 30 pixels, a position that has a largest amount of edge in the intra-frame area is supposed to be searched.

Figure 47A:
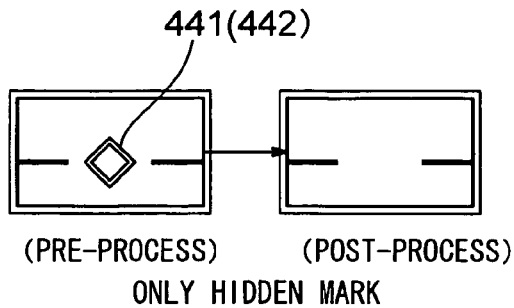
FIGS. 47A-47D are a fourth series of diagrams for showing lens images obtained by performing the flowchart shown in FIG. 43, respectively.

In step 14 (S14), a decision of either the hidden marks 441 and 442 or the horizontal line 450 is made. At the position where the hidden marks 441 and 442 are present, the presence or absence concerning the paint symbol is determined. With regard to the intra-frame area of the hidden marks 441 and 442 obtained by the search in step 13 (S13), the initial overall image of the lens ML (S1) is binarized by a low threshold (for example, about 100 of luminance value) (FIG. 47A).

Figure 47B:
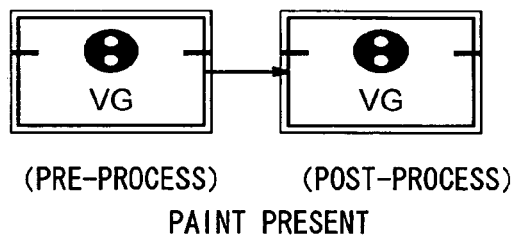

In the image after the binarization, when some sort of a pattern is detected, it is decided that the paint symbol is present (FIG. 47B). Then, the processing using the paint symbol begins.

As shown in FIG. 45B, a distance x to the suction point from the straight line connecting the hidden marks 441 and 442 that are a paint mark is obtained. When, for example, x is 3.8 mm, it is determined which of the three a predetermined value x2 is closest to, 0.0 mm, 2.0 mm or 4.0 mm. Numerical value is rounded (approximated) to a predetermined value (x1) of 4.0 mm that is closest. Then, based on the rounded specified value (4.0 mm), an EP (eye point) position is specified from the hidden marks 441 and 442. The reference "EP" for the hidden marks 441 and 442 may be displayed in the numerical value display area E2 of the liquid display device 11.

Furthermore, even when a distance x to the suction point from the straight line connecting the hidden marks 441 and 442 that are a paint mark is, for example, 3.0 mm, it is determined which of the three a predetermined value is closest to, 0.0 mm, 2.0 mm or 4.0 mm, which rounds (approximates) to the closest predetermined numerical value x2. The predetermined value x2, other than the above, may take the value of 1.0 mm, or 3.0 mm, according to a type of the lens.

Figure 47C:
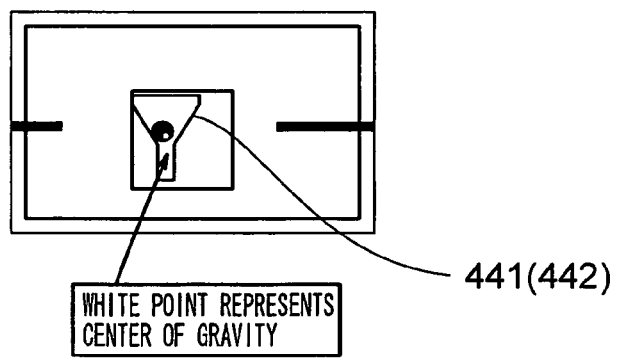

In step S15, a central detection of the hidden marks 441 and 442 is performed. Based on the edge of intra-frame area set in step 13 (S13), a position of center of gravity for the hidden marks 441 and 442 is obtained. The position of center of gravity is regarded as a center position of the hidden marks 441 and 442 (FIG. 47C).

In step 16 (S16), an angle is obtained. An inclined angle is sought between the horizontal line and the line connecting the central positions of the two hidden marks 441 and 442 gained from step 15 (S15).

Then, the +symbol is detected (S17), and a distance to the suction position is calculated (S18). The middle point is derived between the central positions of the two hidden marks 441 and 442 obtained in step 14 (S14) to be designated as an exact geometrical central position Pn of the lens ML.

Figure 47D:
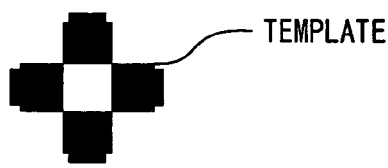

The template of the + symbol 450a of FIG. 40 is made up (FIG. 47D). Matching is accomplished at 0 mm, 2 mm, or 4 mm vertically upward of the horizontal line 450 from the geometrical central position Pn to analyze the interrelationship. The portion having the highest correlative value is regarded as a present position of the + symbol 450a. By contrast, when the correlative value is below a predetermined value, the + symbol is regarded as nonexistent.

The portion having the highest correlative value is clarified at 0 mm, 2 mm, or 4 mm vertically upward of the horizontal line 450 from the geometrical central position Pn, if "Auto" is input in the display frame for "EP" (eye point) of the numerical value display area E2 on the liquid display device 11, as shown in FIG. 4A, the position of the clarified portion is specified as a pupil position (after alignment) or displayed as "0.0", "+2.0" or "+4.0".

As shown in FIG. 4B, "+4.0", for example, is input in the display frame for "EP" (eye point) of the numerical value display area E2 on the liquid display device 11, the pupil position is specified (automatically aligned) at the designated EP height position from the horizontal line 450.

In step 19 (S19), the lens ML is moved. Based on the angle and the central position obtained in step 16 (S16), the lens ML is moved and rotated.

Figure 48:
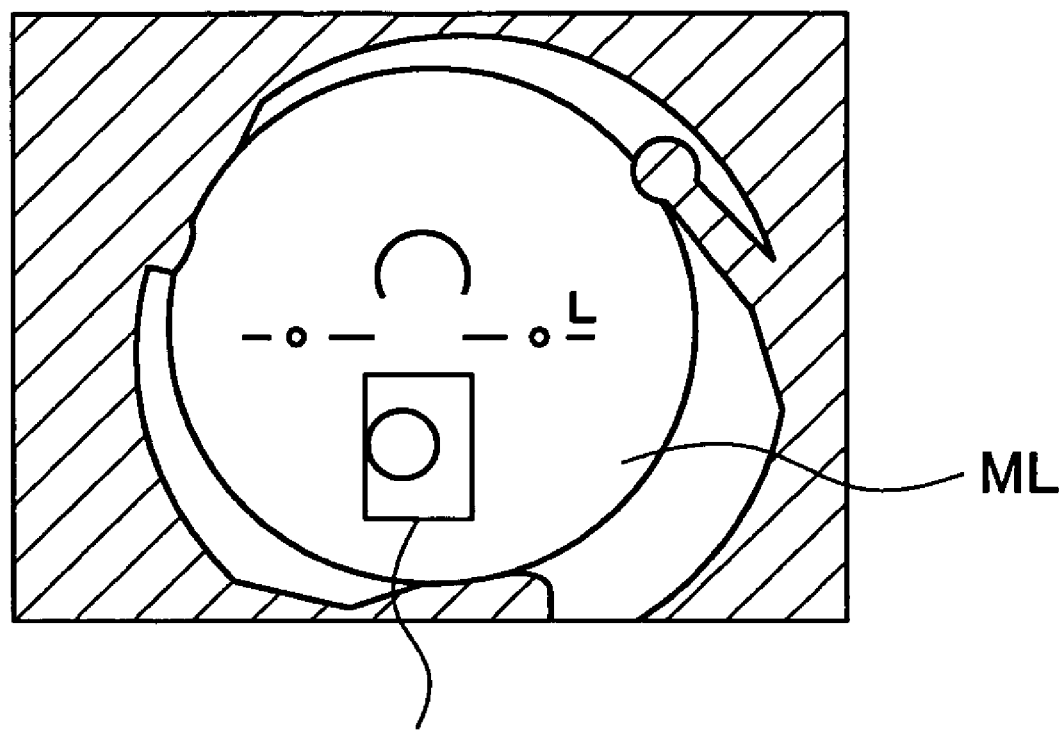
FIG. 48 is a fifth diagram for showing lens images obtained by performing the flowchart shown in FIG. 43.

In step 20, the position of the near portion 432 is detected. In step 21, it is decided whether the lens is for the right eye or the left eye (FIG. 48). A symmetrical area with respect to the left and right is set in the lower part of the geometrical center position for the lens ML. The number of pixels whose density value is above a predetermined value is counted in the left and right areas. Based on the counted value, it is determined whether the lens ML is for the left eye or for the right eye.

In step 22 (S22), after performing the processing above, the lens suction jig 120 is sucked.

As described above, the operation control circuit 130 detects the presence or absence of the spectacle lens ML, the type of the spectacle lens ML, or the hidden mark 441. Then, the operation control circuit 130 controls the attaching angle setting motor 61 and rotates the ring-shaped gear 47 of the lens holder 46 so that the hidden mark 441 agrees with a predetermined portion of the position determining cursor 500 (FIG. 41) displayed on the liquid crystal display device 11. Moreover, the operation control circuit 130 rotates the lens holder 46 to rotate the spectacle lens ML held by the lens holder 46 around the optical axis 02.

After the refraction characteristic of the spectacle lens ML is measured by the CL measurement apparatus 300, the operation control circuit 130 moves the spectacle lens ML between the rotational reflection plate 106 and the illumination optical system 101 of the overall detection optical system 100 and the hidden mark detection optical system 200. When there is a cylindrical axis, the operation control circuit 130 controls the attaching angle setting motor 61 to rotate the ring-shaped gear 47 of the lens holder 46. By doing so, the operation control circuit 130 rotates the lens holder 46 to rotate the spectacle lens ML held by the lens holder 46 around the optical axis.

After this, the operation control circuit 130 controls the drive motor 77, whose rotation is conveyed to the male screw axis 75 via the pulley 78, the timing belt 79 and pulley 76. This rotates the male screw axis 75 to lower the female screw cylinder 72.

Under the situation, the movable arm 80 formed integrally with the female screw cylinder 72 is lowered, and the roller 84 at the top of the movable arm 80 moves away from the horizontal plate portion 70a of the fixed arm 70. The movable bracket 82 is rotated on the lower surface side of the movable arm 80 by the spring force of the twisted coil spring 83 shown in FIG. 25.

Finally, as shown in FIG. 23, moving along and being in contact with the lower surface of the movable arm 80, the lens suction jig 120 faces downward.

On the other hand, in addition to the movement, the guide roller 74 attached to the female screw cylinder 72 moves to the lower vertical slit portion 73c via the spiral slit portion 73b from the upper vertical slit portion 73a. The movable arm 80, together with the female screw cylinder 72, is rotated by 90° to the lens holder 46, which enables the lens suction jig 120 to be moved upward of the spectacle lens ML.

Figure 35:
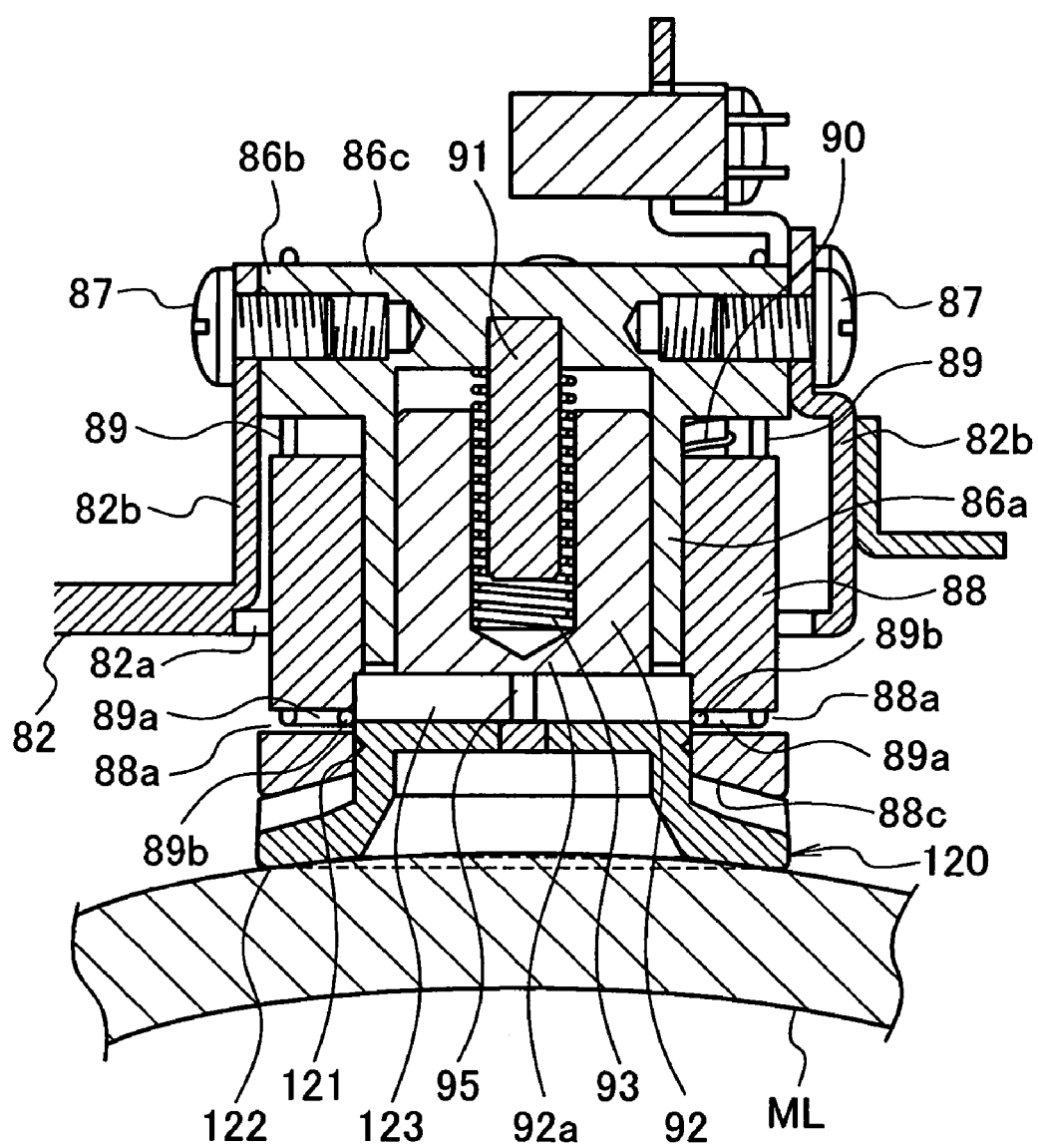
FIG. 35 is a partially sectional view showing the relationship among the suction jig holding unit, the lens suction jig, and the spectacle lens shown in FIG. 34.

After this, the female screw cylinder 72 and the movable arm 80 are lowered, and the suction cup 122 of the lens suction jig 120 at the top of the movable arm 80, as shown in FIGS. 34 and 35, gets in contact with the spectacle lens ML on the shaft-shaped lens receiver 49.

The operation control circuit 130 controls the drive motor 77 to lower slightly the female screw cylinder 72 and the movable arm 80, which in turn further pushes the attaching shaft portion 121 of the lens suction jig 120 into the external cylinder 88. Furthermore, the operation control circuit 130 slightly moves the slide cylinder 92 to the end wall 86c of the holder body 86, resisting the spring force of the coil spring 93 to let the spectacle lens ML suck the lens suction jig 120.

Figure 37A:
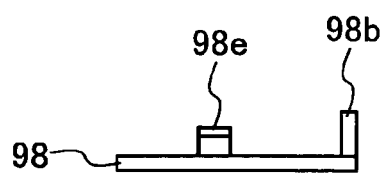
FIGS. 37A-37D are an explanatory view for explaining the action of the stopper hook in FIGS. 30 and 36, respectively.
Figure 37B:
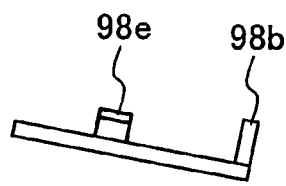
Figure 37C:
Figure 37D:
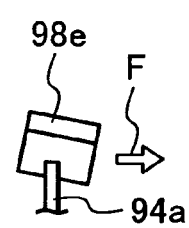

Under the situations, the stopper hooker 98 rotates counterclockwise in FIG. 30 by the spring force of the coil spring 99, while the inclined guide piece 98e, as shown in FIG. 37D, moves on the small radius shaft portion guide piece 94a of the guide shaft 94. This causes the stopper hooker 98 to be inclined as shown in FIG. 37B, and the inclined guide piece 98e to be inclined in the direction of the width.

After this, the operation control circuit 130 reverses the drive motor 77 to raise the movable arm 80 integrally formed with the female screw cylinder 72.

Under the situation, the sliding cylinder 92 moves to the lens attaching shaft 121 by the spring force of the coil spring 93, and the small-diameter shaft portion 94a of the guide shaft 94 attached to the sliding cylindrical body 92 is moved as well to the tip of the stopper hook 98 along the inclined guide piece 98e together with the sliding cylindrical body 92.

Under the situations, with respect to the small-diameter shaft portion 94a, as shown in FIG. 37D, the rotational direction of the stopper hook 98 by the coil spring 99 is derived by applying a rotational force F in the reverse direction to the inclined guide piece 98e. Because of this, the stopper hooker 98 is slightly rotated clockwise, resisting the spring force of the coil spring 99 of FIG. 30; the small-diameter shaft portion 94a of the guide shaft 94 is moved in the engaging cutout 98d of the stopper hook 98.

On the other hand, when the sliding cylindrical body 92 moves to the lens attaching shaft portion 121 by the spring force of the coil spring 93, the lens attaching shaft portion 121 is pressed via the sliding cylindrical body 92 by the spring force of the coil spring 93 to be moved to a tapered dented portion 88c of the external cylinder 88. The attaching shaft portion 121 gets away from the straight line portion 89b of the linear spring 89. Under the present situations, the lens attaching shaft portion 121 can be easily removed from the external cylinder 88.

The operation control circuit 130 further has raised the female screw cylinder 72 and movable arm 80, the roller 74 attached to the female screw cylinder 72 is raised inside the lower vertical slit portion 73c, and the lens suction jig 120 comes off the external cylinder 88 of the tip of the movable arm 80, with the lens suction jig 120 attached to the spectacle lens ML.

After this, the roller 74 mounted to the female screw cylinder 72 is moved to the upper vertical slit portion 73a via the spiral slit portion 73b from the lower vertical slit portion 73c. The movable arm 80 is rotated to the side plate 5 by 90° to get away from over the lens ML.

Figure 25:
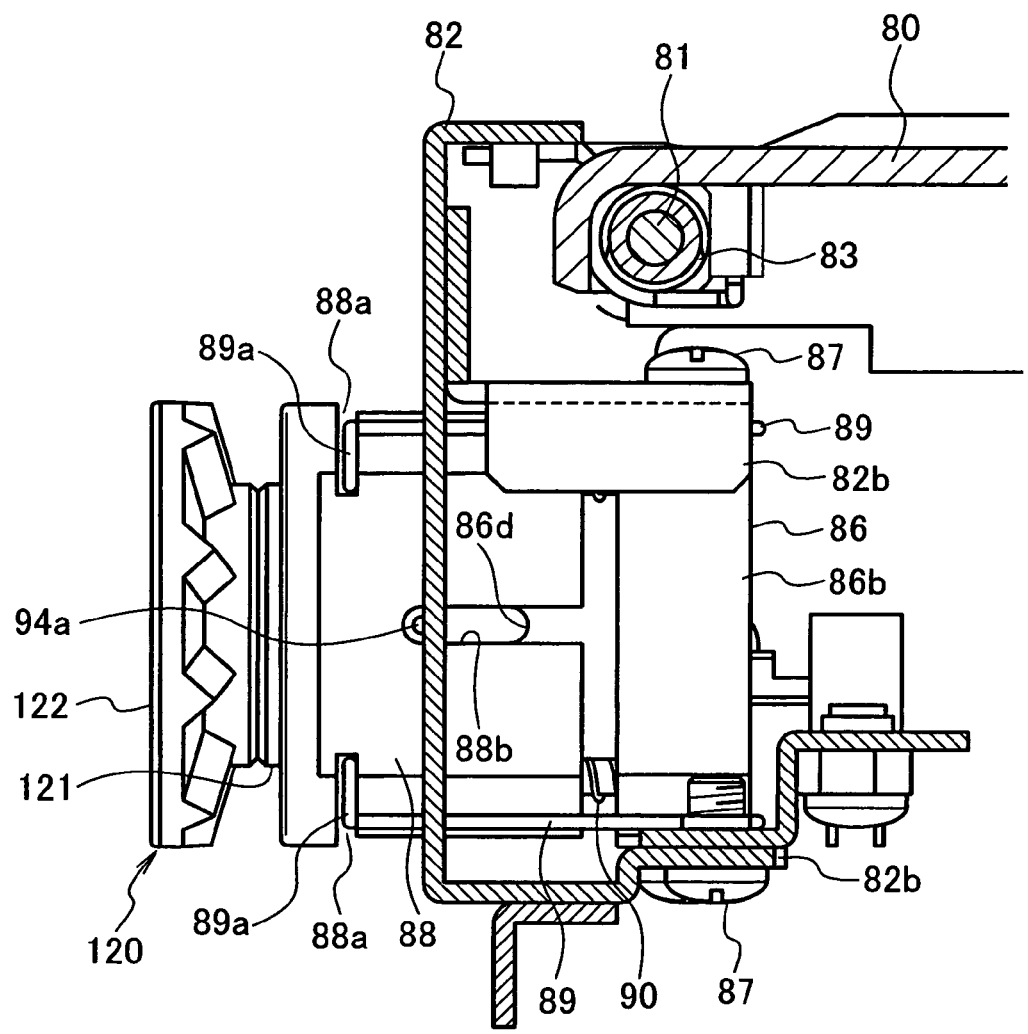
FIG. 25 is a side view of a suction jig holding unit with a portion of a movable bracket shown in FIG. 21 exploded.

When the movable arm 80 is raised and the roller 74 is raised in the upper vertical slit portion 73a, the roller 84 of the movable bracket 82, as shown in FIG. 21, gets contact with the horizontal plate portion 70a of the fixed arm 70 and the movable bracket 82 faces downward, as shown in FIG. 21, resisting the spring force of the twisted coil spring 83 shown in FIG. 25. This allows the movable bracket 82 to be faced toward the aperture 22 for attaching the suction device and be ready to mount a new lens suction jig 120.

An explanation will be given of an automatic detection of the hidden marks 441 and 442 in a progressive multi-focal lens ML, in which one or both of the hidden marks 441 and 442 cannot be detected.

First, in a case of a manual position alignment, the operation control circuit 130, a display control device, has the liquid crystal display device display a position determining cursor 500 and an image of the lens ML in an overlapping manner, as shown in FIG. 42.

When one of the hidden marks 441 and 442 by the automatic detection of the hidden mark as described above is detected, an image of the hidden mark 441 or 442 found by the automatic detection is displayed. On this occasion, the hidden mark 441 or 442 found by the automatic detection may be emphasized for visual confirmation on the display.

The horizontal line 450 printed on the surface of the lens ML and detected by the automatic detection is also displayed on the display.

Figure 49A:
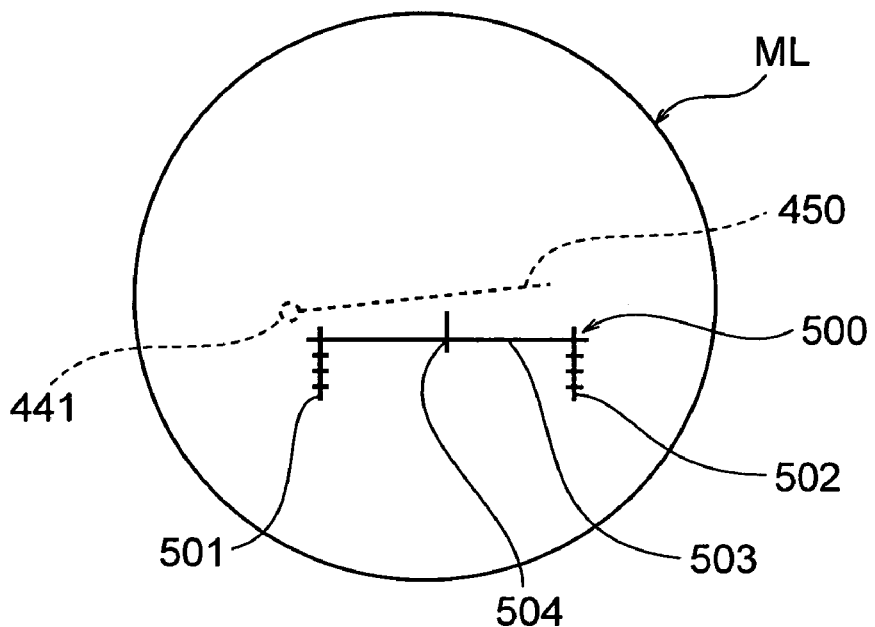
Figure 49B:
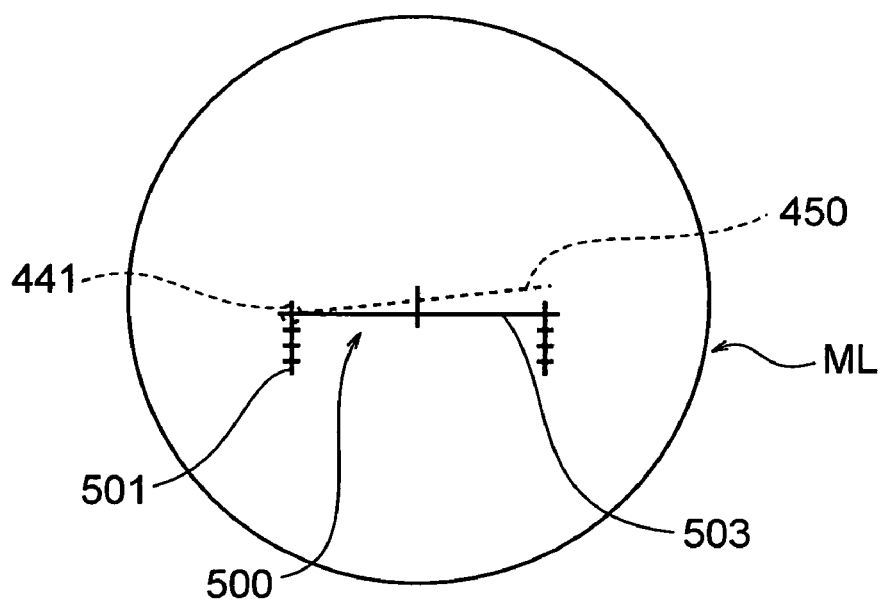
Figure 49C:
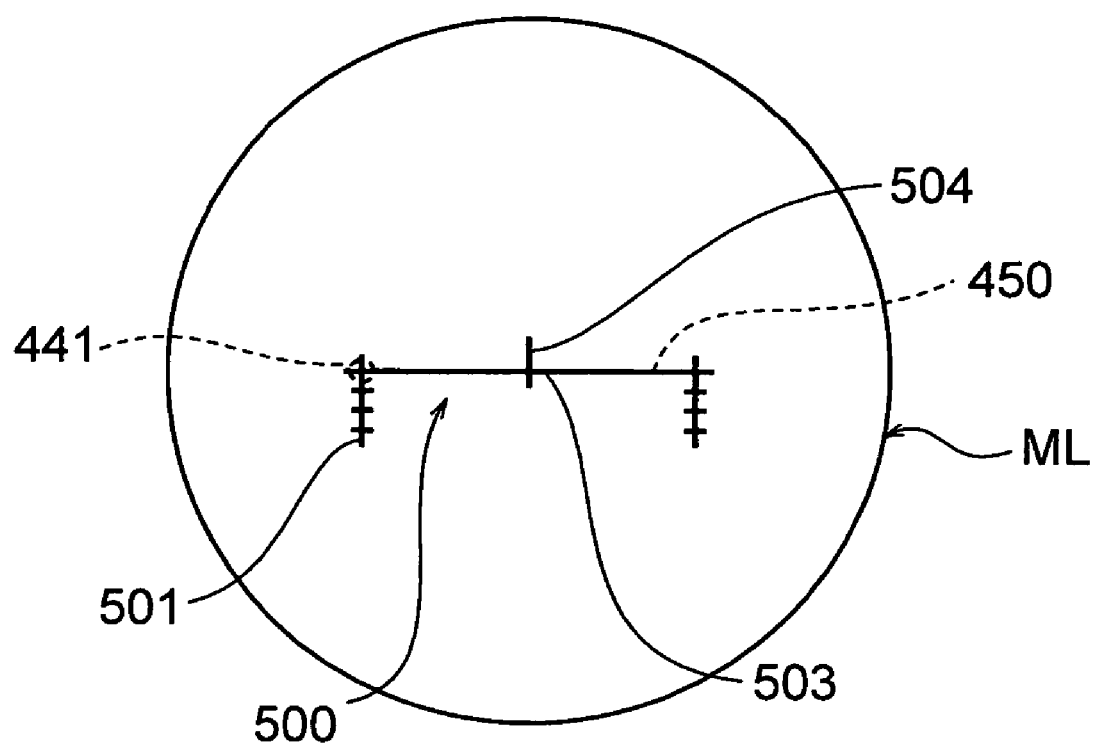
Figure 50:
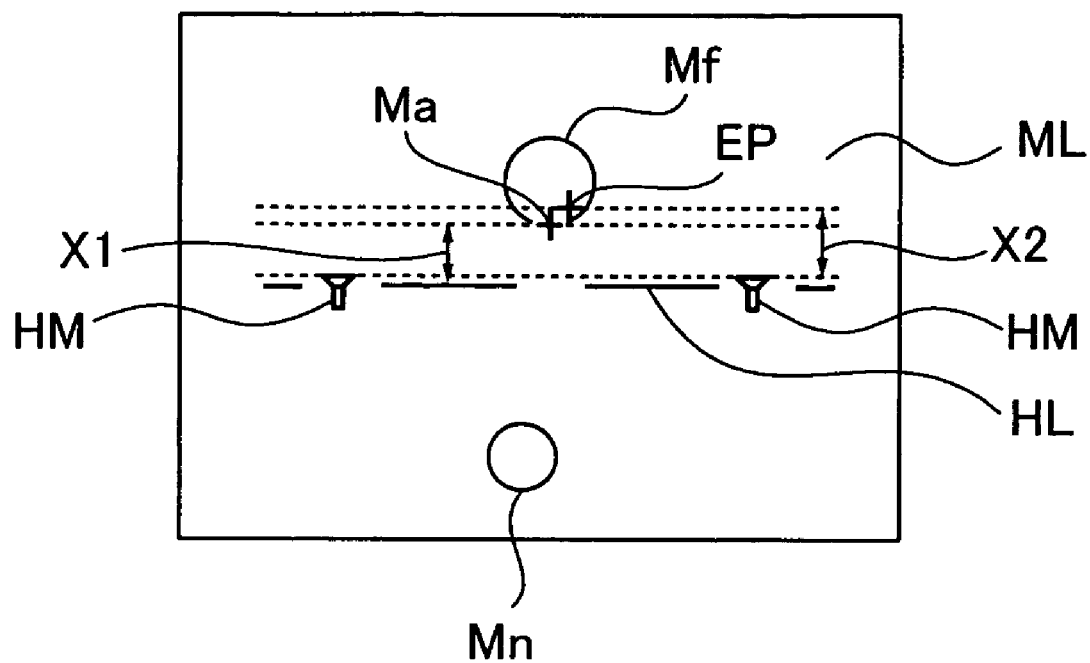
FIG. 50 is an explanatory view for explaining a suction position of a lens suction jig.

When an initial display represents a positional relationship, for example, by FIG. 49A, an operator, observing a display surface of the liquid crystal display device 11, handles a moving icon (a left moving icon 11a, a right moving icon 11b, an upward moving icon 11c and a downward moving icon 11d; for the icons, see FIG. 42) to translate an image of the lens ML shown on the display, so that the detected hidden mark 441 or 442 agrees with an intersection of the vertical straight line 501 (or 502) and the horizontal straight line 503 of the cursor 500.

Where the detected hidden mark 441 (or 442) agrees on the display surface with an intersection of the vertical straight line 501 (or 502) and the horizontal straight line 503 of the cursor 500, when the horizontal straight line 503 of the cursor 500 does not overlap the detected horizontal straight line 450, but one is inclined with respect to the other (FIG. 49B), the operator further controls a rotation icon (a counterclockwise icon 11e and a clockwise icon 11f, for the icons, see FIG. 42), and rotates the image of the lens ML to overlap the horizontal straight line 503 with the horizontal straight line 450 (FIG. 49C).

Under the situations, a position of the intersection between the central vertical straight line 504 and the horizontal straight line 503 becomes an eye-point position that is an installment position of the lens suction jig 120. The amount of translation of the image for the lens ML and the rotation angle caused by the icon operation described above are stored by the operation control circuit 130, which in turn controls the attaching angle setting motor 61 such that the lens ML moves by the stored translation and rotation angle.

This enables the eye-point position of the lens ML to be properly set at a position where the movable arm 80 installs the lens suction jig 120. Then, the lens suction jig 120 may be installed at the eye-point position.

The progressive multi-focal lens ML described above is explained, assuming that the eye-point position exist on the horizontal line 450. However, the eye-point position does not always exist on the horizontal line 450 of the lens ML. It may be set at 2 mm, 4 mm, or 6 mm on the upper side of the horizontal line 450 (distant portion 431).

Accordingly, with respect to the lens ML whose eye-point position is at a position off the horizontal line 450, based on a known amount of shift (2 mm, 4 mm, or 6 mm) from the horizontal line 450, a portion of the cursor 500 that agrees with the hidden mark 441 (or 442) may be changed to the following: an intersection between the vertical straight line 501 (or 502) and the auxiliary horizontal line 505 (or 508) when the amount of shift is 2 mm; an intersection between the vertical straight line 501 (or 502) and the auxiliary horizontal line 506 (or 509) when the amount of shift is 4 mm; and an intersection between the vertical straight line 501 (or 502) and the auxiliary horizontal line 507 (or 510) when the amount of shift is 62 mm.

Even when none of the hidden marks 441 and 442 by the automatic detection of the hidden mark are detected, the lens ML is not considered good if the images of the hidden marks 441 and 442 are not confirmed completely by the naked eye. Because the lens ML is not substantially appropriate for the lens suction jig installing apparatus 1 of the embodiment, it is not totally impossible to confirm it by the naked eye.

Therefore, the operator should seek, by the naked eye, an image of the hidden mark 441 or 442 that is present on an extended line of the horizontal line 450, which can be confirmed visually, on the display surface.

As described above, when either of the hidden marks 441 or 442 has been confirmed visually, the same operation as that explained in FIG. 49 can be applied.

When both of the hidden marks 441 and 442 can be confirmed visually, a moving icon (a left moving icon 11a, a right moving icon 11b, an upward moving icon 11c and a downward moving icon 11d) a rotation icon (a counterclockwise icon 11e and a clockwise icon 11f) may be handled to translate and rotate an image of the lens ML, so that both of the hidden marks 441 and 442 overlap their corresponding vertical straight lines 501 and 502, respectively.

The position determining operation enables an eye-point position of the lens ML to be properly set at a position where the movable arm 80 installs the lens suction jig 120. After this, the lens suction jig 120 may be loaded at the eye-point position.

Instead of moving and rotating an image of the lens ML on the display surface, the position determining cursor 500 may be moved and rotated.

As described in detail, according to the lens suction jig installing apparatus 1 and a method of determining a position of the lens using the apparatus 1, even when image processing does not automatically enable all of the hidden marks 441 and 442 to be detected, the spectacle lens ML can be properly positioned.

The lens suction jig installing apparatus for installing a lens suction jig of the invention comprises a position adjustable pedestal for holding a spectacle lens where a plurality of indices are formed that are provided with a predetermined space on a surface; a position adjusting device for displacing the pedestal within the position adjustable range; an image capture device for capturing an image of the spectacle lens held by the pedestal; an image processing device for image-processing to detect the indices based on the image of the spectacle lens image-captured by the image capture device; a display device for displaying an image; a display control device for control in order to make the display device display an image of the spectacle lens image-captured by the image capture device and an image of the indices obtained by the image-processing; and a jig installing device for installing a lens sucking lens at a predetermined position of the spectacle lens, wherein the display control device specifies a position in a vertical direction with a predetermined interval from a straight line connecting one of the indices obtained by the image-processing, obtains the interval from the straight line connecting one of the indices, approximates the obtained interval to a predetermined value, and specifies a suction position of the lens suction jig.

In the embodiment, the pedestal corresponds to the lens holder 46; a plurality of indices to the hidden marks 441 and 442; a position adjusting device to the lens holding device moving mechanism 32; an image capture device to the CCDs 115 and 205; an image processing device to the image processing circuit 131;, a display device to the liquid crystal display device 11; a display control device to the operation control circuit 130, and a jig installing device to the lens suction mechanism 68.

The embodiment of the invention enables accurate determination of an installing position of a lens suction jig, without erroneously specifying the installing position based on a paint mark (printed mark) out of place.

Even when an index has been automatically detected through image processing, an attaching position of the lens suction jig can be accurately determined, and at the same time, the attaching position is recognized by approximating beforehand the attaching position to a predetermined size (predetermined value) based on a straight line (horizontal line) connecting an image for a first index of a plurality indices. Then, exchanging for an interval from a straight line connecting an image for a second index of a plurality of indices specifies the attaching position. This avoids erroneous determination of the attaching position based on a paint mark (printed mark) out of place, and as a result shortens working hours.

An EP (eye-point) position is obtained by, for example, designating a visible paint mark as a reference, and the obtained position is rounded (approximated) as a predetermined value such as 0.0 mm, 2.0 mm or 4.0 mm. Based on the rounded (approximated) value, the EP position can be specified at a hidden mark reference.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A lens suction jig installing apparatus for installing a lens suction jig, comprising:
    a position adjustable pedestal for holding a spectacle lens where a plurality of indices are formed that are provided with a predetermined space on a surface;
    a position adjusting device for displacing the pedestal within a position adjustable range;
    an image capture device for capturing an image of the spectacle lens held by the pedestal;
    an image processing device for image-processing to detect the indices based on the image of the spectacle lens image-captured by the image capture device;
    a display device for displaying an image;
    a display control device for controlling in order to make the display device display an image of the spectacle lens image-captured by the image capture device and an image of the indices obtained by the image-processing; and
    a jig installing device for installing a lens sucking lens at a predetermined position of the spectacle lens,
    wherein the display control device specifies a position in a vertical direction with a predetermined interval from a straight line connecting one of the indices obtained by the image-processing, obtains the interval from the straight line connecting one of the indices, approximates the obtained interval to a predetermined value, and specifies a suction position of the lens suction jig.

2. A lens suction jig installing apparatus as recited in claim 1, wherein the display control device specifies the position in the vertical direction with the predetermined interval from the straight line connecting one of the indices obtained by the image-processing; obtains the interval from the straight line connecting one of the indices, approximates the obtained interval to the predetermined value, exchanges for a vertical position of the predetermined value from a straight line connecting another index, and specifies a suction position of the lens suction jig.

3. A lens suction jig installing apparatus as recited in claim 1, wherein the image capture device is a CCD.

4. A lens suction jig installing apparatus as recited in claim 1, wherein the display device is a liquid crystal display.

5. A lens suction jig installing apparatus as recited in claim 1, wherein the display control device is an operation control circuit that controls to make the display device display an image of the spectacle lens image-captured by the image capture device and an image of the index obtained by the image processing.

* * * * *